US007666977B2

(12) United States Patent
Kamps et al.

(10) Patent No.: US 7,666,977 B2
(45) Date of Patent: Feb. 23, 2010

(54) POLY(CARBONATE-CO-UREA) COPOLYMERS AND MELT TRANSESTERIFICATION METHOD OF PREPARING THESE COPOLYMERS

(75) Inventors: Jan Henk Kamps, Bergen op Zoom (NL); Edward Kung, Bergen op Zoom (NL); Jan-Pleun Lens, Breda (NL)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 49 days.

(21) Appl. No.: 11/743,761

(22) Filed: May 3, 2007

(65) Prior Publication Data

US 2008/0275209 A1 Nov. 6, 2008

(51) Int. Cl.
*C08G 73/00* (2006.01)
*C08G 64/00* (2006.01)

(52) U.S. Cl. .................... 528/368; 264/176.1; 264/219; 528/196; 528/198; 528/271; 528/274; 568/724; 568/751; 568/810

(58) Field of Classification Search ............. 264/176.1, 264/219; 528/196, 198, 271, 272, 274, 368; 568/724, 751, 810
See application file for complete search history.

(56) References Cited

U.S. PATENT DOCUMENTS

| | | | | |
|---|---|---|---|---|
| 3,450,793 | A | 6/1969 | Schnell et al. | |
| 3,546,172 | A | 12/1970 | Johnson et al. | |
| 4,110,287 | A | 8/1978 | Bosso et al. | |
| 4,336,182 | A | 6/1982 | Landoni et al. | |
| 4,596,866 | A * | 6/1986 | Jackson et al. | 528/347 |
| 4,696,998 | A * | 9/1987 | Brunelle et al. | 528/272 |
| 4,709,069 | A * | 11/1987 | Harris | 558/265 |
| 4,948,862 | A * | 8/1990 | Harris | 528/77 |
| 5,026,817 | A | 6/1991 | Sakashita et al. | |
| 5,219,933 | A | 6/1993 | Henton et al. | |
| 5,221,761 | A | 6/1993 | Jen et al. | |
| 5,412,061 | A | 5/1995 | King, Jr. et al. | |
| 5,981,290 | A | 11/1999 | Lyon et al. | |
| 6,011,125 | A | 1/2000 | Lohmeijer et al. | |
| 6,518,391 | B1 | 2/2003 | McCloskey et al. | |
| 6,569,985 | B2 | 5/2003 | McCloskey et al. | |
| 6,600,004 | B1 * | 7/2003 | McCloskey et al. | 528/198 |
| 6,960,641 | B2 | 11/2005 | O'Neil et al. | |
| 2004/0171747 | A1 | 9/2004 | Zhong | |
| 2005/0234211 | A1 * | 10/2005 | Martinez et al. | 528/196 |

FOREIGN PATENT DOCUMENTS

| | | | |
|---|---|---|---|
| DE | 1812002 | | 6/1970 |
| EP | 1541608 | A1 | 6/2005 |
| JP | 5742717 | A | 3/1982 |
| JP | 10278172 | A | 10/1998 |
| JP | 2003113237 | A | 4/2003 |
| JP | 2005041991 | A | 2/2005 |
| TW | 524251 | | 3/2003 |

OTHER PUBLICATIONS

"Calculating Polymer Flammability From Molar Group Contributions,"DOT/FAA/AR-01/31, FAA William J. Hughes Technical Center, Sep. 2001.
"A Microscale Combusion Calorimeter,"DOT/FAA/AR-01-117, FAA William J. Hughes Technical Center., Feb. 2002.
U.S. Appl. No. 11/427,885, filed Jun. 30, 2006, "Method of Preparing Polycarbonate", Jansen et al.
Kidane, Asmeret G. et al., "Incorporation of a Lauric Acid-conjugated GRGDS Peptide Directly into the Matrix of a Poly(carbonate-urea)urethane Polymer for use in Cardiovascular Bypass Graft Applications" Journal of Biomedical Materials Research, Part A, vol. 79, No. 3, (2006) pp. 606-617, XP002462680.
International Search Report for PCT/US2007/073978 International Filing Date Jul. 20, 2007, Mailing Date Jan. 30, 2008 (4 pages).
Written Opinion of the International Searching Authority for PCT/US2007/073978 International Filing Date Jul. 20, 2007, Mailing Date Jan. 30, 2008 (6 pages).
International Search Report for PCT/US2007/074062 International Filing Date Jul. 23, 2007, Mailing Date Jan. 10, 2008 (6 pages).
Written Opinion of the International Searching Authority for PCT/US2007/074062 International Filing Date Jul. 23, 2007, Mailing Date Jan. 10, 2008 (9 pages).

* cited by examiner

*Primary Examiner*—Terressa M Boykin

(57) ABSTRACT

Disclosed herein is a process to prepare a poly(carbonate-co-urea) copolymer comprising reacting in the melt: (a) a dihydroxy reaction component comprising a dihydroxy compound, (b) a diaryl carbonate reaction component comprising a diaryl carbonate, (c) a urea reaction component comprising a urea compound in the presence of (d) a transesterification catalyst during at least part of the reaction and removing a phenolic byproduct to produce a poly(carbonate-co-urea) copolymer, wherein the urea and dihydroxy compounds are reacted in a molar ratio: (total moles of urea compound)/((total moles of urea compound)+(total moles of dihydroxy compound)) of less than or equal to 0.5.

33 Claims, 15 Drawing Sheets

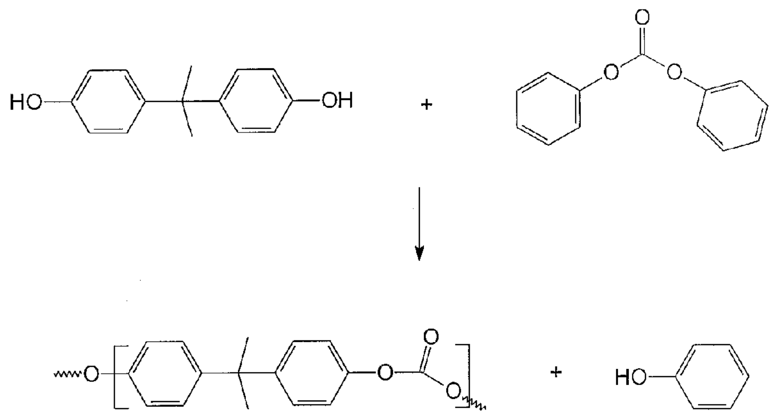
Figure 1 (i) The normal desired reaction in the production of polycarbonate using BPA as the dihydroxy compound and DPC as the diaryl carbonate.
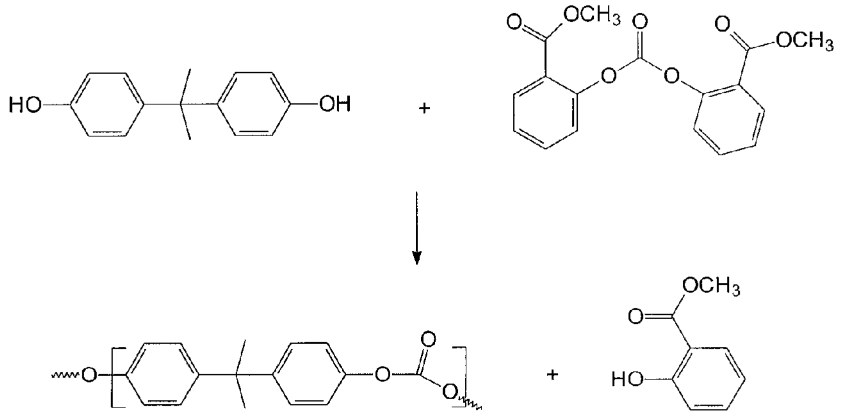
Figure 1 (ii) The normal desired reaction in the production of polycarbonate using BPA as the dihydroxy compound and BMSC, an ester-substituted activated diaryl carbonate, as the diaryl carbonate.

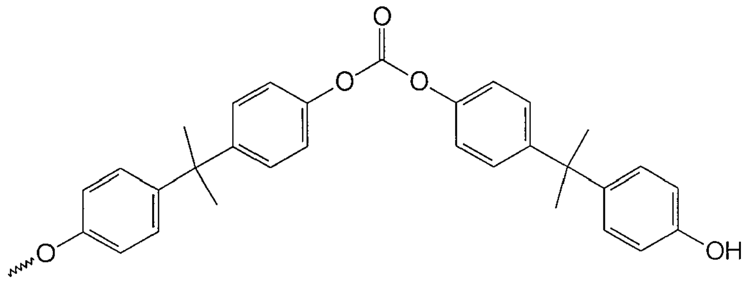
Figure 2 Structure (c1) uncapped BPA end group (free OH)
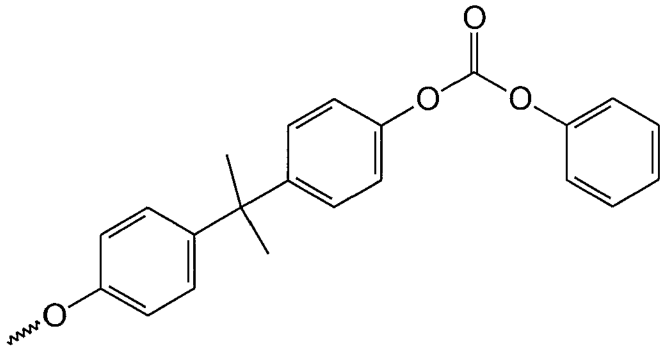
Figure 2 Structure (c2) phenyl carbonate end group
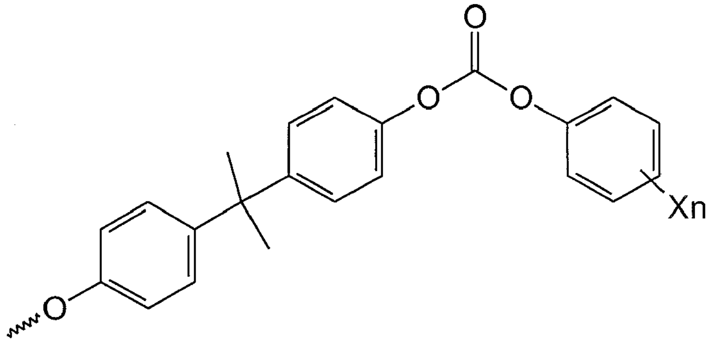
Figure 2 Structure (c3) substituted phenyl carbonate end group

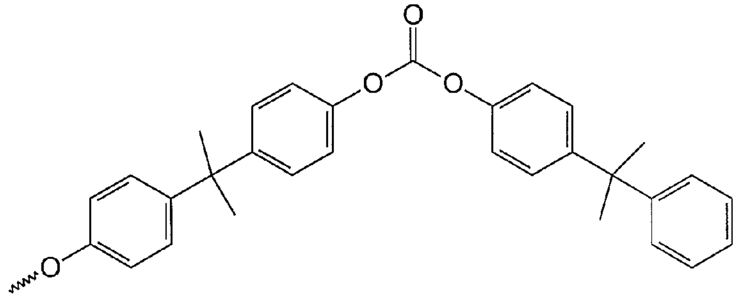
Figure 2 Structure (c4) PCP carbonate end group (chain-stopped end group)
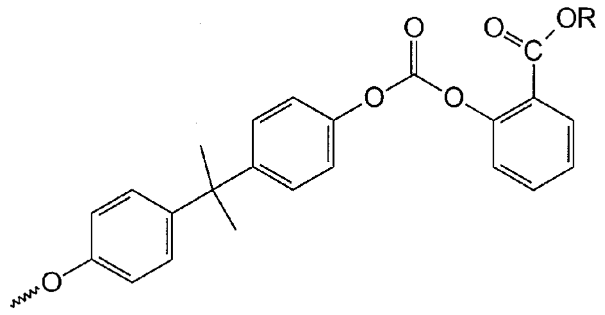
Figure 2 Structure (c5) ortho-(ester-substituted) phenyl carbonate end group
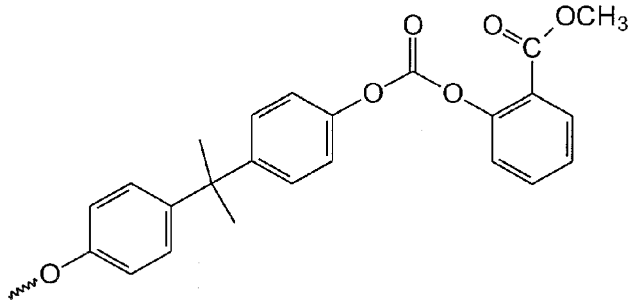
Figure 2 Structure (c6) ortho-(methyl ester)-substituted phenyl carbonate end group (terminal (methylsalicyl)carbonate or T-MSC)

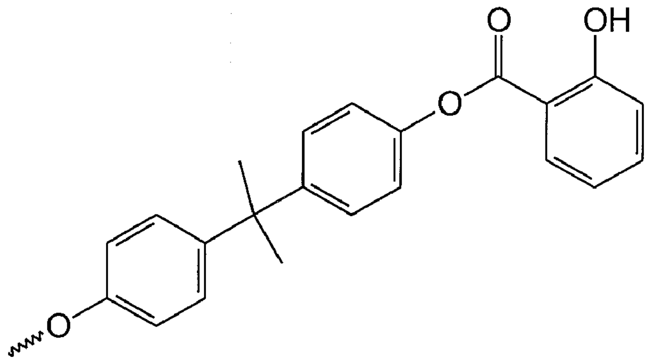
Figure 2 Structure (c7) salicyl-OH end group
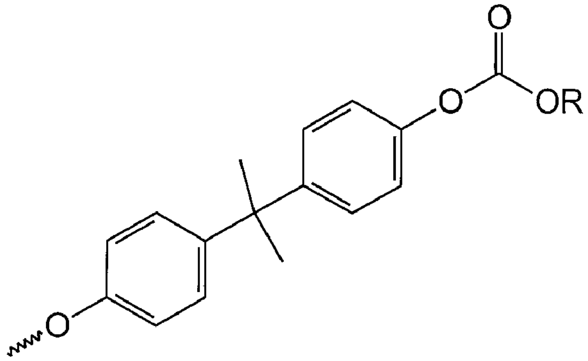
Figure 2 Structure (c8) alkyl, phenyl or benzyl carbonate end group
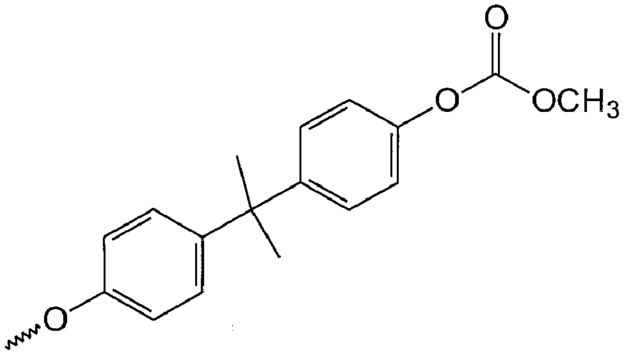
Figure 2 Structure (c9) methyl carbonate end group

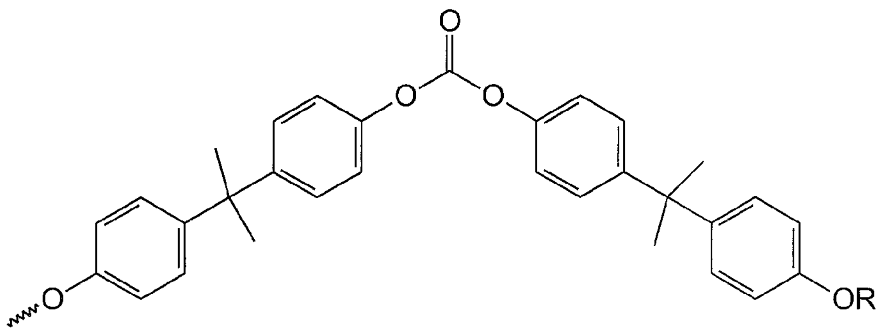
Figure 2 Structure (c10) alkyl, phenyl or benzyl ether end group
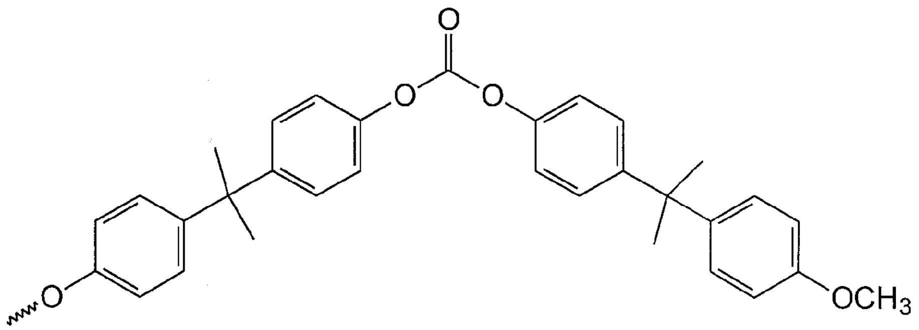
Figure 2 Structure (c11) methyl ether end group
Figure 2 Various types of end groups that can form when polycarbonate (PC) is polymerized used bisphenol A and a diaryl carbonate

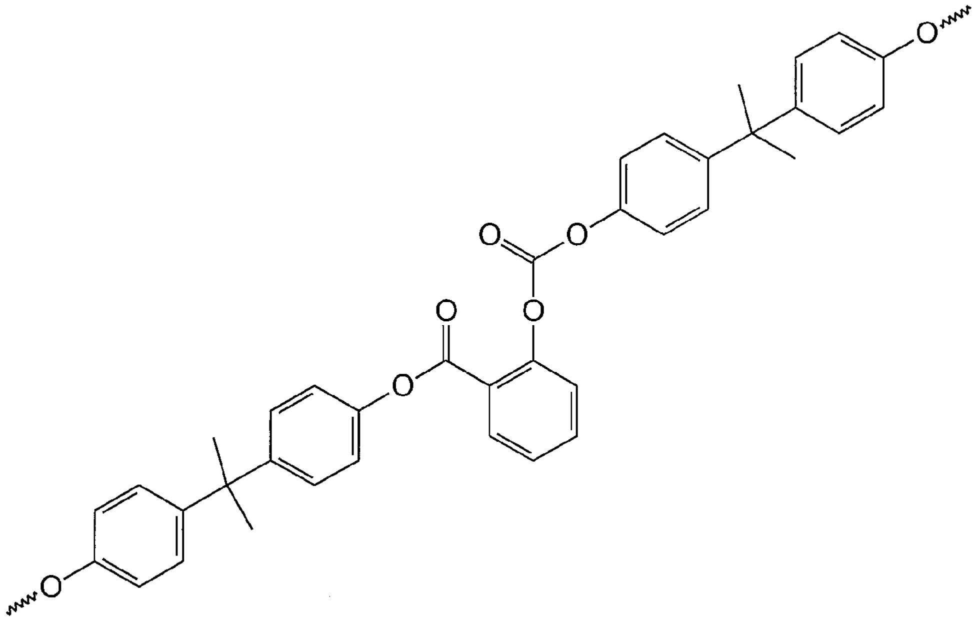
Figure 3 Structure (d1) an internal ester linkage (IEL) which can form when an ester-substituted diaryl carbonate like BMSC is used in a reaction with bisphenol A.

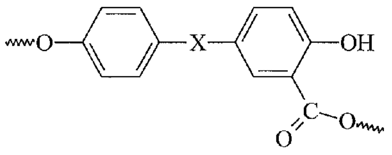

Figure 4 Structure (e1) linear internal Fries linkage

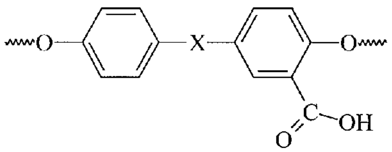

Figure 4 Structure (e2) acid internal Fries linkage

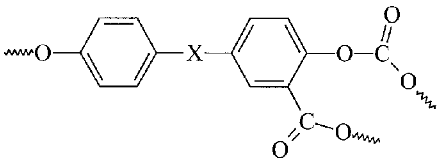

Figure 4 Structure (e3) branched internal Fries linkage wherein X represents, for example, one of the groups of formula:

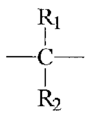 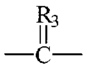

Figure 4 Internal Fries linkages that can form in polycarbonates prepared by the melt-transesterification method, especially when non-activated diaryl carbonates like DPC are used.

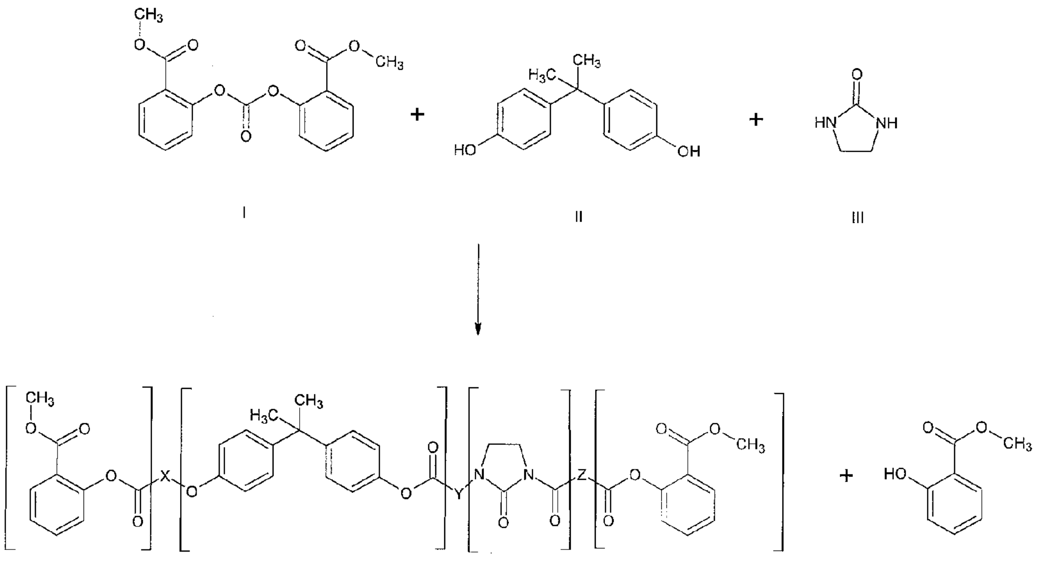
I II III
IV V
Figure 5 The reaction in the production of a poly(carbonate-co-urea) copolymer using EU as the urea compound, BPA as the dihydroxy compound, and BMSC as the ester-substituted diaryl carbonate.

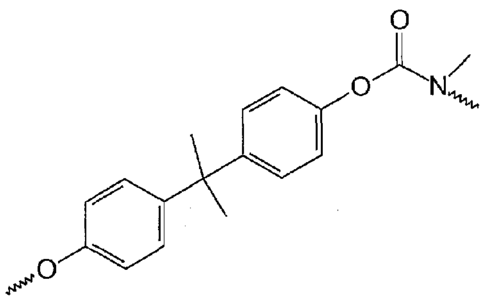
Figure 6 (i) Structure (f1) of an internal carbamate ROC(=O)$NR_2$ linkage, for example, as formed by the reaction of one BPA and one diaryl carbonate and one N,N'-ethylene urea (EU).
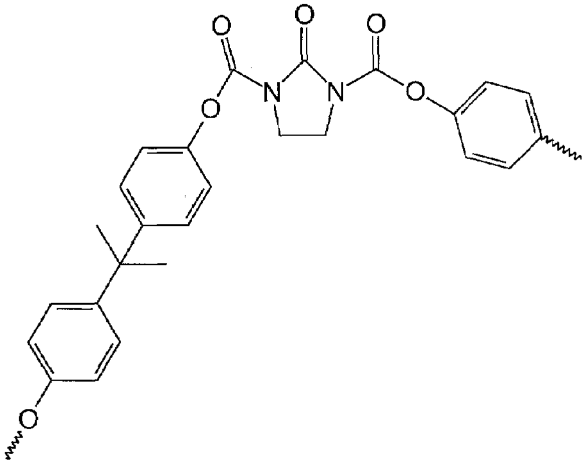
Figure 6 (ii) Structure (f2) a dicarbamate urea linkages, ROC(=O)N(R)C(=O)N(R),C(=O)OR, for example, as formed by the reaction of one BPA and two diaryl carbonates and one EU.

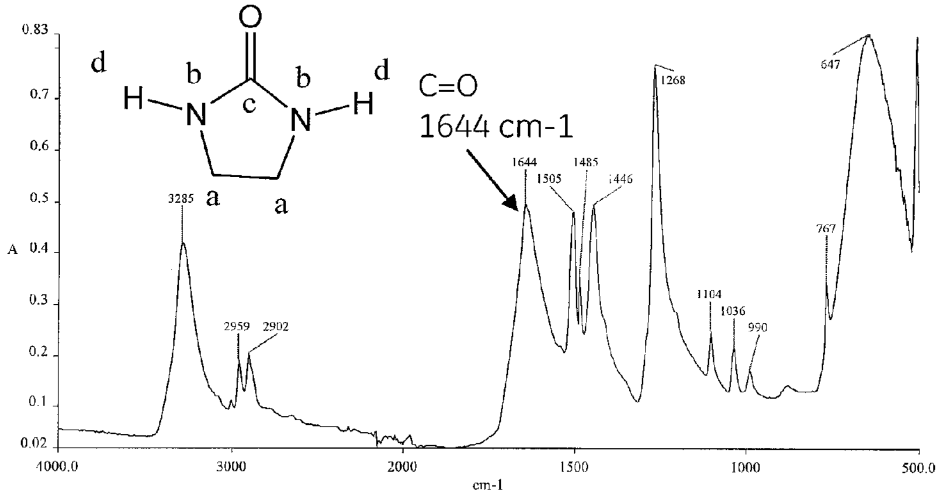
Figure 7(i) The FT-IR spectrum of the EU monomer.
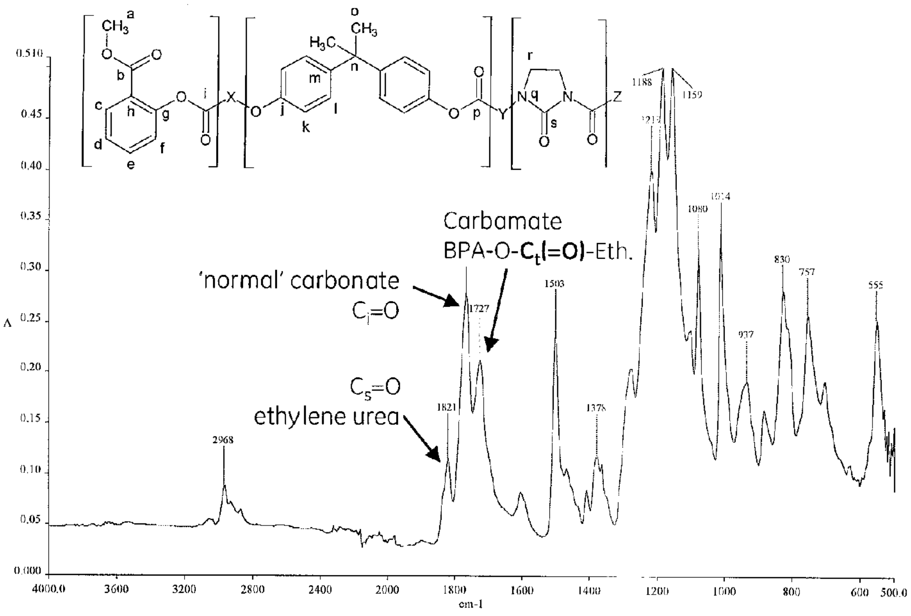
Figure 7 (ii) shows the FT-IR spectrum of the poly(carbonate-co-urea) copolymer prepared in Example 1 using EU, BPA, and BMSC.

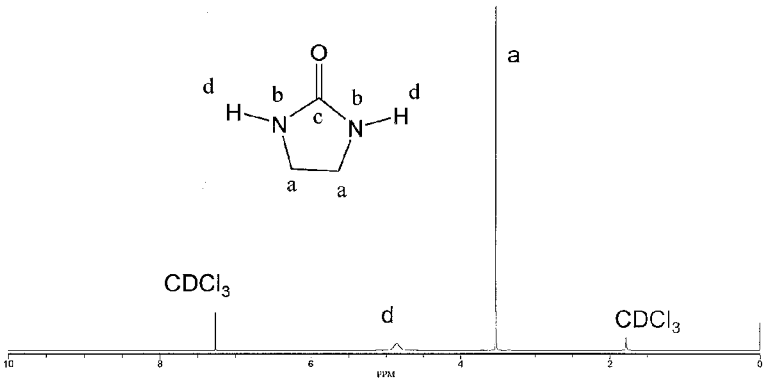
Figure 8 (i) The $^1$H NMR spectrum of the EU monomer.
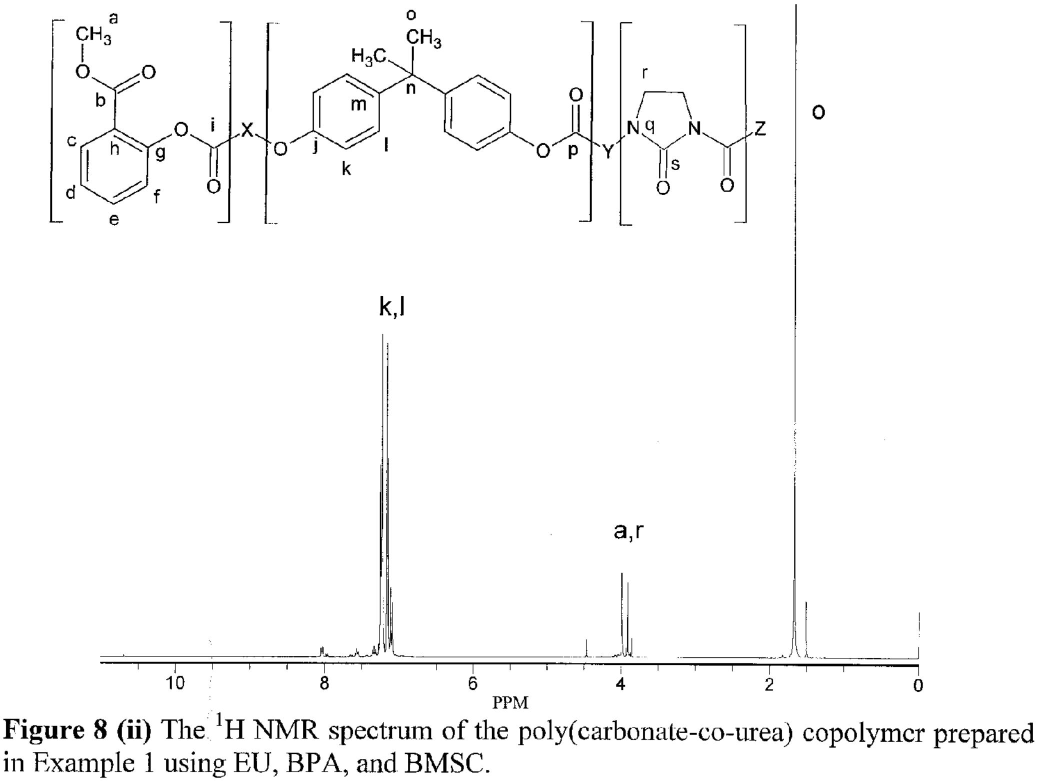
Figure 8 (ii) The $^1$H NMR spectrum of the poly(carbonate-co-urea) copolymer prepared in Example 1 using EU, BPA, and BMSC.

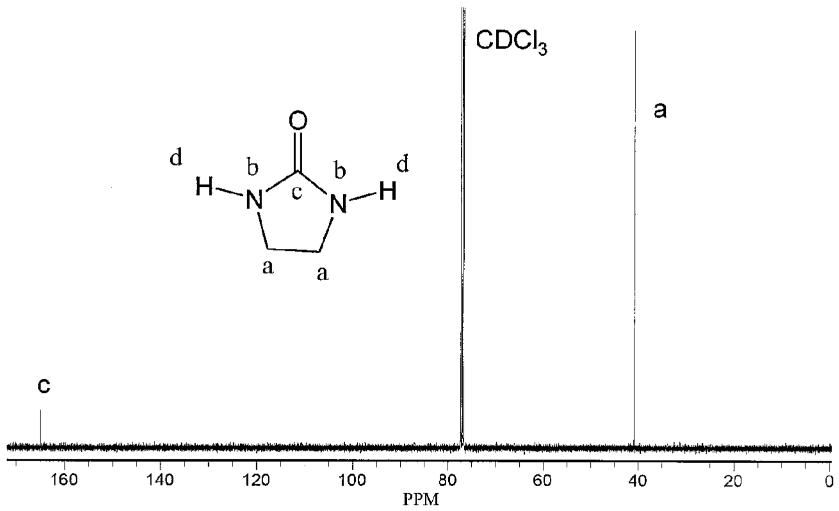
Figure 9(i) The $^{13}$C decoupled NMR spectrum of the EU monomer.
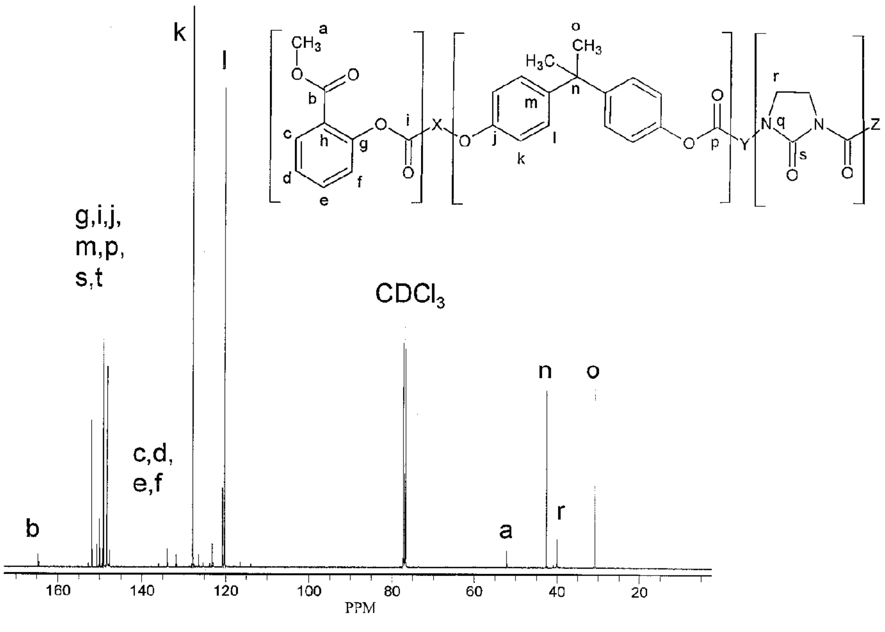
Figure 9 (ii) The $^{13}$C decoupled NMR spectrum of the poly(carbonate-co-urea) copolymer prepared in Example 1 using EU, BPA, and BMSC.

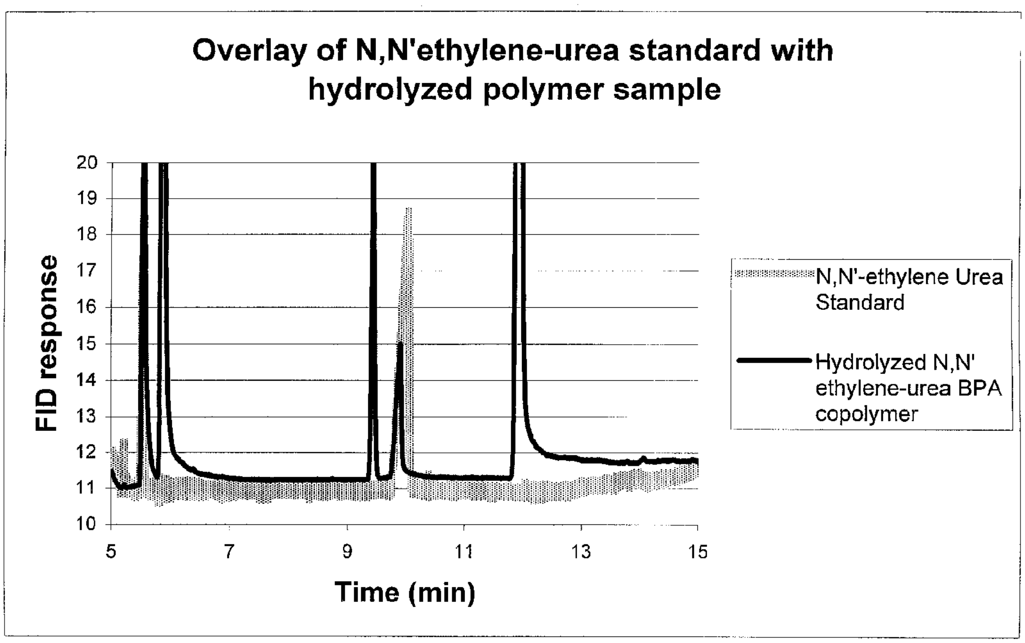
Figure 10 The overlay of the GC-FID chromatogram of thc hydrolyzed poly(carbonate-co-urea) copolymer prepared in Example 1 using EU, BPA, and BMSC compared to that of the EU monomer.

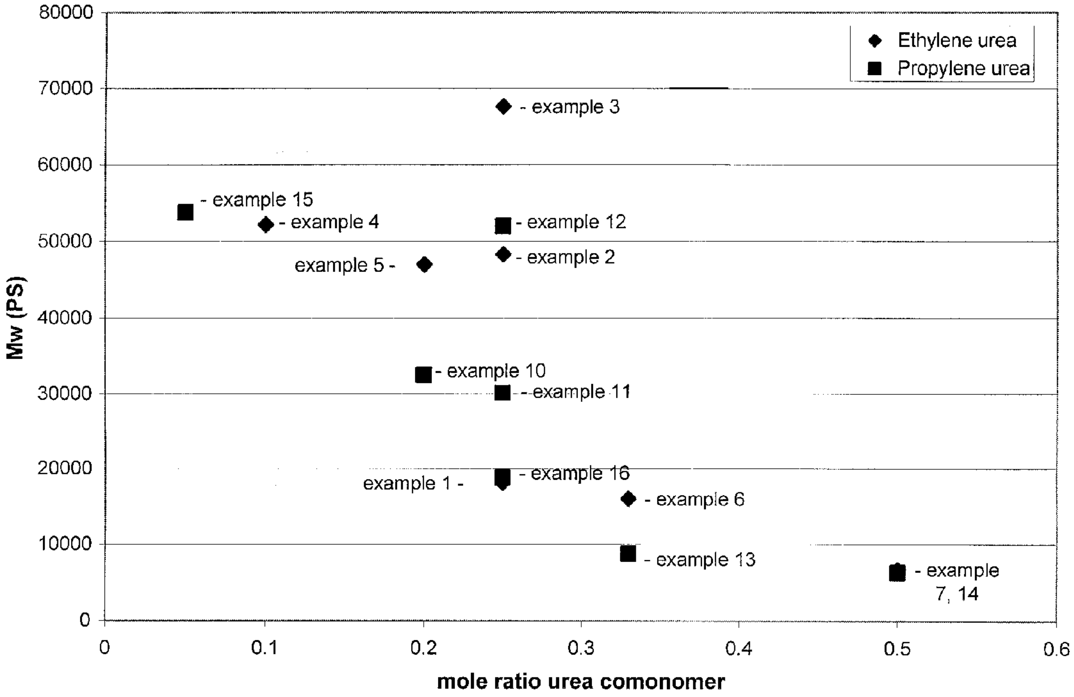
Figure 11 Effect of the mole ratio urea compound in the melt process formulation on the molecular weight, Mw (PS), of the poly(carbonate-co-urea) copolymer obtained.

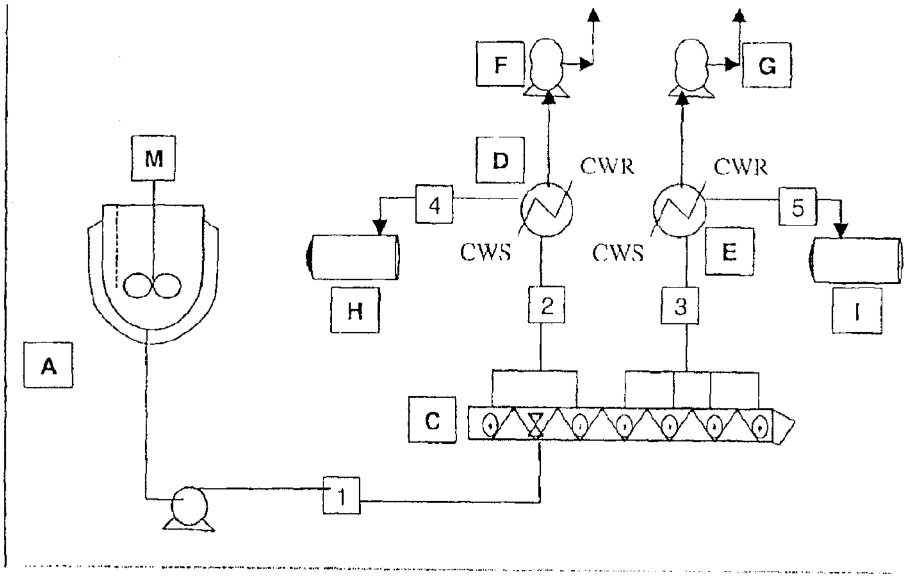
Figure 12 Schematic diagram of an apparatus used in preparing some of the examples of the invention.

POLY(CARBONATE-CO-UREA) COPOLYMERS AND MELT TRANSESTERIFICATION METHOD OF PREPARING THESE COPOLYMERS

BACKGROUND OF THE INVENTION

The present invention relates to poly(carbonate-co-urea) copolymers containing both carbonate —(O(C═O)O)— and urea —(N(C═O)N)— linkages and to a melt transesterification method of preparing these same copolymers. Although many methods of preparing polycarbonates are known, for example, solution, interfacial, melt transesterification, or solid state polymerization, polycarbonates are generally produced commercially through one of two types of processes: an interfacial process (so named because it involves reaction at a water/organic solvent interface) or a melt transesterification process (so named because the monomers are reacted in a molten, rather than dissolved, state). In the melt transesterification process, dihydroxy compounds such as bisphenol A are reacted with a carbonic acid diester. The carbonic acid diester is typically diphenyl carbonate. More recent patents have described using carbonic acid diesters that are more reactive than diphenyl carbonate, which are referred to herein as "activated" diaryl carbonates.

It is known from U.S. Pat. No. 4,336,182 to prepare polyurea (polycarbamide) and other nitrogen-containing homopolymers and homo-oligomers by a polymerization reaction of piperazine (six member aliphatic heterocyclic rings having two opposing secondary amine groups) or imadazolidine (5 member aliphatic heterocyclic rings containing a urea group) compounds in solution with carbonates, imidodicarbonates, diesters, and diisocyanate compounds. The disclosed method in U.S. Pat. No. 4,336,182 is limited to the preparation of polyurea homopolymers and homo-oligomers however. Therefore the polymers disclosed in U.S. Pat. No. 4,336,182 do not contain any carbonate linkages. Although such polyurea materials were reported to have useful anti-flaming and self-extinguishing properties, they apparently lacked many of the desirable properties of polycarbonates such as ductility and optical transparency. For example, most of the example reaction products in U.S. Pat. No. 4,336,182 were reported to be brittle and/or easily crushed, and none of the examples were reported to be transparent. In addition, solution polymerization methods are less desirable industrially for the preparation of polycarbonates due to the additional processing equipment and steps required to remove any residual organic solvent to the extremely low levels required so that such polymer properties as color, stability and mechanical properties are not negatively impacted.

It is known from U.S. Pat. No. 3,450,793 to prepare poly(carbonate-co-urethane) block copolymers containing urethane —(N(C═O)O)— groups in the form of polyurethane blocks. The method of U.S. Pat. No. 3,450,793 does not result in the preparation of poly(carbonate-co-urea) copolymers containing both carbonate —(O(C═O)O)— and urea —(N(C═O)N)— linkages however. In addition, the method of U.S. Pat. No. 3,450,793 actually requires two separate polymerization steps: one to make the polyurethane block, and a second polymerization to react the polyurethane blocks together with dihydroxy compounds and phosgene or bischloroformates or carbonic acid diesters.

Therefore there is still a need for poly(carbonate-co-urea) copolymers compositions containing both carbonate —(O(C═O)O)— and urea —(N(C═O)N)— linkages and to a melt transesterification method for preparing such copolymers.

SUMMARY OF THE INVENTION

Applicants have now found that poly(carbonate-co-urea) copolymers containing both carbonate —(O(C═O)O)— and urea —(N(C═O)N)— linkages can be prepared by the melt transesterification polymerization of a dihydroxy compound and a diaryl carbonate compound together with a urea compound. Such poly(carbonate-co-urea) copolymers can be readily prepared in as little as one single polymerization reaction using conventional melt polymerization polycarbonate reactors and production facilities.

In accordance with the method of the present invention, poly(carbonate-co-urea) copolymer is prepared in a process comprising reacting in the melt (a) a dihydroxy reaction component comprising a dihydroxy compound, (b) a diaryl carbonate reaction component comprising a diaryl carbonate, (c) a urea reaction component comprising a urea compound in the presence of (d) a transesterification catalyst during at least part of the reaction, and removing a phenolic byproduct to produce a poly(carbonate-co-urea) copolymer. In one embodiment, the urea and dihydroxy compounds are reacted in a molar ratio: (total moles of urea compound)/((total moles of urea compound)+(total moles of dihydroxy compound)) of less than or equal to 0.5. In some embodiments the molar ratio is less than or equal to 0.33, specifically less than or equal to 0.25.

In other embodiments, the urea compound in one or more of the above embodiments or their combinations is a compound of the following structure (a1),

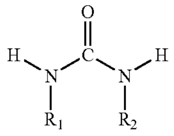

(a1)

wherein the substituents $R_1$ and $R_2$ are independently each a $C_1$ to $C_{12}$ branched or linear alkyl group, a $C_6$ to $C_{18}$ aromatic group, or a $C_7$ to $C_{36}$ aralkyl group.

In still other embodiments, the urea compound in one or more of the above relevant embodiments or their combinations is a compound of structure (a2),

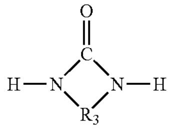

(a2)

wherein the substituent $R_3$ is a $C_1$ to $C_{12}$ branched or linear aliphatic group, a $C_6$ to $C_{18}$ aromatic group, or a $C_7$ to $C_{36}$ aralkyl group.

In another embodiment, a poly(carbonate-co-urea-co-ester) copolymer is prepared in a process comprising reacting in the melt (a) a dihydroxy reaction component comprising a dihydroxy compound, (b) a diaryl carbonate reaction component comprising a diaryl carbonate, (c) a urea reaction component comprising a urea compound, (e) a diacid reaction component comprising a diacid compound and/or a diester reaction component comprising a diester compound in the presence of (d) a transesterification catalyst during at least part of the reaction, and removing a phenolic byproduct to produce a poly(carbonate-co-urea) copolymer. In one embodiment, the urea, dihydroxy, diacid and diester compounds are reacted in a molar ratio: (total moles of urea compound)/((total moles of urea compound)+(total moles of dihydroxy compound)+(total moles of diacid compound)+(total moles of diester compound)) of less than or equal to 0.5. In some embodiments the molar ratio is less than or equal to 0.33, specifically less than or equal to 0.25.

Poly(carbonate-co-urea) copolymers made in accordance with the methods of the invention are structurally different from other polycarbonates known in the art. Specifically, the poly(carbonate-co-urea) copolymers comprise incorporated urea compound and dihydroxy compound residues. In one embodiment, the poly(carbonate-co-urea) copolymers comprise incorporated diaryl carbonate, urea compound, and dihydroxy compound residues, wherein the incorporated urea compound residues are present in an amount of less than or equal to 50 mole % based on the total content of incorporated dihydroxy compound and urea compound residues. In some embodiments, the incorporated urea compound residues are present in an amount of less than or equal to 30% mole, specifically less than or equal to 25 mole %, based on the total content of incorporated dihydroxy compound and urea compound residues.

In additional embodiments, the incorporated urea compound residues in one or more of the above relevant embodiments or their combinations have the following structure (b1), (b1)

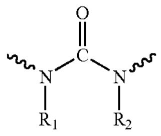

wherein the substituents $R_1$ and $R_2$ are independently each a $C_1$ to $C_{12}$ branched or linear alkyl group, a $C_6$ to $C_{18}$ aromatic group, or a $C_7$ to $C_{36}$ aralkyl group.

In other embodiments, the incorporated urea compound residues in one or more of the above relevant embodiments or their combinations have the following structure (b2), (b2)

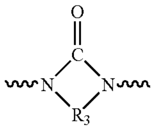

wherein the substituent $R_3$ is a $C_1$ to $C_{12}$ branched or linear aliphatic group, a $C_6$ to $C_{18}$ aromatic group, or a $C_7$ to $C_{36}$ aralkyl group.

In still another embodiment, the poly(carbonate-co-urea) copolymers comprise incorporated diaryl carbonate, urea compound, and dihydroxy compound residues, and internal linkages and end groups, wherein the incorporated urea compound residues are present in an amount of less than or equal to 50 mole % based on the total content of incorporated dihydroxy compound and urea compound residues. In some embodiments, the incorporated urea compound residues are present in an amount of less than or equal to 30% mole, specifically less than or equal to 25 mole %, based on the total content of incorporated dihydroxy compound and urea compound residues.

In additional embodiments, the incorporated urea compound residues in one or more of the above relevant embodiments have the following structure (b1), (b1)

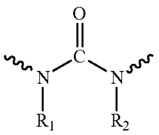

wherein the substituents $R_1$ and $R_2$ are independently each a $C_1$ to $C_{12}$ branched or linear alkyl group, a $C_6$ to $C_{18}$ aromatic group, or a $C_7$ to $C_{36}$ aralkyl group.

In other embodiments, the incorporated urea compound residues in one or more of the above relevant embodiments have the following structure (b2), (b2)

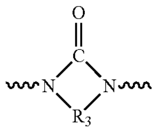

wherein the substituent $R_3$ is a $C_1$ to $C_{12}$ branched or linear aliphatic group, a $C_6$ to $C_{18}$ aromatic group, or a $C_7$ to $C_{36}$ aralkyl group.

In yet another embodiment, a poly(carbonate-co-urea-co-ester) copolymer made in accordance with the invention comprises incorporated urea compound, dihydroxy compound, and diacid compound residues. In one embodiment, the incorporated urea compound residues are present in an amount of less than or equal to 50 mole % based on the total content of incorporated dihydroxy compound, urea compound, and diacid compound residues. In some embodiments, the incorporated urea compound residues are present in an amount less than or equal to 30% mole, specifically less than or equal to 25 mole %, based on the total content of incorporated dihydroxy compound, urea compound, and diacid compound residues.

In still yet another embodiment, a poly(carbonate-co-urea-co-ester) copolymer made in accordance with the invention comprises incorporated diaryl carbonate, urea compound dihydroxy compound, diacid compound residues, and internal linkages and end groups, wherein the incorporated urea compound residues are present in an amount of less than or equal to 50 mole % based on the total content of incorporated dihydroxy compound, urea compound, and diacid compound residues. In some embodiments, the incorporated urea compound residues are present in an amount less than or equal to 30% mole, specifically less than or equal to 25 mole %, based on the total content of incorporated dihydroxy compound, urea compound, and diacid compound residues.

Melt poly(carbonate-co-urea) and poly(carbonate-co-urea-co-ester) copolymers made in accordance with the methods of the invention can also be readily prepared at not only relatively low but also relatively high molecular weights. In one embodiment, the poly(carbonate-co-urea) and poly(carbonate-co-urea-co-ester) copolymers have a number average molecular weight (Mn) measured relative to polystyrene standards (PS) of between 6,000 g/mol and 150,000 g/mol. In another embodiment, the poly(carbonate-co-urea) and poly(carbonate-co-urea-co-ester) copolymers have a number average molecular weight (Mn) measured relative to polystyrene (PS) of between 8,000 g/mol and 150,000 g/mol.

These same poly(carbonate-co-urea) and poly(carbonate-co-urea-co-ester) copolymers are also structurally different from polyurea (polycarbamide) homopolymers because they contain incorporated dihydroxy compound and diaryl carbonate residues (e.g. carbonate linkages). They also differ from poly(carbonate-co-urethane)s block copolymers because they contain incorporated urea compound residues, such as those having structures (b1) and (b2). In other embodiments, the poly(carbonate-co-urea) and poly(carbonate-co-urea-co-ester) copolymers contain a portion of the incorporated urea compound residues as part of one of the following internal dicarbamate-urea linkages (m1) and/or (m2):

(m1)

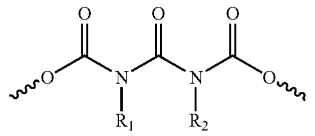

wherein the substituents $R_1$ and $R_2$ are independently each a $C_1$ to $C_{12}$ branched or linear alkyl group, a $C_6$ to $C_{18}$ aromatic group, or a $C_7$ to $C_{36}$ aralkyl group, and (m2)

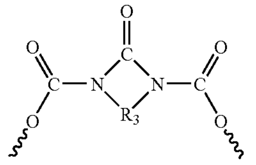

wherein the substituent $R_3$ is a $C_1$ to $C_{12}$ branched or linear aliphatic group, a $C_6$ to $C_{18}$ aromatic group, or a $C_7$ to $C_{36}$ aralkyl group. In yet another embodiment, the poly (carbonate-co-urea) and poly(carbonate-co-urea-co-ester) copolymers are random copolymers.

As a result of their unique chemical structure, the resulting poly(carbonate-co-urea) and poly(carbonate-co-urea-co-ester) copolymer compositions are suited to applications requiring flame retardance and/or chemical resistance properties. Examples of applications requiring flame retardance properties include the exterior housing of such electronic equipment as business machines, personal computers, appliances and televisions. Examples of applications requiring chemical resistance properties include automotive parts, mobile telephone housings, and medical devices.

BRIEF DESCRIPTION OF THE DRAWINGS

FIG. 1 (i) shows the normal desired reaction in the production of polycarbonate using bisphenol A (BPA) as a dihydroxy compound and diphenyl carbonate (DPC) as the diaryl carbonate.

FIG. 1 (ii) shows the normal desired reaction in the production of polycarbonate using bisphenol A (BPA) as a dihydroxy compound and bis(methyl salicyl)carbonate (BMSC) as the activated diaryl carbonate.

FIG. 2 structures (c1)-(c11) show various types of end groups that can form when polycarbonate (PC) is polymerized used bisphenol A and a diaryl carbonate.

FIG. 3 structure (d1) shows the internal ester linkage (IEL) which can form when an ester-substituted diaryl carbonate such as BMSC is used in a reaction with bisphenol A.

FIG. 4 structures (e1)-(e3) show internal Fries linkages that can form in polycarbonates prepared by the melt-transesterification method, especially when non-activated diaryl carbonates like DPC are used.

FIG. 5 shows the reaction in the production of a poly (carbonate-co-urea) copolymer using EU as the urea compound, BPA as the dihydroxy compound, and BMSC as the ester-substituted diaryl carbonate.

FIG. 6 (i) shows the structure (f1) of an internal carbamate $ROC(=O)NR_2$ linkage, for example, as formed by the reaction of one BPA and one diaryl carbonate and one N,N'-ethylene urea (EU).

FIG. 6 (ii) shows this internal carbamate linkage may also be part of the structure (f2), an internal dicarbamate urea linkage contained in an internal carbamate-urea sequence, $ROC(=O)N(R)C(=O)NR_2$.

FIG. 7 (i) shows the FT-IR spectrum of the EU monomer.

FIG. 7 (ii) shows the FT-IR spectrum of a poly(carbonate-co-urea) copolymer prepared using EU, BPA, and BMSC.

FIG. 8 (i) shows the $^1H$ NMR spectrum of the EU monomer.

FIG. 8 (ii) shows the $^1H$ NMR spectrum of a poly(carbonate-co-urea) copolymer prepared using EU, BPA, and BMSC.

FIG. 9 (i) shows the $^{13}C$ decoupled NMR spectrum of the EU monomer.

FIG. 9 (ii) shows the $^{13}C$ decoupled NMR spectrum of a poly(carbonate-co-urea) copolymer prepared using EU, BPA, and BMSC.

FIG. 10 shows the overlay of the GC-FID chromatograms of a hydrolyzed poly(carbonate-co-urea) copolymer prepared using EU, BPA, and BMSC and also the EU monomer demonstrating that the intact EU monomer is present after hydrolysis of the carbonate and carbamate linkages in the copolymer.

FIG. 11 shows the effect of the urea compound content in the melt process formulation on the molecular weight of the poly(carbonate-co-urea) copolymer obtained by the subsequent melt transesterification process.

FIG. 12 shows an apparatus used in preparing some of the examples.

DETAILED DESCRIPTION

Definitions

As used in the specification and claims of this application, the following definitions, should be applied:

The terms “a”, “an”, and “the” as an antecedent refer to either the singular or plural. For example, “a dihydroxy compound” refers to either a single species of compound or a mixture of such species unless the context indicates otherwise.

“End groups” refer to the terminal group on the ends of chains in the poly(carbonate-co-urea) copolymer. FIG. 2 Structures (c1)-(c11) show examples of some of the types of different end groups that can form when polycarbonate (PC) or poly(carbonate-co-urea)s are formed in a melt transesterification using bisphenol A and diaryl carbonates such as diphenyl carbonate or the ester-substituted diaryl carbonyl such as BMSC. The formation of such end groups is described in copending U.S. application Ser. No. 11/427,885. The term “portion of the end groups” refers to a concentration of end groups that is detectable and quantifiable by analytical methods such as NMR spectroscopy, and such “portions of the end groups” are present in concentrations of between about 1 and 99 mole % of the total end groups present and quantifiable by analytical methods such as NMR spectroscopy.

In the specification and claims of this application, the mole % of an end group or type of end group is expressed as a mole percentage of total molar content of the dihydroxy compound, urea compound, diacid compound, and diester compound incorporated in the copolymer. There are several ways of measuring this quantity, and they are discussed below.

"Incorporated monomer residues" refers to monomers that have reacted or been derivatized in the melt polymerization process so that they are covalently bonded into the chemical structure of the resulting copolymer. For example, a urea compound may become incorporated into the poly(carbonate-co-urea) copolymer by reacting with a carbonate end group like a T-MSC end group of a growing copolymer chain. If this incorporated urea compound residue reacts with a second carbonate end group (e.g. T-MSC) or a diaryl carbonate monomer (e.g. BMSC), it will then be incorporated into the backbone of the copolymer chain by means of two internal linkages. There are several methods to determine the quantity of incorporated monomer residues, and they are discussed below. As used herein, the term "portion of the incorporated urea compound residues" refers to a concentration of incorporated urea compound residues that is detectable and quantifiable by analytical methods such as NMR spectroscopy, and such "portions of the incorporated urea compound residues" are present in concentrations of between about 1 and 99 mole % of the total incorporated urea compound residues present and quantifiable by analytical methods such as NMR spectroscopy. It should be noted that the residues of diacid compounds incorporated into the polymer backbone will be indistinguishable from residues obtained from the incorporation of the diester compounds of those same acids upon full conversion of the acid or its corresponding ester. Therefore "incorporated diacid compound residues" will refer here to the residue obtained through the incorporation of a diacid or its diester form.

"Internal linkage" refers to linkages present along the backbone of the copolymer chain, for example, the carbonate linkages between adjacent incorporated dihydroxy compound residues in a polycarbonate polymer or those linkages that form internally in place of the normal carbonate linkage such as when two different monomer residue types (e.g. a dihydroxy compound and a urea compound) are incorporated adjacent to each other in a poly(carbonate-co-urea) copolymer.

"Internal ester carbonate" or "IEL" refers to a linkage derived from an ester-substituted diaryl carbonate that is formed internally in place of the normal carbonate linkage. FIG. 3 Structure (d1) shows the structure of an internal ester carbonate linkage. As used herein, the term "portion of the internal linkages" refers to a concentration of internal linkages that is detectable and quantifiable by analytical methods such as NMR spectroscopy, and such "portions of the internal linkages" are present in concentrations of between about 1 and about 99 mole % of the total internal linkages present and quantifiable by analytical methods such as NMR spectroscopy.

As used herein the term "internal Fries linkages" is defined as the internal linkages of the product poly(carbonate-co-urea) copolymer which upon hydrolysis of the product poly (carbonate-co-urea) copolymer affords a carboxy-substituted dihydroxy aromatic compound bearing a carboxy group adjacent to one or both of the hydroxy groups of the carboxy-substituted dihydroxy aromatic compound. The internal Fries linkages result from the "Fries reaction". For example, in bisphenol A polycarbonate prepared by a melt reaction method in which the Fries reaction occurs, the internal Fries linkages includes those structural features of the polycarbonate which afford 2-carboxy bisphenol A species upon complete hydrolysis of the product polycarbonate. Such internal Fries linkages are shown in FIG. 4 Structures (e1)-(e3).

"Poly(carbonate-co-urea) copolymer" refers to an oligomer or copolymer comprising residues of a dihydroxy compound and a urea compound joined by carbonate and carbamate linkages. In some embodiments, such copolymers will also contain the dicarbamate-urea sequence. In other embodiments, such copolymers will contain internal dicarbamate-urea linkages. A reaction scheme to prepare such a poly (carbonate-co-urea) copolymer from BPA, BMSC and EU is shown in FIG. 5. Note that FIG. 5 shows the reaction of the dihydroxy compound BPA, EU, and BMSC, but they could also be more than one and/or different dihydroxy, urea and diaryl carbonate compounds or monomers. "EU copolymer" refers to a copolymer containing incorporated residues of the monomer N,N'-ethylene urea (EU). "PU copolymer" refers to a copolymer containing incorporated residues of the monomer N,N'-propylene urea (PU). "DCHU copolymer" refers to a copolymer containing incorporated residues of the monomer N,N'-dicyclohexyl-urea (DCHU).

"Poly(carbonate-co-urea-co-ester) copolymer" refers to an oligomer or copolymer comprising residues of a dihydroxy compound, a urea compound and a diacid compound joined by carbonate, carbamate, and ester linkages.

"Carbamate linkage" as used herein refers to the internal linkages found in poly(carbonate-co-urea) and poly(carbonate-co-urea-co-ester) copolymers of the type, ROC(=O)$NR_2$, shown in FIG. 6 (i) Structure (f1). "Internal dicarbamate-urea linkage" as used herein refers to the sequence of internal linkages, ROC(=O)N(R)C(=O)$NR_2$, of the type shown in FIG. 6 (ii) Structure (f2). Note that FIG. 6 (i) Structure (f1) and FIG. 6 (ii) Structure (f2) show incorporated BPA and EU residues, but they could also be residues of different dihydroxy and urea compounds or monomers. In some embodiments, the poly(carbonate-co-urea) and poly-carbonate-co-urea-co-ester) copolymers will contain the dicarbamate-urea sequence. In other embodiments, such copolymers will contain internal dicarbamate-urea linkages.

"Mw (PS) refers to the weight average molecular weight of an oligomer or polymer measured relative to polystyrene (PS) standards. "Mn (PS)" refers to the number average molecular weight of an oligomer or polymer measured relative to polystyrene (PS) standards. In certain embodiments, the poly (carbonate-co-urea) copolymer comprises residues of a dihydroxy compound and a urea compound and has an Mn (PS) of at least 2,000 g/mol, specifically of at least 6,000 g/mol, more specifically of at least 8,000 g/mol. The term "poly(carbonate-co-urea) copolymer" encompasses poly(carbonate-co-urea-co-ester) oligomers and copolymers, as well as oligomers and copolymers containing minor amounts of other monomer types such as diacids, diesters, diamines or mono-hydroxy/mono-acid compounds. Minor amounts refers to less than 50 mole % based on the melt process formulation (copolymers where the majority of the incorporated residues of compounds or monomers other than diaryl carbonates on a molar basis are dihydroxy and urea compounds). The term "poly(carbonate-co-urea-co-ester) copolymer" encompasses oligomers and copolymers containing minor amounts of other monomer types such as diamines or mono-hydroxy/mono-acid compounds. Minor amounts refers to less than 50 mole % based on the melt process formulation (copolymers where the majority of the incorporated residues of compounds or monomers other than diaryl carbonates on a molar basis are dihydroxy, urea, and diacid and/or diester compounds).

"Random copolymer" refers to a copolymer in which the probability of finding a given monomeric unit at any given site in the chain is independent of the nature of the adjacent units. In a random copolymer, the sequence distribution of monomeric units (residues of compounds) follows Bernoullian statistics. As used herein, a copolymer will be considered to be random if the sequence distribution of residues of compounds differs by less than 25% from that predicted by Bernoullian statistics.

"Dihydroxy reaction component" refers to one component of the melt process used in the method of the invention to make poly(carbonate-co-urea) copolymers. The dihydroxy reaction component comprises one or more dihydroxy compounds.

"Carbonate reaction component" refers to a second component of the melt process used in the method of the invention to make poly(carbonate-co-urea) copolymers. The diaryl carbonate reaction component comprises one or more diaryl carbonates. These diaryl carbonates may be activated in some cases by means of activating groups.

"Urea reaction component" refers to a third component of the melt process used in the method of the invention to make poly(carbonate-co-urea) copolymers. The urea reaction component comprises one or more urea compounds.

"Urea compound" refers to compounds characterized by the presence of at least one urea linkage —(N(C═O)N)— in their structure. As used herein, such urea linkages may have a variety of inert substituents such as alkyl, cycloalkyl, aralkyl, and aryl, and these inert substituents may themselves be further substituted by a variety of inert functional groups such as alkyl, cycloalkyl, and aralkyl. "Inert substituents" and "inert functional groups" refer to substituents and functional groups that are not generally reactive under melt transesterification polymerization conditions. Such inert substituents and functional groups are also thermally stable under the conditions of the melt transesterification polymerization, for example, they do not thermally degrade to give undesirable byproducts such as those resulting in either chain-scission or branching reactions or the formation of color bodies causing discoloration of the resulting poly(carbonate-co-urea) or poly(carbonate-co-urea-co-ester) copolymer. Such inert substituents and functional groups will also not appreciably react with the basic catalyst to quench it and thus reduce the reactivity and/or degree of conversion and polymerization, for example, by quenching the basic catalyst in an ion-exchange or acid-base reaction. In addition, these inert substituents and functional groups will not appreciably react with the dihydroxy or diaryl carbonate compounds to create branching sites. By way of example, ether, halogen and carbonyl will be considered to be inert substituents or inert functional groups, whereas carboxylic acid and hydroxyl groups will not be considered to be inert substituents or inert functional groups. Model melt reactions may be conducted in order to determine whether or not a substituent or functional group is inert under melt transesterification polymerization conditions. If the substituent or functional group is not reactive with either BMSC or PCP in the melt and does not become derivatized or generate color when melt-mixed with an equimolar mixture of one or both of those compounds in the presence of a basic catalyst at a temperature between 170 and 200° C. within a period of 1 hour, it will be considered to be inert under melt transesterification polymerization conditions.

"Diacid reaction component" refers to an optional component of the melt process used in the method of the invention to make poly(carbonate-co-urea-co-ester) copolymers. The diacid reaction component comprises one or more diacid compounds. "DDDA" refers to the diacid compound, dodecanedioic acid.

"Diester reaction component" refers to an optional component of the reaction mixture used in the method of the invention to make poly(carbonate-co-urea-co-ester) copolymers. The diester reaction component comprises one or more diester compounds.

"Melt process formulation" refers to the formulation or composition consisting of all of the various reaction components such as carbonate, dihydroxy, urea, diacid, and diester reaction components added throughout the entire melt polymerization process. These various reaction components in the formulation may be added separately or together to the melt process and in one addition step or multiple addition steps and in discrete, continuous or semi-continuous steps.

"Substantial vacuum" refers to a vacuum level to sufficient to distill off more than 1 mole percent of the total molar content of any one diaryl carbonate or dihydroxy, urea, diester, or diacid compound or phenolic byproduct present at that point in the process to the vacuum overhead system.

"Substantial portion of a reaction component" refers to a portion of a reaction component containing at least 50 mole percent of the total compound used in the melt process formulation. For example, a "substantial portion of the urea reaction component" refers to a portion of the urea reaction component that contains at least 50 mole percent of the urea compound that is used in the melt process formulation.

As used herein, the molar ratio of total urea compound to the total molar sum of the dihydroxy and urea compounds, (total moles of urea compound)/((total moles of urea compound)+(total moles of dihydroxy compound)), refers to the molar ratio based on the total amounts of these components as added during the entire melt polymerization process (e.g the composition of the melt process formulation) used to prepare poly(carbonate-co-urea) copolymers. As noted below, there are various factors that can cause a specific reaction to depart from the theoretical molar stoichiometry for the polymerization reaction, including impurities, reduced activity of monomers used in making poly(carbonate-co-urea-co-esters), and these incidental variations are not taken into account in determining the molar ratio.

As used herein, the molar ratio of total urea compound to the total molar sum of the dihydroxy, urea, diacid, and diester compounds, (total moles of urea compound)/((total moles of urea compound)+(total moles of dihydroxy compound)+(total moles of diacid compound)+(total moles of diester compound)), refers to the molar ratio based on the total amounts of these components as added during the entire melt polymerization process (e.g the composition of the melt process formulation) used to prepare poly(carbonate-co-urea-co-ester) copolymers. As noted below, there are various factors that can cause a specific reaction to depart from the theoretical molar stoichiometry for the polymerization reaction, including impurities, reduced activity of monomers used in making poly(carbonate-co-urea-co-esters), and these incidental variations are not taken into account in determining the molar ratio.

As used herein, the molar ratio of diaryl carbonate compound to the sum of the dihydroxy and urea compounds, (moles of diaryl carbonate compound)/(moles of dihydroxy compound)+(moles of urea compound)) refers to the molar ratio based on the total amounts of these components as added during the entire melt polymerization process (e.g the composition of the melt process formulation). As noted below, the presence of any optional components such as chainstoppers, diacids or diesters need to be taken into account in this ratio for determining whether a reaction is normal or “reverse” ratio. As noted below, there are various factors that can cause a specific reaction to depart from the theoretical molar stoichiometry for the polymerization reaction, including impurities, reduced activity of monomers used in making poly (carbonate-co-esters), and these incidental variations are not taken into account in determining the molar ratio.

Numerical values in the specification and claims of this application, particularly as they relate to copolymer compositions, reflect average values for a composition that may contain individual copolymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

Monomeric Raw Materials

In the following discussion of the methods and compositions of the invention, the following materials may be employed:

A. Dihydroxy Compounds

The dihydroxy compound used in the method of the invention may be an aromatic or an aliphatic dihydroxy compound. In certain embodiments, an aromatic dihydroxy compound is selected.

Aliphatic dihydroxy compounds that are suitably used in the present invention include without limitation butane-1,4-diol, 2,2-dimethylpropane-1,3-diol, hexane-1,6-diol, diethylene glycol, triethylene glycol, tetraethylene glycol, octaethylene glycol, dipropylene glycol, N,N-methyldiethanolamine, cyclohexane-1,3-diol, cyclohexane-1,4-diol, 1,4-dimethylolcyclohexane, p-xylene glycol, 2,2-bis(4-hydroxycyclohexyl)propane, and ethoxylated or propoxylated products of dihydric alcohols or phenols such as bis-hydroxyethyl-bisphenol A, bis-hydroxyethyl-tetrachlorobisphenol A and bis-hydroxyethyl-tetrachlorohydroquinone. Other aliphatic dihydroxy compounds include 3,9-bis(2-hydroxyethyl)-2,4,8,10-tetraoxaspiro(5.5)undecane, 3,9-bis(2-hydroxy-1,1-dimethylethyl)-2,4,8,10-tetraoxaspiro(5,5)undecane, 3,9-bis(2-hydroxy-1,1-diethylethyl)-2,4,8,10-tetraoxaspiro(5,5)-undecane, and 3,9-bis(2-hydroxy-1,1-dipropylethyl)-2,4,8,10-tetraoxaspiro(5,5)undecane.

Aromatic dihydroxy compounds that can be used in the present invention are suitably selected from the group consisting of bisphenols having structure (g1), (g1)

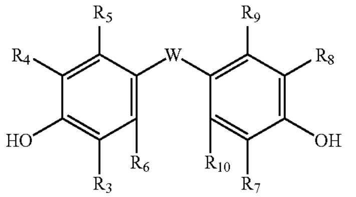

wherein $R_3$ to $R_{10}$ are independently each a hydrogen atom, halogen atom, nitro group, cyano group, $C_1$ to $C_{20}$ alkyl radical, $C_4$ to $C_{20}$ cycloalkyl radical, or $C_6$ to $C_{20}$ aryl radical; W is a bond, an oxygen atom, a sulfur atom, a $SO_2$ group, a $C_1$ to $C_{20}$ aliphatic radical, a $C_6$ to $C_{20}$ aromatic radical, a $C_6$ to $C_{20}$ cycloaliphatic radical, or the group

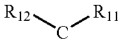

wherein $R_{11}$ and $R_{12}$ are independently each a hydrogen atom, $C_1$ to $C_{20}$ alkyl radical, $C_4$ to $C_{20}$ cycloalkyl radical, or $C_4$ to $C_{20}$ aryl radical; or $R_1$ and $R^{12}$ together form a $C_4$ to $C_{20}$ cycloaliphatic ring which is optionally substituted by one or more $C_1$ to $C_{20}$ alkyl, $C_6$ to $C_{20}$ aryl, $C_5$ to $C_{21}$, aralkyl, $C_5$ to $C_{20}$ cycloalkyl groups, or a combination thereof; dihydroxy benzenes having structure (g2)

(g2)

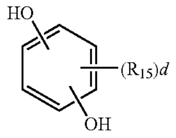

wherein $R_{15}$ is independently at each occurrence a hydrogen atom, halogen atom, nitro group, cyano group, $C_1$ to $C_{20}$ alkyl radical, $C_4$ to $C_{20}$ cycloalkyl radical, or $C_4$ to $C_{20}$ aryl radical, d is an integer from 0 to 4; and dihydroxy naphthalenes having structures (g3) or (g4):

(g3)

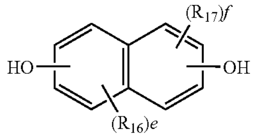

or (g4)

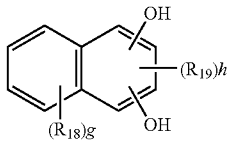

wherein $R_{16}$, $R_{17}$, $R_{18}$ and $R_{19}$ are independently at each occurrence a hydrogen atom, halogen atom, nitro group, cyano group, $C_1$ to $C_{20}$ alkyl radical, $C_4$ to $C_{20}$ cycloalkyl radical, or $C_4$ to $C_{20}$ aryl radical; e and f are integers from 0 to 3, g is an integer from 0 to 4, and h is an integer from 0 to 2.

Suitable bisphenols (g1) are illustrated by 2,2-bis(4-hydroxyphenyl)propane (bisphenol A or BPA); 2,2-bis(3-chloro-4-hydroxyphenyl)propane; 2,2-bis(3-bromo-4-hydroxyphenyl)propane; 2,2-bis(4-hydroxy-3-methylphenyl) propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)-propane; 2,2-bis(3,5-dibromo-4-hydroxyphenyl)propane; 2,2-bis(3,5-dimethyl-4-hydroxyphenyl) propane; 2,2-bis(3-chloro-4-hydroxy-5-methylphenyl) propane; 2,2-bis(3-bromo-4-hydroxy-5-methylphenyl) propane; 2,2-bis(3-chloro-4-hydroxy-5-isopropylphenyl) propane; 2,2-bis(3-bromo-4-hydroxy-5-isopropylphenyl) propane; 2,2-bis(3-t-butyl-5-chloro-4-hydroxyphenyl) propane; 2,2-bis(3-bromo-5-t-butyl-4-hydroxyphenyl) propane; 2,2-bis(3-chloro-5-phenyl-4-hydroxyphenyl) propane; 2,2-bis(3-bromo-5-phenyl-4-hydroxyphenyl)

propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyelohexane; 1,1-bis(3-bromo-4-hydroxy-5-methylphenyl)-3,3,5-trimethyleyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethyleyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4'dihydroxy-1,1-biphenyl; 4,4'-dihydroxy-3,3'-dimethyl-1,1-biphenyl; 4,4'-dihydroxy-3,3'-doctyl-1,1-biphenyl; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl) benzene; and 1,4-bis(2-(4-hydroxy-3-methylphenyl)-2-propyl)benzene; biphenol; bis(3-methyl-4-hydroxyphenyl) cyclohexane; 6,6-dihydroxy-3,3,3',3'-tetramethyl-1,1'-spirobiidane; 4,4'(Octahydro-4,7-mathano-5H-inden-5-ylidene) bisphenol; 3,9-bis(2-hydroxy-1,1-dimethylethyl)-2,4,8,10-tetraoxaspiro(5.5) undecane; 2,2'-Thiobis(4-t-octylphenol); 4,4'-(1-phenylethylidene)bisphenol); thiodiphenol; t-butyl hydroquinone; isosorbide; biscresolfluorene; bisphenolfluorene; 1,3-bis(4-hydroxyphenyl)-p-menthane; 2,8-bis(4-hydroxyphenyl)-p-menthane; 4,4'-(1,3-phenylenediisopropylidene)bisphenol; 9,9-Bis(4-hydroxyphenyl)fluorene or 4,4'-(9-fluorenylidene)diphenol; 9,9-Bis(4-hydroxy-3-methylphenyl)fluorine; 4,4'-(2,2,2-trifluoro-1-(trifluoromethyl)ethylidene)bisphenol (4,4'-(Hexafluoroisopropylidene)diphenol); phenolphthalein anilide; tricyclododecane dimethanol; pentacyclopentadecane dimethanol; 1,4-cyclohexane dimethanol or cyclohexane-1,4-diyldimethanol; 2,6-decahydronaphthalene dimethanol or decahydronaphthalene-2,6-diyldimethanol; norborane dimethanol; and phenolphthanilide.

Suitable dihydroxy benzenes (g2) are illustrated by hydroquinone, resorcinol, methylhydroquinone, butylhydroquinone, phenylhydroquinone, 4-phenylresorcinol and 4-methylresorcinol.

Suitable dihydroxy naphthalenes ((g3) and (g4)) are illustrated by 2,6-dihydroxy naphthalene; 2,6-dihydroxy-3-methyl naphthalene; 2,6-dihydroxy-3-phenyl naphthalene; 1,4-dihydroxy naphthalene; 1,4-dihydroxy-2-methyl naphthalene; 1,4-dihydroxy-2-phenyl naphthalene and 1,3-dihydroxy naphthalene.

The relative amounts of monomers are selected based on the desired composition of the melt mixtures or oligomers. If other comonomers are used, they can be introduced to the melt reaction system as part of the same feed, in a separate feed, or both.

The poly(carbonate-co-urea) copolymers formed from these monomers may be homopolymers, random copolymers, or random block copolymers. To form random block copolymers, preformed oligomer or copolymer blocks with appropriate end groups (diols, diacids, diesters, etc.) are used as co-reactants in the polymerization process.

Examples of suitable dihydroxy compounds and combinations of dihydroxy compounds for use in the present invention include bisphenol A (BPA); hydroquinone; methyl hydroquinone; 4,4'-biphenyl sulfone; biphenol; bis(3-methyl-4-hydroxyphenyl) cyclohexane; 6,6-dihydroxy-3,3,3',3'-tetramethyl-1,1'-spirobiidane; 4,4'(Octahydro-4,7-mathano-5H-inden-5-ylidene) bisphenol; 3,9-bis(2-hydroxy-1,1-dimethylethyl)-2,4,8,10-tetraoxaspiro(5.5)undecane; 2,2'-Thiobis(4-t-octylphenol); 4,4'-(1-phenylethylidene) bisphenol); thiodiphenol; t-butyl hydroquinone; isosorbide; biscresolfluorene; bisphenolfluorene; 1,3-bis(4-hydroxyphenyl)-p-menthane; 2,8-bis(4-hydroxyphenyl)-p-menthane; 4,4'-(1,3-phenylenediisopropylidene)bisphenol; 9,9-Bis(4-hydroxyphenyl)fluorene or 4,4'-(9-fluorenylidene)diphenol; 9,9-Bis(4-hydroxy-3-methylphenyl)fluorine; 4,4'-(2,2,2-trifluoro-1-(trifluoromethyl)ethylidene)bisphenol (4,4'-(Hexafluoroisopropylidene)diphenol); phenolphthalein anilide; tricyclododecane dimethanol; pentacyclopentadecane dimethanol; 1,4-cyclohexane dimethanol or cyclohexane-1,4-diyldimethanol; 2,6-decahydronaphthalene dimethanol or decahydronaphthalene-2,6-diyldimethanol; norborane dimethanol; and phenolphthanilide.

B. Diaryl Carbonate

The diaryl carbonates used in the method of the invention are of the general structure (h1):

(h1)

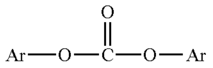

wherein Ar is independently at each occurrence an optionally-substituted aromatic radical having 6 to 30 carbon atoms. As explained in the next section on activated diaryl carbonates, these substituents may be either activating or non-activating. Some non-limiting examples of non-activating groups, which would not be expected to result in activated diaryl carbonates, are alkyl and cycloalkyl. Some examples of diaryl carbonates include diphenyl carbonate, ditolyl carbonate, bis-m-cresyl carbonate, dinaphthyl carbonate, and diphenyl carbonate. In one embodiment of an industrial process, diphenyl carbonate (DPC) is used.

C. Activated Diaryl Carbonate

As used herein the term "activated diaryl carbonate" is defined as a diaryl carbonate which is more reactive than diphenyl carbonate toward transesterification reactions. Such activated diaryl carbonates are of the general structure (h2):

(h2)

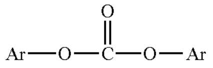

wherein Ar is independently at each occurrence an aromatic radical having 6 to 30 carbon atoms and substituted with one or more electron-withdrawing substituent groups. In some embodiments, activated diaryl carbonates have the more specific general structure (h3):

(h3)

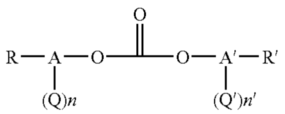

wherein Q and Q' are each independently activating groups. A and A' are each independently aromatic rings which can be the same or different depending on the number and location of their substituent groups, and n and n' are whole numbers of zero up to a maximum equivalent to the number of replaceable hydrogen groups substituted on the aromatic rings A and A', wherein n+n' is greater than or equal to 1. R and R' are each independently substituent groups such as alkyl, substituted alkyl, cycloalkyl, alkoxy, aryl, alkylaryl having from 1 to 30 carbon atoms, cyano, nitro, halogen, and carboalkoxy. The number of R groups is a whole number and can be 0 up to a maximum equivalent to the number of replaceable hydrogen groups on the aromatic rings A minus the number n. The number of R' groups is a whole number and can be 0 up to a maximum equivalent to the number of replaceable hydrogen groups on the aromatic rings A minus the number n'. The number and type of the R and R' substituents on the aromatic ring are not limited unless they deactivate the diaryl carbonate and lead to a diaryl carbonate which is less reactive than diphenyl carbonate. Typically, the location of the R and R' substituents on the aromatic ring are any one or any combination of the para and/or two ortho positions.

Non-limiting examples of activating groups Q and Q' are: alkoxycarbonyl groups, halogens, nitro groups, amide groups, sulfone groups, sulfoxide groups, imine groups, or cyano groups. In one embodiment, the activating groups Q and Q' have the structures (i1) or (i2) indicated below, where Y is a C, N, or S atom or S═O group, Z is a O or N atom, $R_1$ is a N-dialkyl, alkyl, aryl, aralkyl, alkyloxy, aryloxy, or aralkyloxy group, and $R_2$ is an alkyl, aryl, or aralkyl:

(i1)

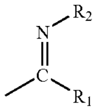

(i2)

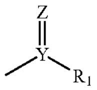

Specific and non-limiting examples of activated diaryl carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl) carbonate, bis(o-formylphenyl)carbonate, and bis(o-cyanophenyl)carbonate. Unsymmetrical combinations of these structures, where the substitution number and type on A and A' are different, are also possible to employ in the current invention. A specific structure for an activated diaryl carbonate is an ester-substituted diaryl carbonate having the structure (h4):

(h4)

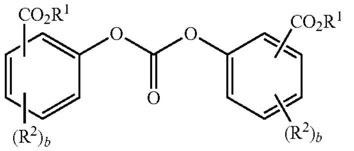

wherein $R^1$ is independently at each occurrence a $C_1$ to $C_{20}$ alkyl radical, $C_4$ to $C_{20}$ cycloalkyl radical, or $C_4$ to $C_{20}$ aromatic radical; $R^2$ is independently at each occurrence a halogen atom, cyano group, nitro group, $C_1$ to $C_{20}$ alkyl radical, $C_4$ to $C_{20}$ cycloalkyl radical, $C_4$ to $C_{20}$ aromatic radical, $C_1$ to $C_{20}$ alkoxy radical, $C_4$ to $C_{20}$ cycloalkoxy radical, $C_4$ to $C_{20}$ aryloxy radical, $C_1$ to $C_{20}$ alkylthio radical, $C_4$ to $C_{20}$ cycloalkylthio radical, $C_4$ to $C_{20}$ arylthio radical, $C_1$ to $C_{20}$ alkylsulfinyl radical, $C_4$ to $C_{20}$ cycloalkylsulfinyl radical, $C_4$ to $C_{20}$ arylsulfinyl radical, $C_1$ to $C_{20}$ alkylsulfonyl radical, $C_4$ to $C_{20}$ cycloalkylsulfonyl radical, $C_4$ to $C_{20}$ arylsulfonyl radical, $C_1$ to $C_{20}$ alkoxycarbonyl radical, $C_4$ to $C_{20}$ cycloalkoxycarbonyl radical, $C_4$ to $C_{20}$ aryloxycarbonyl radical, $C_2$ to $C_{60}$ alkylamino radical, $C_6$ to $C_{60}$ cycloalkylamino radical, $C_5$ to $C_{60}$ arylamino radical, $C_1$ to $C_{40}$ alkylaminocarbonyl radical, $C_4$ to $C_{40}$ cycloalkylaminocarbonyl radical, $C_4$ to $C_{40}$ arylaminocarbonyl radical, or $C_1$ to $C_{20}$ acylamino radical; and b is independently at each occurrence an integer from 0 to 4. In one embodiment, at least one of the substituents $CO_2R^1$ is attached in an ortho position relative to the carbonate group.

Examples of specific ester-substituted diaryl carbonates include but are not limited to bis-(methylsalicyl)carbonate (CAS Registry No. 82091-12-1), bis-(ethylsalicyl)carbonate, bis-(propylsalicyl) carbonate, bis-(butylsalicyl) carbonate, bis-(benzylsalicyl)carbonate, bis-(methyl 4-chlorosalicyl) carbonate and the like. Typically bis-(methylsalicyl)carbonate is selected for use in melt polycarbonate synthesis due to its preparation from less expensive raw materials, lower molecular weight and higher vapor pressure.

One method for determining whether a certain diaryl carbonate is activated or not is to carry out a model transesterification reaction between the certain diaryl carbonate with a phenol such as para-cumyl phenol. This phenol is often selected because it possesses only one reactive site, low volatility, and a similar reactivity to bisphenol A (BPA). The model transesterification reaction may be carried out at temperatures above the melting points of the certain diaryl carbonate and para-cumyl phenol or that of their mixture in the model reaction and in the presence of a transesterification catalyst, which is usually an aqueous solution of sodium hydroxide or sodium phenoxide. Specific concentrations of the transesterification catalyst are about 0.001 mole % based on the number of moles of the phenol or diaryl carbonate. A specific reaction temperature range is from 170 to 200° C., and a specific temperature is 200° C. The choice of conditions and catalyst concentration can be adjusted depending on the reactivities, melting points and volatilities of the reactants to provide a convenient reaction rate. The only limitation to reaction temperature is that the temperature must be below the degradation temperature of the reactants and should be also below their boiling points. Sealed tubes can be used if the reaction temperatures cause the reactants to volatilize and affect the reactant molar balance or reaction stoichiometry. The determination of the equilibrium concentration of reactants is accomplished through reaction sampling during the course of the reaction and then analysis of the reaction mixture using other well-known detection methods such as GC (gas chromatography), HPLC (high pressure liquid chromatography), or IR (infrared) or NMR spectroscopies. Particular care needs to be taken so that reaction does not continue after the sample has been removed from the reaction vessel. This is accomplished by cooling down the sample in an ice bath and by employing a reaction quenching acid such as acetic acid in the water phase of the HPLC solvent system. A reaction quenching acid may also be introduced directly into the reaction sample in addition to cooling the reaction mixture. A specific concentration for the acetic acid in the water phase of the HPLC solvent system is 0.05% (v/v). The equilibrium constant can be determined from the concentration of the reactants and product when equilibrium is reached. Equilibrium is assumed to have been reached when the concentration of components in the reaction mixture reach a point of little or no change on sampling of the reaction mixture. The equilibrium constant can be determined from the concentration of the reactants and products at equilibrium by methods well known to those skilled in the art. A diaryl carbonate which possesses an equilibrium constant of greater than 1 is considered to possess a more favorable equilibrium than diphenyl carbonate and is an activated diaryl carbonate, whereas a diaryl carbonate which possesses an equilibrium constant of 1 or less is considered to possess the same or a less favorable equilibrium than diphenyl carbonate and is considered not to be activated. Specifically an activated diaryl carbonate with very high reactivity compared to diphenyl carbonate may be used when conducting transesterification reactions. More specifically, activated diaryl carbonates with an equilibrium constant greater than at least 10 times that of diphenyl carbonate (DPC) may be employed.

Some non-limiting examples of non-activating groups which, when present in an ortho position relative to the carbonate group, would not be expected to result in activated diaryl carbonates are alkyl and cycloalkyl. Some specific and non-limiting examples of non-activated diaryl carbonates are bis(o-methylphenyl)carbonate, bis(p-cumylphenyl)carbonate, and bis(p-(1,1,3,3-tetramethyl)butylphenyl)carbonate. Unsymmetrical combinations of these structures are also expected to result in non-activated diaryl carbonates.

Unsymmetrical diaryl carbonates wherein one aryl group is activated and one aryl is unactivated or de-activated would also be useful in this invention if the activating group renders the diaryl carbonate still more reactive than diphenyl carbonate.

D. Urea Compound i. Structure of the Urea Compound

The urea compounds used in the invention are characterized by the presence of at least one urea linkage —(N(C═O)N)— in their structure. As used herein, such urea linkages may have a variety of inert substituents such as alkyl, cycloalkyl, aralkyl, and aryl, and these inert substituents may themselves be further substituted by a variety of inert functional groups such as alkyl, cycloalkyl, aralkyl, halogen and carbonyl.

In one embodiment, the urea compound is a compound of the following structure (a1), (a1)

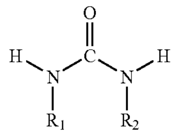

wherein the substituents $R_1$ and $R_2$ are independently each a $C_1$ to $C_{12}$ branched or linear alkyl group, a $C_6$ to $C_{18}$ aromatic group, or a $C_7$ to $C_{36}$ aralkyl group.

(a2)

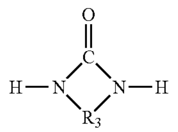

In a second embodiment, the urea compound is a compound of structure (a2), wherein the substituent $R_3$ is a $C_1$ to $C_{12}$ branched or linear aliphatic group, a $C_6$ to $C_{18}$ aromatic group, or a $C_7$ to $C_{36}$ aralkyl group. In another embodiment, the substituent $R_3$ is a $C_2$ to $C_{12}$ aliphatic group.

Because the urea compounds are difunctional and react with the carbonate functional groups rather than the hydroxy functional groups in the reaction mixture, the urea compounds will be counted together with the dihydroxy compounds when calculating the levels of catalyst used, as discussed later in the sub-section E on transesterification catalysts, and also when calculating reaction stoichiometry to determine whether or not a polymerization reaction is "normal" or "reverse" ratio, as discussed later in the section entitled "formation of poly(carbonate-co-urea) copolymers".

Specific and non-limiting examples of suitable urea compounds include 7,7,9,9-tetramethyl-3,8-triazaspiro(4.5)decane-2,4-dione; 1,3-diazaspiro(4.5)decane-2,4-dione; 1H-imidazole-4-carboxylic acid, 2,3-dihydro-5-methyl-2-oxo-, ethyl ester; 2,3-dihydro-5-methyl-e-2-dioxo-1H-imidazole-4-hexanoic acid; 1H-imidazole-4-hexanoic acid, 2,3-dihydro-5-methyl-e,2-dioxo-, ethyl ester; 7,9-dihydro-1H-purine-2,6,8(3H)-trione (uric acid); 7,9-dihydro-1,3-dimethyl-1H-purine-2,6,8(3H)-trione (1,3-dimethyl-uric acid); 7,9-dihydro-1-methyl-1H-purine-2,6,8(3H)-trione (1-methyl-uric acid); 7,9-dihydro-3-methyl-1H-purine-2,6,8(3H)-trione (3-methyl-uric acid); 2-amino-7,9-dihydro-1H-purine-6,8-dione; 7,9-dihydro-1H-purine-6,8-dione (6,8-Purinediol); 2,3,4,6-tetrahydro-2-oxo-(R)-1H-thieno(3,4-d)imidazole-4-pentanoic acid; hexahydro-2-oxo-(3aS,4S,6aR)-1H-thieno(3,4-d)imidazole-4-pentanoic acid (biotin); 2,4-imidazolidinedione (hydantoin); 5-(1,3-benzodioxol-5-ylmethyl)-5-methyl-2,4-imidazolidinedione (5-methyl-5-piperonyl-hydantoin); 5-(1-methylethyl)-2,4-imidazolidinedione (5-isopropyl-hydantoin); 5-(3-hydroxyphenyl)-5-phenyl-2,4-imidazolidinedione (5-(m-hydroxyphenyl)-5-phenyl-hydantoin); 5-(4-bromobutyl)-2,4-imidazolidinedione (5-(4-bromobutyl)-hydantoin); 5-(4-hydroxybutyl)-2,4-imidazolidinedione (5-(4-hydroxybutyl)-hydantoin); 5-(4-hydroxyphenyl)-2,4-imidazolidinedione (5-(p-hydroxyphenyl)-hydantoin); 5-(4-hydroxyphenyl)-5-phenyl-2,4-imidazolidinedione (5-(p-hydroxyphenyl)-5-phenyl-hydantoin); 5-(4-methylphenyl)-5-phenyl-2,4-imidazolidinedione (5-phenyl-5-p-tolyl-hydantoin); 5-(phenylmethyl)-2,4-imidazolidinedione (5-benzyl-hydantoin); 5,5-dimethyl-2,4-imidazolidinedione (5,5-dimethyl-hydantoin); 5-((3,4-dimethoxyphenyl)methyl)-5-methyl-2,4-Imidazolidinedione; 5-ethyl-5-methyl-2,4-imidazolidinedione; 5-ethyl-5-phenyl-2,4-imidazolidinedione; 5-methyl-2,4-imidazolidinedione; 5-methyl-5-phenyl-2,4-imidazolidinedione; 5-phenyl-2,4-imidazolidinedione; 1,3-dihydro-2H-benzimidazol-2-one (2-benzimidazolinone); 1,3-dihydro-5,6-dimethyl-2H-benzimidazol-2-one; 5,6-diamino-1,3-dihydro-2H-benzimidazol-2-one; 5-amino-1,3-dihydro-2H-benzimidazol-2-one; 1,3-dihydro-4-methyl-2H-imidazol-2-one; 2-imidazolidinone; 4,5-dihydroxy-2-imidazolidinone; 4,5-dimethoxy-2-imidazolidinone; N-(2,3-dihydro-2-oxo-1H-benzimidazol-5-yl)-3-hydroxy-2-naphthalenecarboxamide; 2,5-dioxo-4-imidazolidineacetic acid; 2-oxo-4-imidazolidinecarboxylic acid; 5-methyl-2-oxo-, (4R,5S)-4-imidazolidinehexanoic acid; 2,6-diamino-1,7-dihydro-8H-purin-8-one; N-(2,3-dihydro-2-oxo-1H-benzimidazol-5-yl)-3-oxo-butanamide, tetrahydro-imidazo(4,5-d)imidazole-2,5(1H,3H)-dione (glycoluril); tetrahydro-1-methyl-imidazo(4,5-d)dimidazole-2,5((H, 3H)-dione (1-methyl-glycoluril); imidazolidinetrione (parabanic acid); 3',4"-dihydro-spiro(imidazolidine-4,2'(1'H)-naphthalene)-2,5-dione; (2,5-dioxo-4-imidazolidinyl)-urea; 5,5'-dihydroxy-(5,5'-bipyrimidine)-2,2',4,4',6,6'(1H,1'H,3H,3'H,5H,5'H)-hexone (5,5'-dihydroxyy-5,5'-bibarbituric acid); 1H-1,2,3-triazolo(4,5-d)pyrimidine-5,7(4H,6H)-dione; 7,9-dihydro-1H-purine-2,6,8(3H)-trione (uric acid); 7,9-dihydro-9-methyl-1H-purine-2,6,8(3H)-trione (9-methyl-uric acid); 3,7-dihydro-1H-purine-2,6-dione (xanthine); 3,7-dihydro-7-methyl-1,1H-purine-2,6-dione (heteroxanthine); 3,7-dihydro-8-methyl-1H-purine-2,6-dione (8-methyl-xanthine); 3,9-dihydro-9-methyl-1H-purine-2,6-dione (9-methyl-xanthine); 1H-pyrazolo(3,4-d)pyrimidine-4,6(5H, 7H)-dione; tetrahydro-2(1H)-pyrimidinone (1,3 propanediamine cyclic urea); tetrahydro-4-hydroxy-5,5-dimethyl-6-(1-methylethyl)-2(1H)-pyrimidinone; tetrahydro-5-hydroxy-2(1H)-pyrimidinone (5-hydroxypropyleneurea); 2,4(1H,3H)-pyrimidinedione (uracil); 5,6-diamino-2,4(1H,3H)-pyrimidinedione (5,6-diamino-uracil); 5,6-dimethyl-2,4(1H,3H)-pyrimidinedione (5,6-dimethyl-uracil); 5-amino-2,4(1H,3H)-pyrimidinedione (5-amino-uracil); 5-amino-6-methyl-2,4(1H,3H)-pyrimidinedione (5-amino-6-methyl-uracil); 5-bromo-6-methyl-2,4(1H,3H)-pyrimidinedione (5-bromo-6-methyl-uracil); 5-bromodihydro-5-methyl-2,4(1H,3H)-pyrimidinedione (5-bromo-5-methyl-hydrouracil); 5-chloro-6-methyl-2,4(1H,3H)-pyrimidinedione (5-chloro-6-methyl-uracil); 6-(chloromethyl)-2,4(1H,3H)-pyrimidinedione (6-(chloromethyl)-uracil); 6-amino-2,4(1H,3H)-pyrimidinedione (6-amino-uracil); 6-amino-5-bromo-2,4(1H,3H)-pyrimidinedione (6-amino-5-bromo-uracil); 6-amino-5-nitroso-2,4(1H,3H)-pyrimidinedione (6-amino-5-nitroso-uracil); 6-methyl-2,4(1H,3H)-pyrimidinedione (6-methyl-uracil); dihydro-2,4(1H,3H)-pyrimidinedione (hydrouracil), dihydro-5-methyl-2,4(1H,3H)-pyrimidinedione (5-methyl-hydrouracil); dihydro-6-methyl-2,4(1H,3H)-pyrimidinedione (6-methyl-hydrouracil); 2,4(1H,3H)-quinazolinedione (benzoyleneurea); 6,7-dimethoxy-2,4(1H,3H)-quinazolinedione; dihydro-2,4,5(3H)-pyrimidinetrione (isobarbituric acid); 2,4,5,6(1H,3H)-pyrimidinetetrone (alloxan); 5-oxime-2,4,5,6(1H,3H)-pyrimidinetetrone (violuric acid); 2,4,6(1H,3H,5H)-pyrimidinetrione (barbituric acid); 5-(1-cyclohexen-1-yl)-5-ethyl-2,4,6(1H,3H,5H)-pyrimidinetrione (5-(1-cyclohexen-1-yl)-5-ethyl-barbituric acid); 5-(1-methylbutyl)-5-(2-propenyl)-2,4,6(1H,3H,5H)-pyrimidinetrione; 5-(1-methylethyl)-2,4,6(1H,3H,5H)-pyrimidinetrione; 5-(1-methylethyl)-5-(2-propenyl)-2,4,6(1H,3H,5H)-pyrimidinetrione; 5-(1-methylpropyl)-5-(2-propenyl)-2,4,6(1H,3H,5H)-pyrimidinetrione; 5-(2-cyclopenten-1-yl)-5-(2-propenyl)-2,4,6(1H,3H,5H)-pyrimidinetrione; 5-(2-methylpropyl)-2,4,6(1H,3H,5H)-pyrimidinetrione; 5-(2-methylpropyl)-5-(2-propenyl)-2,4,6(1H,3H,5H)-pyrimidinetrione; 5-(2-propenyl)-2,4,6(1H,3H,5H)-pyrimidinetrione; 5,5-di-2-propenyl-2,4,6(1H,3H,5H)-pyrimidinetrione; 5,5-dibromo-2,4,6(1H,3H,5H)-pyrimidinetrione; 5,5-diethyl-2,4,6(1H,3H,5H)-pyrimidinetrione; 5,5-dihydroxy-2,4,6(1H,3H,5H)-pyrimidinetrione; 5,5-dipropyl-2,4,6(1H,3H,5H)-pyrimidinetrione; 5-((4-methoxyphenyl)methylene)-2,4,6(1H,3H,5H)-pyrimidinetrione; 5-(4-(dimethylamino)phenyl)methylene)-2,4,6(1H,3H,5H)-pyrimidinetrione; 5-amino-2,4,6(1H,3H,5H)-pyrimidinetrione; 5-butyl-2,4,6(1H,3H,5H)-pyrimidinetrione; 5-butyl-5-ethyl-2,4,6(1H,3H,5H)-pyrimidinetrione; 5-chloro-2,4,6(1H,3H,5H)-pyrimidinetrione; 5-ethyl-2,4,6(1H,3H,5H)-pyrimidinetrione; 5-ethyl-5-(1-methylbutyl)-2,4,6(1H,3H,5H)-pyrimidinetrione; 5-ethyl-5-(1-methylpropyl)-2,4,6(1H,3H,5H)-pyrimidinetrione; 5-ethyl-5-(3-methylbutyl)-2,4,6(1H,3H,5H)-pyrimidinetrione; 5-ethyl-5-(4-methylphenyl)-2,4,6(1H,3H,5H)-pyrimidinetrione; 5-ethyl-5-phenyl-2,4,6(1H,3H,5H)-pyrimidinetrione; 5-hydroxy-2,4,6(1H,3H,5H)-pyrimidinetrione (dialuric acid); 5-phenyl-5-(2-propenyl)-2,4,6(1H,3H,5H)-pyrimidinetrione; 6-amino-1,3-dihydro-2H-purin-2-one (isoguanine); 1,2,3,6-tetrahydro-2,6-dioxo-4-pyrimidineacetic acid; 1,2,3,6-tetrahydro-2,6-dioxo-4-pyrimidinecarboxylic acid (orotic acid); 1,2,3,6-tetrahydro-5-methyl-2,6-dioxo-4-pyrimidinecarboxylic acid; 5-methyl-orotic acid; 5-amino-1,2,3,6-tetrahydro-2,6-dioxo-4-pyrimidinecarboxylic, acid; 4-amino-1,5-dihydro-6H-pyrazolo(3,4-d)pyrimidin-6-one; N-(carboxymethyl)-N-(hexahydro-2,4,6-trioxo-5-pyrimidinyl)-glycine;

(hexahydro-6-methyl-2-oxo-4-pyrimidinyl)-urea; xanthosine; 8-bromo-xanthosine; 7,7'-(carbonyldiimino)bis(4-hydroxy-2-naphthalenesulfonic acid; N,N'-carbonylbis-acetamide; N,N'-diphenyl-urea (carbanilide); N,N'-bis(2-methylphenyl)-urea; N,N'-bis(3,4-dichlorophenyl)-urea; N-(4-chlorophenyl)-N'-(3,4-dichlorophenyl)-urea; N-(4-chlorophenyl)-N'-(4-chloro-3-(trifluoromethyl)phenyl)-urea; N,N'-bis(4-methylphenyl)-urea; N,N''-(methylenedi-4,1-phenylene)bis(N'-phenyl)-urea; diimidotricarbonic diamide; N-(2-hydroxyethyl)-N'-phenyl-urea; N-(2-methylcyclohexyl)-N'-phenyl-urea; N-(3,4-dichlorophenyl)-N'-methyl-urea; N,N'-bis(2,2,2-trichloro-1-hydroxyethyl)-urea; N,N'-bis(hydroxymethyl)-urea; N,N'-di-1-naphthalenyl-urea; N,N'-di-6-quinolinyl-urea; N,N'-di-2-propenyl-urea; N,N'-bis(phenylmethyl)-urea; N,N''-(methylene-di-4,1-phenylene)bis(N'-phenyl)-urea; diimidotricarbonic diamide; N-2-benzothiazolyl-N'-methyl-urea; N-(2-hydroxyethyl)-N'-phenyl-urea; N-(2-methylcyclohexyl)-N'-phenyl-urea; N-(3,4-dichlorophenyl)-N'-methyl-urea; N,N'-bis(2,2,2-trichloro-1-hydroxyethyl)-urea; N,N'-bis(hydroxymethyl)-urea; N,N'-di-1-naphthalenyl-urea; N,N'-di-6-quinolinyl-urea; N,N'-di-2-propenyl-urea; N,N'-bis(phenylmethyl)-urea; N,N'-dibutyl-urea; N,N'-dicyclohexyl-urea (DCHU); N,N'-diethyl-urea; N,N'-bis(1-methylethyl)-urea; N,N'-dimethyl-urea; N,N'-dioctadecyl-urea; N,N'-dipropyl-urea; N,N'-di-9H-xanthen-9-yl-urea; N-((acetylamino)carbonyl)-2-bromo-2-ethyl-butanamide; N-((methylamino)carbonyl)-acetamide; N-((phenylamino)carbonyl)-acetamide; N-methyl-N'-(2,2,2-trichloro-1-hydroxyethyl)-urea; and N-octadecyl-N'-phenyl-urea.

Specific examples of urea compounds for use in the present invention include: N,N'-ethylene urea (EU), N,N'-propylene urea (PU), tetrahydro-2-pyrimidone, barbituric acid, N,N'-dicyclohexyl-urea (DCHU), glycoluril, 2-Benzimidazolinone, uric acid, xanthine, uracil, hydrouracil, alloxan, dialuric acid, dilituric acid, isoguanine, orotic acid, xanthosine, carbanilide, and hydantoin.

ii. Purification and Purity of the Urea Compound

The inventors have found that in some embodiments it may be desirable to purify the urea compound before it is used in the melt polymerization in order to increase its organic purity and/or reduce its content of metallic species. Such purification of the urea compound may improve its reactivity in the melt polymerization and/or the color of the resulting copolymer. For example, the inventors found that one commercial source of EU had insufficient reactivity unless it was first purified by solvent recrystallization. Different standard purification methods such as distillation, solvent recrystallization, or absorption columns, may be used depending on the particular properties of the specific urea compound. For example, thermally-stable and volatile compounds may be purified by distillation, and soluble compounds may be purified through the use of solvent recrystallization processes or absorption columns.

The organic purity of the urea compound may be measured by standard methods such as GPC or HPLC analysis. The choice of the analytical method may depend on the properties of the urea compound, such as its thermal-stability, volatility, and solubility. In one embodiment the urea compound used to create the melt mixture has an organic purity of more than 99%. In another embodiment, the purity of the urea compound is more than 99.5%. In still another embodiment, the urea compound is more than 99.7% pure.

The metal content of the urea compound may be measured by standard methods such as Inductively Coupled Plasma (ICP) or Atomic Absorption Spectroscopy (AAS) analysis. It may be desirable to remove transition metal, alkaline earth and alkali metal species in order to minimize discoloration of the resulting copolymer and/or undesired side reactions and byproducts from occurring in the polymerization process. In one embodiment, the urea compound used to create the melt mixture contains less than 4 parts per million (ppm) total of chromium (Cr), iron (Fe), nickel (Ni), manganese (Mn), zinc (Zn), and potassium (K) metals as measured by ICP analysis. In a second embodiment, the urea compound contains less than 3 ppm total of Cr, Fe, Ni, Mn, Zn, and K metals as measured by ICP analysis. In a third embodiment, the urea compound contains less than 2 ppm total of Cr, Fe, Ni, Mn, Zn, and K metals as measured by ICP analysis. In a fourth embodiment, the urea compound contains less than 1.5 ppm total of Cr, Fe, Ni, Mn, Zn, and K metals as measured by ICP analysis.

E. Transesterification Catalysts

The method of the invention also comprises the step of introducing a catalyst to the melt reaction system to initiate a polymerization reaction. The catalyst may be introduced continuously, or may be introduced batchwise and may be introduced before, during or after the introduction of the dihydroxy compound, urea compound, or the diaryl carbonate to the melt reaction system.

The catalyst may be a base, and optionally comprises at least one source of alkaline earth ions or alkali metal ions, and/or at least one quaternary ammonium compound, a quaternary phosphonium compound or a mixture thereof. The source of alkaline earth ions or alkali metal ions being used in an amount such that the amount of alkaline earth or alkali metal ions present in the reaction mixture is in a range between about $1\times10^{-5}$ and about $1\times10^{-8}$ moles alkaline earth or alkali metal ion per mole of dihydroxy compound employed. If activated diaryl carbonates are used, quaternary ammonium compounds are often selected instead of quaternary phosphonium compounds.

The quaternary ammonium compound is selected from the group of organic ammonium compounds having the structure (1)

(j1)

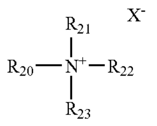

wherein $R^{20}$ to $R^{23}$ are independently each a $C_1$ to $C_{20}$ alkyl radical, $C_4$ to $C_{20}$ cycloalkyl radical, or a $C_4$ to $C_{20}$ aryl radical; and $X^-$ is an organic or inorganic anion. In one embodiment, anion $X^-$ is selected from the group consisting of hydroxide, halide, carboxylate, sulfonate, sulfate, formate, carbonate, and bicarbonate.

Non-limiting examples of suitable organic ammonium compounds are tetramethyl ammonium hydroxide, tetrabutyl ammonium hydroxide, tetramethyl ammonium acetate, tetramethyl ammonium formate and tetrabutyl ammonium acetate. In one embodiment, tetramethyl ammonium hydroxide is selected.

The quaternary phosphonium compound is selected from the group of organic phosphonium compounds having the structure (j2):

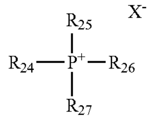

(j2)

wherein $R_{24}$ to $R_{27}$ are independently a $C_1$ to $C_{20}$ alkyl radical, $C_4$ to $C_{20}$ cycloalkyl radical, or a $C_4$ to $C_{20}$ aryl radical; and $X^-$ is an organic or inorganic anion. In one embodiment anion $X^-$ is an anion selected from the group consisting of hydroxide, halide, carboxylate, sulfonate, sulfate, formate, carbonate, and bicarbonate. Suitable organic phosphonium compounds are illustrated by tetramethyl phosphonium hydroxide, tetramethyl phosphonium acetate, tetramethyl phosphonium formate, tetrabutyl phosphonium hydroxide, and tetrabutyl phosphonium acetate (TBPA). In one embodiment, TBPA is selected.

Where $X^-$ is a polyvalent anion such as carbonate or sulfate it is understood that the positive and negative charges in the above structures are properly balanced. For example, where $R^{20}$ to $R^{23}$ in the structure (1) are each methyl groups and $X^-$ is carbonate, it is understood that $X^-$ represents ½ $(CO_3^{-2})$.

Suitable sources of alkaline earth ions include alkaline earth hydroxides such as magnesium hydroxide and calcium hydroxide. Suitable sources of alkali metal ions include the alkali metal hydroxides illustrated by lithium hydroxide, sodium hydroxide and potassium hydroxide. Other sources of alkaline earth and alkali metal ions include salts of carboxylic acids, such as sodium acetate and derivatives of ethylene diamine tetraacetic acid (EDTA) such as EDTA tetrasodium salt and EDTA magnesium disodium salt. In one embodiment, sodium hydroxide is selected.

In order to achieve the formation of poly(carbonate-co-urea) copolymers, an effective amount of catalyst must be employed. In this determination of the effective amount of catalyst, any difunctional urea compounds will be counted together with the difunctional dihydroxy compound. The amount of catalyst employed is typically based upon the total number of moles of the dihydroxy and urea compounds employed in the polymerization reaction. In the preparation of poly(carbonate-co-urea-co-ester) copolymers the amount of catalyst is based upon the total number of moles of the dihydroxy, urea, and diacid compounds employed in the polymerization reaction. The presence of any further difunctional compound that can react with two BMSC molecules will be counted together with the difunctional dihydroxy and urea compounds. For example, when referring to the ratio of catalyst, for example, phosphonium salt $O_2$), to all dihydroxy, urea, and diacid compounds employed in the polymerization reaction to prepare a poly(carbonate-co-urea-co-ester) copolymer, it is convenient to refer to moles of phosphonium salt per mole of all of the dihydroxy, urea and diacid compounds combined, meaning the number of moles of phosphonium salt divided by the sum of the moles of each individual dihydroxy, urea, and diacid compound present in the reaction mixture. The amount of organic ammonium or phosphonium salts employed typically will be in a range between about $1\times10^{-2}$ and about $1\times10^{-5}$, specifically between about $1\times10^{-3}$ and about $1\times10^{-4}$ moles per mole of the dihydroxy, urea and diacid compounds combined. The inorganic metal hydroxide catalyst typically will be used in an amount corresponding to between about $1\times10^{-4}$ and about $1\times10^{-8}$, specifically $1\times10^{-4}$ and about $1\times10^{-7}$ moles of metal hydroxide per mole of the dihydroxy, urea, and diacid compounds combined. In one embodiment, the catalyst comprises an alkali hydroxide and a tetra-alkyl ammonium hydroxide. In a second embodiment, the catalyst is sodium hydroxide and tetramethyl ammonium hydroxide. In an embodiment, the sodium hydroxide is present at a concentration of between $1\times10^{-9}$ and $1\times10^{5}$ mole/molar sum of the dihydroxy, urea, and diacid compounds and the tetramethyl ammonium hydroxide is present at a concentration of between $1\times10^{8}$ and $1\times10^{4}$ mole/molar sum of the dihydroxy, urea, and diacid compounds.

F. Diacids and Diesters

If the method of the invention is used to make a poly(carbonate-co-urea-co-ester), a diacid and/or diester compound is also included in the melt process formulation. Specific examples of diacid and diester compounds that can be used in the method of the invention include without limitation: aromatic diacids such as 2,6-naphthalene dicarboxylic acid, aliphatic diacids such as succinic acid, or a cycloaliphatic diacid such as 1,7-cyclododecanedioic acid. The diacid employed may have structure (k):

$$HOOC—R_{20}—COOH \qquad (k)$$

wherein $R_{20}$ is a $C_4$ to $C_{30}$ aromatic radical, a $C_1$ to $C_{40}$ aliphatic radical, or a $C_5$ to $C_{30}$ cycloaliphatic radical. Specific examples of diacids of this structure include terephthalic acid; isophthalic acid; 1,4-cyclohexanediacrboxylic acid; hexanedioic acid; octanedioic acid; decanedioic acid; dodecanedioic acid; tetradecanedioic acid; hexadecanedioic acid; octadecanedioic acid; cis 9-octenedioic acid; alpha-nonyldecanedioic acid; alpha-octylundecanedioic acid; and hydrogenated dimer acid. Ester of these acids, for example lower alkyl esters such as methyl or ethyl esters or phenyl or aryl esters may also be used. In one embodiment, diphenyl and/or di(ortho-(ester-substituted) phenyl esters are used.

Specific examples of aromatic diacids and diesters include: terephthalic acid or esters thereof and isophthalic acid or esters thereof. Specific aliphatic diacids and diesters include adipic acid, succinic acid; 1,7-cyclododecanedioic acid; 1,4-cyclohexanedicarboxylic acid; hexanedioic acid; octanedioic acid; decanedioic acid; dodecanedioic acid; tetradecanedioic acid; hexadecanedioic acid; octadecanedioic acid; cis 9-octenedioic acid; alpha-nonyldecanedioic acid; alpha-octylundecanedioic acid; and hydrogenated dimer acid or diphenyl or dimethyl salicyl esters thereof.

G. Chainstoppers

Chainstoppers are an additional optional component that may be included in the melt process formulation. Chainstoppers are monofunctional compounds that react in place of the dihydroxy compound to terminate a growing chain. In general, chainstoppers may be aliphatic or aromatic monohydroxy compounds that meet the following criteria (1) they are stable at the reaction conditions for poly(carbonate-co-urea) copolymer formation; (2) they do not contain reactive groups other than the hydroxy substituent that will provide sites for further reaction, including the formation of additional bonds, cross-linkages or the like under the reaction conditions for poly(carbonate-co-urea) copolymer formation, and (3) they do not contribute any undesired color to the product poly(carbonate-co-urea) copolymer as formed or after weathering or aging. The monofunctional chainstopper may also be a mono-acid or a mono-ester that reacts to terminate a growing chain. In other embodiments, the monofunctional chainstopper is an asymmetric carbonate, in which one substituent is activated to provide greater reactivity. As discussed in the later section A. Amount of Urea reaction component Used In Preparing The Poly(carbonate-co-urea) Copolymer of the section Process of Making Poly(carbonate-co-urea) Copolymers, it may be more difficult to prepare higher molecular weight copolymers when relatively high amounts of total urea compound are used (e.g. more than about 50 mole % relative to the total molar content of dihydroxy, urea, diacid, and diester compound). Therefore it may be advantageous to minimize the amount of added chainstopper in such melt process formulations having high contents of total urea compound.

Non-limiting examples of aliphatic chainstoppers include $C_1$ to $C_{36}$ linear or branched aliphatic alcohols, acids or esters such as methanol, ethanol, propanol, lauric acid, myristic acid, palmitic acid, stearic acid, arachidic acid, behenic acid, lignoceric acid, eicansoic acid, and the alkyl or aryl esters of these acids such as methyl salicyl stearate or phenyl stearate.

Non-limiting examples of aromatic chainstoppers are phenolic chainstoppers of the structure (1)

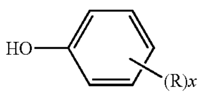

(1)

wherein each substituent R is independently selected from the group consisting of alkyl, aryl, and alkaryl having from 1 to 30 carbon units, and hydrogen; and x is an integer between 1 and 5; but the substituent R is not an ester or other strongly activating or electron-withdrawing substituent. Specific examples of aromatic chainstoppers include phenol, para-cumyl phenol, benzoic acid, alkyl or aryl esters of benzoic acid and alkyl or aryl-substituted benzoic acids; and alkyl or aryl substituted phenols such as tert-butyl phenol, octylphenol, nonylphenol.

Formation of Poly(carbonate-co-urea) Copolymers

FIG. 1 (i) shows the normal reaction in the production of polycarbonate using BPA as the dihydroxy compound and DPC as the diaryl carbonate, and FIG. 1 (ii) shows the analogous reaction in the case when the activated ortho-(ester-substituted) diaryl carbonate, bis-(methylsalicyl)carbonate (BMSC), is used as the diaryl carbonate.

FIG. 2 (c1) to (c11) show some of the end groups prepared in the polymerization reactions shown in FIGS. 1 (i) and 1 (ii). In general there will be substantial differences in the types of end groups formed depending upon whether a non-activated diaryl carbonate or an activated ortho-(ester-substituted) diaryl carbonate is used. For example, the end groups in FIG. 2 structures (c5), (c7), (c8), and (c10) result from side reactions of activated ortho-(ester-substituted) diaryl carbonate, so they will only be found in poly(carbonate-co-urea) copolymers made from such activated diaryl carbonates. FIG. 2 structures (c6), (c7), (c9) and (c11) show the corresponding end groups for the case when BMSC is used as the activated ortho-(ester-substituted) diaryl carbonate. It should be noted that alkyl, phenyl or benzyl carbonate end groups like the end group in FIG. 2 structure (c8) may be formed also in melt transesterification polymerizations using non-activated diaryl carbonates like DPC, provided that alkyl, phenyl or benzyl alcohol chainstoppers are used or are present as an impurity in one of the raw materials. Therefore the end groups in FIG. 2 structures (c5), (c7) and (cdO) are the ones that are most strongly characteristic of the use of activated ortho-(ester-substituted) diaryl carbonates. If a non-activated diaryl carbonate like DPC is used in the melt transesterification reaction, the product poly(carbonate-co-urea) copolymer will typically have a mix of uncapped (free OH) end groups, as in FIG. 2 (c1), resulting from a dihydroxy compound being incorporated at a chain end together with aryl carbonate end groups, as in FIG. 2 structures (c2) and (c3), resulting from the diaryl carbonate compound being incorporated at a chain end. This mix of free OH and carbonate end group types is a result of the generally poorer conversion level obtained when non-activated diaryl carbonates are used. If an activated diaryl carbonate like BMSC is used, full conversion is readily obtained, and therefore one type of end group (carbonate or free OH) will tend to dominate depending on the molar stoichiometry used (normal ratio "excess carbonate" versus reverse ratio "excess OH") and whether added chainstoppers are used or not.

Polycarbonates prepared by melt transesterification processes such as those in FIGS. 1 (i) and (ii) will also vary in their internal groups depending upon whether non-activated or activated ortho-(ester-substituted) diaryl carbonates are used. For example, FIG. 3 structure (d1) shows an internal ester linkage (IEL) which can form when an ester-substituted diaryl carbonate like BMSC is used in a reaction with a dihydroxy compound like BPA. In contrast, FIG. 4 structures (e1) to (e3) shows the internal Fries linkages typically found when non-activated diaryl carbonates like DPC are used.

FIG. 5 shows the reaction in the production of a poly (carbonate-co-urea) copolymer using EU as the urea compound, BPA as the dihydroxy compound, and BMSC as the ester-substituted diaryl carbonate. The groups X, Y and Z represent additional sequences of incorporated monomer units. Therefore no intention is made in the representation in this figure to specifically indicate any one type of possible chain microstructure such as random, partially-alternating, random-block etc.

The present application provides methods for making poly (carbonate-co-urea) copolymers that contain not only internal carbonate linkages but also internal carbamate ROC(=O)$NR_2$ linkages, such as the internal linkage shown in FIG. 6 (i), as formed for example by the reaction of one molecule of BPA and one molecule of diaryl carbonate and one molecule of EU. In addition, this internal carbamate linkage may also be part of an internal dicarbamate-urea linkage, ROC(=O)N(R)C(=O)N(R)C(=O)OR, as shown for example in FIG. 6 (ii), as formed by the reaction of one BPA and two diaryl carbonates and one EU. Prior to Applicants efforts as described; herein, poly(carbonate-co-urea) copolymers containing both internal carbonate linkages and internal carbamate linkages, as well as internal carbamate-urea sequences and dicarbamate-urea linkages, were not known, nor were melt polymerization methods to prepare such poly(carbonate-co-urea) copolymers.

Process of Making Poly(carbonate-co-urea) Copolymers

Described herein is a process for making poly(carbonate-co-urea) copolymers comprising reacting in the melt (a) a dihydroxy reaction component comprising a dihydroxy compound, (b) a diaryl carbonate reaction component comprising a diaryl carbonate, (c) a urea reaction component comprising a urea compound in the presence of (d) a transesterification catalyst during at least part of the reaction, and removing a phenolic byproduct to produce a poly(carbonate-co-urea) copolymer. In one embodiment, the urea and dihydroxy compounds are reacted in a molar ratio: (total moles of urea compound)/((total moles of urea compound)+(total moles of dihydroxy compound)) of less than or equal to 0.5. In some embodiments the molar ratio is less than or equal to 0.33, specifically less than or equal to 0.25.

In other embodiments, the urea compound in one or more of the above embodiments or their combinations is a compound of the following structure (a1), (a1)

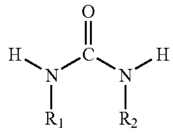

wherein the substituents $R_1$ and $R_2$ are independently each a $C_1$ to $C_{12}$ branched or linear alkyl group, a $C_6$ to $C_{18}$ aromatic group, or a $C_7$ to $C_{36}$ aralkyl group.

In still other embodiments, the urea compound in one or more of the above relevant embodiments or their combinations is a compound of structure (a2), (a2)

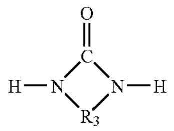

wherein the substituent $R_3$ is a $C_1$ to $C_{12}$ branched or linear aliphatic group, a $C_6$ to $C_1S$ aromatic group, or a $C_7$ to $C_{36}$ aralkyl group. In another embodiment, the substituent $R_3$ is a $C_2$ to $C_{12}$ aliphatic group.

In a third embodiment, a poly(carbonate-co-urea-co-ester) copolymer is prepared in a process comprising reacting in the melt (a) a dihydroxy reaction component comprising a dihydroxy compound, (b) a diaryl carbonate reaction component comprising a diaryl carbonate, (c) a urea reaction component comprising a urea compound (e) a diacid reaction component comprising a diacid compound and/or a diester reaction component comprising a diester compound in the presence of (d) a transesterification catalyst during at least part of the reaction, and removing a phenolic byproduct to produce a poly (carbonate-co-urea) copolymer. In one embodiment, the urea, dihydroxy, diacid and diester compounds are reacted in a molar ratio: (total moles of urea compound)/((total moles of urea compound)+(total moles of dihydroxy compound)+(total moles of diacid compound)+(total moles of diester compound)) of less than or equal to 0.5. In some embodiments the molar ratio is less than or equal to 0.33, specifically less than or equal to 0.25.

A. Amount of Urea Reaction Component Used In Preparing The Poly(carbonate-co-urea) Copolymer The desired amount of urea compound to be added will depend on the targeted poly(carbonate-co-urea) copolymer properties and also on the given set of reaction conditions and reactor configuration. If too low an amount of urea compound is used, an insufficient modification of the poly(carbonate-co-urea) copolymer properties will occur. Conversely if the amount of total urea compound used is too great (e.g. a molar ratio of more than about 0.50 relative to the total molar content of the dihydroxy, urea, diacid, and diester compounds), it is not possible to make a high molecular weight copolymer. Without intending to be bound by any particular mechanism, the inventors believe that it is not possible to readily incorporate adjacent or neighboring urea residues in poly(carbonate-co-urea) copolymers prepared by melt polymerization methods. The difficulty in incorporating such neighboring urea compound residues might be a result of a lack of reactivity to form the necessary linkages or a lack of thermal stability of such linkages once formed. As discussed in a later section, it may be desirable in one embodiment to produce a lower molecular weight poly(carbonate-co-urea) copolymer, for example, suitable for further processing by means of solid state polymerization. It is possible to produce either relatively low or high molecular weight copolymers, for example, by means of varying the molar stoichiometry, particularly if activated diaryl carbonates are used. The desired amount of urea compound to use in the melt process formulation may be determined empirically by running the reaction at various amounts of urea compound and determining the molecular weight of the copolymer obtained, mole % incorporation of internal monomer residues or units derived from the urea compound in the poly(carbonate-co-urea) copolymer product, and the product properties.

In the preparation of poly(carbonate-co-urea) copolymers, the amount of urea compound in molar ratio in the melt process formulation is determined from the total moles of dihydroxy and urea compounds in the melt process formulation using Equation (1) below:

molar ratio urea=(mole urea)/(mole dihydroxy+mole urea) (1)

In the preparation of poly(carbonate-co-urea-co-ester) copolymers, the amount of urea compound in molar ratio urea in the melt process formulation is determined from the total moles of dihydroxy, urea, diacid, and diester compounds in the melt process formulation using Equation (2) below:

molar ratio urea (mole urea)/(mole dihydroxy+mole urea+mole diacid+mole diester). (2)

In general, suitable starting amounts of urea compound to achieve this end result are those that yield molar ratios of urea compound from about 0.01 to about 0.5 relative to the total molar content of the dihydroxy and urea compounds in the case of melt process formulations for making poly(carbonate-co-urea) copolymers and relative to the total molar content of the dihydroxy, urea, diacid, and diester compounds in the case of melt process formulations for making poly(carbonate-co-urea-co-ester) copolymers, in one embodiment between 0.05 and 0.33, and in another embodiment between 0.01 and 0.25. The optimum level of urea compound will depend somewhat on the desired molecular weight of the poly(carbonate-co-urea) or poly(carbonate-co-urea-co-ester) copolymer, the properties of the urea compound, and the process conditions. For example, the molecular weight of the poly(carbonate-co-urea) or poly(carbonate-co-urea-co-ester) copolymer tends to decrease as the molar ratio of the urea compound content relative to the total molar content of the dihydroxy, urea, diacid, and diester compounds of the melt process formulation for making the copolymer increases. In addition, it may be necessary to add more urea reaction component, for example, if a lower molecular weight/more volatile urea compound is used and it is partially lost due to devolatization under the vacuum conditions of the process or if the urea compound has limited reactivity under the reaction conditions, for example, due to the presence of quenching impurities or steric hindrance of the monomer due to bulky substituents.

B. Molar Stoichiometric Ratio Of Reactants

The poly(carbonate-co-urea) copolymers may be made in a melt process in which carbonate functional groups react with both hydroxyl and urea functional groups. Therefore such copolymers may be prepared using a molar stoichiometric ratio of diaryl carbonate to dihydroxy compound plus urea compound that is between about 0.90 and about 1.1. In some embodiments, monofunctional chainstoppers like monofunctional phenols may be used, and then their presence will be taken into account in calculating the molar stoichiometric ratio such that the molar ratio of diaryl carbonate to dihydroxy compound plus urea reaction component plus one half of the chainstopping reagent (monofunctional phenol) will be between about 0.994 and about 1.06. In other embodiments, the molar stoichiometric ratio will be between about 0.995 and 1.05 or between 0.996 and 1.04. In one embodiment, it will be between 0.995 and 1.02. In one embodiment, the method is carried out at a "reverse ratio" with respect to conventional stoichiometry. Thus, in this embodiment, the dihydroxy and urea compounds are present in a molar excess relative to the diaryl carbonate compounds. The occurrence of any hydrolysis reactions, presence of impurities, monofunctional species such as chainstoppers, and other monomers such as diacids and diols will be taken into account in calculating this stoichiometric ratio. In one embodiment, the desired poly(carbonate-co-urea) copolymer is prepared by using a molar ratio of activated diaryl carbonate to the total of dihydroxy compound plus urea compound plus one half of the chainstopping reagent (monofunctional phenol) that is less than 1 when expressed to at least three decimal places, for example 0.996 or less. In specific embodiments, the ratio is between 0.962 and 0.996, for example between 0.968 and 0.996. In another specific embodiment, the ratio is between 0.971 and 0.994. If non-activated diaryl carbonates such as DPC are used, it is often desirable to use somewhat higher molar stoichiometric ratios in order to compensate for the loss of these less reactive carbonates to the vacuum overhead system and thus the subsequent shift in ratio. The molar ratio may be adjusted for the loss of other volatile monomers or to compensate for impurities contained in monomers.

Poly(carbonate-co-urea-co-ester)s may be made through the inclusion of diester or diacid compounds in the melt process formulation. The presence of these additional components needs to be taken into account when calculating the stoichiometric ratio of diaryl carbonate to dihydroxy and urea compounds. For example, one mole of diester will generally substitute for one mole of diaryl carbonate in the ratio calculation, whereas one mole of diacid will generally substitute for one mole of dihydroxy compound. The substitution may not be exactly 1 to 1, and it may depend slightly on such factors as the degree of monomer purity and volatility of the monomer (e.g. whether or not a monomer is partially lost due to devolatization during the process). In addition, a non-activated diester may have so much slower reactivity than an activated diaryl carbonate that it might actually act to some extent as a chainstopper or even inert component under some process conditions if activated diaryl carbonates are used.

In addition, some small amount of non-activated diaryl carbonate or unsymmetrical diaryl carbonates having one activated aryl group may be substituted for the activated diaryl carbonate in the calculation of the stoichiometric ratio if an activated diaryl carbonate is used. However the reactivity of such carbonates will often be slower than those of the activated diaryl carbonates. Therefore although they would not affect the stoichiometric ratio of the reaction and thus the end group type and molecular weight at full conversion, in practice their reduced reaction kinetics may actually cause them to act to some extent as chainstoppers or inert components in this process.

C. Production of the Poly(Carbonate-Co-Urea) Copolymer

The method of reaction may be performed using any known transesterification reaction protocol, including without limitation melt transesterification (also known as melt condensation) and solid state polymerization. The melt reaction may be done in a single reactor, reactor train, an extruder or reactor train/extruder combination and in a continuous, semi-continuous or batch process. The polymerization may conveniently be carried out in a two-stage process, namely oligomerization followed by polymerization. It is not necessary for the polymerization process to be carried out in such discrete steps or reaction stages however. For example, the polymerization may also be carried out in a process having non-discrete steps in which the temperature and/or vacuum level are essentially continuously or semi-continuously increased while transforming the molten raw materials into a high molecular weight copolymer. It may be desirable to limit exposure of the reactants to high temperatures and long holding times in any monomer melt-up, monomer melt mixing, oligomerization, or polymerization stages in order to minimize thermal degradation and/or byproduct reactions. A convenient method of estimating the maximum reaction temperature may be done by a TGA analysis of the poly(carbonate-co-urea) or poly(carbonate-co-urea-co-ester) copolymer. For example, it may be desirable to carry out the process such that a maximum temperature of less than about 410° C. is used. In one embodiment, a maximum temperature of less than about 395° C. is used in the process. In other embodiments, it will be less than about 375° C. and less than about 350° C. Further, it is advantageous during the polymerization to effectively devolatize residual materials such as phenol or methyl salicylate (MS). In one embodiment, the polymerization is conducted in an extruder, and in other embodiments, the polymerization time is less than 60 minutes, less than 30 minutes, and less than 10 minutes. By way of example, melt transesterification processes are described in U.S. Pat. Nos. 5,026,817, 5,221,761, 5,412,061 and 6,569,985; and solid state polymerization processes are described in U.S. Pat. Nos. 6,960,641 and 6,518,391.

In one embodiment, the dihydroxy and urea compounds or poly(carbonate-co-urea) oligomers are reacted with the diaryl carbonate to prepare poly(carbonate-co-urea) copolymers. In a second embodiment, the dihydroxy, urea and diacid and/or diester compounds or poly(carbonate-co-urea-co-ester) oligomers are reacted with the diaryl carbonate to prepare poly(carbonate-co-urea-co-ester) copolymers. The melt process generally involves a base-catalyzed condensation polymerization of, for example, DPC or BMSC and a dihydroxy compound such as Bisphenol A with a urea compound. The reaction is conducted at high enough temperatures for the starting monomers and product to remain molten, while the reactor pressure is staged in order to effectively remove phenol or methyl salicylate, the byproduct of the polycondensation reaction. Most current melt technology programs employ a two component-catalyst system. The first component is typically a tetralkylammonium hydroxide co-catalyst which is typically used to initiate oligomer formation in the melt. The second catalyst is an alkali metal hydroxide (i.e., the "alpha-catalyst"), which is the second part of the overall catalyst system. Due to its intrinsic thermal stability and low volatility, the alkali metal salt remains active at high temperatures and therefore must be quenched at the end of the polymerization using this catalyst.

The polymerization may be conducted by adding the various monomeric raw material components to produce poly(carbonate-co-urea) copolymers (e.g. the diaryl carbonate, dihydroxy and urea reaction components) to one another separately or together, in any order, and in one step or in several steps without limitation. Likewise the diaryl carbonate, dihydroxy, urea and diacid and/or diester reaction components may be added to one another separately or together, in any order, and in one step or in several steps without limitation in processes to produce poly(carbonate-co-urea-co-ester) copolymers). In one embodiment, a melt "pre-mixture" is first created from some of the reaction components and then the rest of the reaction components are added to it in order to create the melt mixture suitable for polymerization. For example, two of the components, such as the diaryl carbonate and urea reaction components, may be first molten and mixed together to create a melt pre-mixture and then the dihydroxy reaction component may be added in one step or in several stages to the molten pre-mixture of the first two. In another embodiment, a substantial portion of the diaryl carbonate and dihydroxy reaction components are first melt-mixed together to create a melt pre-mixture and then the urea reaction component is subsequently added and mixed in. In yet another embodiment, a diacid compound and at least an equimolar portion of the diaryl carbonate reaction component are first melt-mixed together to create a melt pre-mixture and then the remaining monomers are added separately or together to the melt pre-mixture in the preparation of poly(carbonate-co-urea-co-ester)s. In still another embodiment, the melt pre-mixture contains an aliphatic diacid or diester compound or an aliphatic diacid or diester compound is added to it. In yet another embodiment, a catalyst is present in the pre-mixture in order to obtain conversion of the monomers, for example, to decrease the monomer volatility or to reduced the extent of conversion needed in the subsequent polymerization.

The monomeric reaction components may also be added to one another in any proportion or amount. For example, a substantial portion of the urea reaction component may be first melt mixed together with a substantial portion of the diaryl carbonate reaction component to create a melt pre-mixture, and then the rest of the diaryl carbonate reaction component may then subsequently be added separately or together with the dihydroxy reaction component.

The reaction components may also be added to one another in any form such as solid, melt or liquid without limitation. For example, some or all of the reaction components may be first molten and then added to one another in the molten form to create melt pre-mixtures or melt mixtures. In one embodiment, some or all of one of the reaction components are first molten and then the rest of the reaction components are added to this melt as solids. In another embodiment, a solid mixture of all of the reaction components is first created and then this mixture of solids is melted together to create a melt mixture suitable for polymerization.

In a similar manner, a transesterification catalyst may be added to the melt mixture in a variety of ways. Some or all of the catalyst may be introduced together with some or all of one or more of the reaction components, or it may be added by itself to a molten pre-mixture of some or all of the carbonate, urea, and dihydroxy reaction components. In some cases, it may be desirable to add the catalyst so as to achieve a particular degree of conversion prior to application of substantial vacuum to remove the volatile byproduct and to produce the poly(carbonate-co-urea) copolymer.

In other embodiments, the loss of volatile monomers may be minimized by achieving a particular degree of conversion in the melt mixture before substantial vacuum is applied. The degree of conversion may be readily measured based on the content of phenolic byproduct released by the transesterification reaction of the diaryl carbonate monomer relative to the amount of phenolic byproduct potentially available to be released for the particular reaction stoichiometry. For example, phenol is released when diphenyl carbonate is used (see FIG. 1 (i)) and methyl salicylate is released when the activated diaryl carbonate BMSC (see FIG. 1 (ii)) is used to prepare polycarbonates. For example, 2 moles of phenolic byproduct will be released at full (100%) conversion per mole of dihydroxy and urea compounds in the absence of chain stopping reagents at "normal" stoichiometries (excess diaryl carbonate relative to the molar sum of dihydroxy, urea, and diacid compounds). This calculation will be modified somewhat to take into account the presence of end groups, such as when a "reverse" stoichiometric ratio or chainstopping reagents are used, or to take into account other comonomers such as when diacids or diesters are used. In one embodiment, the degree of conversion will be at least 15% prior to the application of substantial vacuum, in other embodiments it will be at least 25% or at least 30%. In another embodiment, at least 25% of the amine functional groups of the urea reaction component are converted to a carbamate functional group prior to an application of substantial vacuum. In a further embodiment, at least 50% of the amine functional groups of the urea reaction component are converted to a carbamate functional group prior to an application of substantial vacuum. In another embodiment, the oligomer has a number average molecular weight (Mn) of at least about 4,400 g/mol (PS) prior to the application of substantial vacuum. Increased degrees of conversion will be more readily achieved when activated diaryl carbonates are used due to their more favorable equilibrium. In addition, achieving a substantial degree of conversion (e.g. at least 10% conversion) already in the melt mixture to create an oligomer reduces the degree of conversion required when vacuum is applied to remove the volatile byproduct in a subsequent polymerization stage. Therefore creating an oligomer in a melt mixture stage may allow one to reduce the residence time and/or temperature and/or vacuum level required in a subsequent polymerization stage of the process. In addition, the less favorable equilibrium and/or reaction rates associated with non-activated diaryl carbonates versus those of activated diaryl carbonates may make it desirable to achieve some degree of conversion prior to application of substantial vacuum.

Alternatively, the loss of monomers due to devolatization may be minimized by means of the reactor system design. For example, prior to the application of substantial vacuum, the diaryl carbonate, dihydroxy, and urea reaction components may be melt mixed until thermal equilibration and/or partial conversion is reached in a reactor characterized in that the losses of any of the diaryl carbonate, dihydroxy compound, urea compound, diacid compound, or diester compound from the melt mixture are less than 1 mole percent of the total amount of the monomer used in the melt process formulation. In another embodiment, the thermal equilibration/partial conversion of the melt mixture is conducted below the lowest boiling point of any one of the diaryl carbonate, dihydroxy compound, urea compound, diacid compound, or diester compound. In yet another embodiment, the thermal equilibration/partial conversion is conducted below the boiling point of the urea reaction component. In other embodiments, the overhead system comprises a scrubber, a reflux column, or an overhead system having a volume of less than 10% relative to the volume of the reactor.

In one embodiment the apparatus for conducting the polymerization using activated diaryl carbonates may consist of one or more continuous stir reactors (CSTR) connected in series or parallel used in conjunction with one or more reactive extruders, for example, as shown in FIG. 12. In this figure, the monomer formulation is added to a CSTR (M) in which the monomers are melt-mixed together. In such a CSTR, reaction of monomers or even their thermal equilibration may be achieved, depending on the conditions of temperature and residence time and the presence of any catalysts or reaction quenchers. In one embodiment an organic base transesterification catalyst (beta catalyst) will be present in the CSTR in order to initiate reaction and oligomerization. In another embodiment, both an inorganic basic catalyst and an organic basic catalyst will be present in the CSTR. Typically this CSTR will have been purged of oxygen prior to melting of the monomers and will contain an inert atmosphere and/or a slight vacuum. This molten monomer formulation or oligomer will then be pumped through a typically heated feedline (1) to the reactive extruder (C). In one embodiment, a transesterification catalyst will be added to the molten material in feedline (1). In one embodiment, the extruder (C) is a twin-screw extruder. The reaction mixture or oligomer is then reactively extruded in the extruder (C). The extruder will typically be equipped with different venting sections having progressively higher vacuum levels as the extruded material is conducted to the extruder die head or exit of the extruder. In FIG. 12, the extruder is equipped with a low-vacuum forward vent section (2) and a high-vacuum back-vent section (3). The phenolic byproduct of the transesterification reaction (e.g. methyl salicylate in the case that BMSC is used as the activated diaryl carbonate) is removed via devolatilization through these vents. The various venting sections are equipped with vacuum pumps (F and G) and sections for condensing and holding the phenolic byproduct (D, E, H, and I). In one embodiment, the condensed phenolic byproduct is separated and purified and reused in the preparation of diaryl carbonate monomer.

Precursor copolymers are suitable for conversion to high molecular weight copolymers in a subsequent solid state polymerization (SSP). Therefore in one embodiment, a precursor poly(carbonate-co-urea), typically a relatively low molecular weight oligomeric poly(carbonate-co-urea), is prepared by the melt reaction of a melt mixture comprising the diaryl carbonate, dihydroxy and urea reaction components. In the preparation of poly(carbonate-co-urea) oligomers, a melt mixture comprising a diaryl carbonate such as diphenyl carbonate or bis(methylsalicyl) carbonate, a dihydroxy compound, and a urea compound are heated together in the presence of a transesterification catalyst such as sodium hydroxide while removing phenol or methyl salicylate. In another embodiment, a precursor poly(carbonate-co-urea-co-ester), typically a relatively low molecular weight oligomeric poly(carbonate-co-urea-co-ester), is prepared by the melt reaction of a melt mixture comprising the diaryl carbonate, dihydroxy, urea and diacid and/or diester reaction components. In the preparation of poly(carbonate-co-urea-co-ester) oligomers, a melt mixture comprising a diaryl carbonate such as diphenyl carbonate or bis(methylsalicyl) carbonate, a dihydroxy compound, a urea compound, and a diacid and or diester compound are heated together in the presence of a transesterification catalyst such as sodium hydroxide while removing phenol or methyl salicylate. Phenol or methyl salicylate is formed as a byproduct of the transesterification reaction between phenolic or amine groups of the monomers or growing copolymer chains and diphenyl carbonate (or bis(methylsalicyl)carbonate)) or phenyl carbonate (or (methylsalicyl)carbonate)) copolymer chain end groups. In the method, the poly(carbonate-co-urea) or poly(carbonate-co-urea-co-ester) oligomer contains incorporated diaryl carbonate, dihydroxy compound and urea compound residues, internal linkages and end groups. In the oligomer preparation, either an excess of diaryl carbonate or an excess of dihydroxy compound and/or urea compound may be employed. This oligomerization reaction is typically carried out under reduced pressure to facilitate the orderly removal of the phenol or methyl salicylate byproduct. When the desired level of oligomerization has been achieved the reaction is terminated and the product oligomeric poly(carbonate-co-urea) or poly(carbonate-co-urea-co-ester) is isolated. The oligomeric poly(carbonate-co-urea) or poly(carbonate-co-urea-co-ester) so produced is typically amorphous and therefore generally must be partially crystallized in order to be suitable for solid state polymerization.

The oligomeric poly(carbonate-co-urea) or poly(carbonate-co-urea-co-ester) may be partially crystallized by one of several methods, such as exposure of powdered or pelletized oligomer to hot solvent vapors, or dissolution of the amorphous oligomer in a solvent such as methylene chloride and thereafter adding a solvent such as methanol or ethyl acetate to precipitate crystalline oligomeric polycarbonate. Typically, such solvent vapor or liquid solvent crystallization methods result in partially crystalline oligomeric polycarbonates having a percent crystallinity between about 20 and about 40 percent as measured by differential scanning calorimetry. A percent crystallinity in this range is usually sufficient for the oligomeric polycarbonate to undergo SSP without fusion of the pellets or powder being subjected to SSP. In addition to solvent-induced crystallization, oligomeric bisphenol A polycarbonate has been crystallized by dissolving BMSC or other activated diaryl carbonate in molten amorphous polycarbonate oligomer followed by cooling the mixture to ambient temperature to afford partially crystalline polycarbonate as a mixture with BMSC or other activated diaryl carbonate. Finally, amorphous oligomeric polycarbonates have been crystallized by prolonged heating at a temperature below the melting point of the partially crystalline polycarbonate. However, such thermally induced crystallization is quite slow relative to the aforementioned crystallization methods. In one embodiment, an understoichiometric amount of BMSC or other activated diaryl carbonate is used in preparing the copolymer. Therefore either poly(carbonate-co-urea) or poly(carbonate-co-urea-co-ester) oligomers having free OH end groups are reacted with an understoichiometric amount of DPC or other non-activated diaryl carbonate or BMSC or other activated diaryl carbonate in the SSP stage, or else poly(carbonate-co-urea) or poly(carbonate-co-urea-co-ester) oligomers having carbonate end groups are reacted with bisphenol A or another dihydroxy compound having OH end groups in the SSP stage.

The partially crystalline oligomeric poly(carbonate-co-urea) or poly(carbonate-co-urea-co-ester) in a solid form such as a powder, particulate or pellet is then heated under solid state polymerization conditions at a temperature below the sticking temperature or melting point of the oligomeric poly(carbonate-co-urea)) or poly(carbonate-co-urea-co-ester), but above the glass transition temperature of the partially crystalline oligomeric poly(carbonate-co-urea), and the volatile byproducts formed as chain growth occurs, phenol, diphenyl carbonate and the like, are removed. The polycondensation reaction which converts the low molecular weight oligomer to high polymer is effected in the solid state under these conditions.

The polymerization can utilize any known transesterification catalyst, including without limitation those in the list set forth above. In certain embodiments, the catalyst is a two part catalyst system such as tetramethylammonium hydroxide (TMAH)/sodium hydroxide. In this case, the levels of the alpha catalyst (typically sodium hydroxide) is suitably used at a concentration of 1 to 40 mEq/mol of total dihydroxy and urea compound, for example, between 2 and 20 mEq/mol, or between 4 and 10 mEq/mol.

Poly(carbonate-co-urea) Copolymers

A. Incorporated End Groups, Internal Linkages and Monomer Residues

Although the poly(carbonate-co-urea) made using the method described herein is generally suitable for use in the same applications as polycarbonates containing comparable dihydroxy compound and diaryl carbonate monomers made by previously known methods, it is in fact a different material when all of the incorporated monomer residues and internal linkages are considered. The differences in these incorporated monomer residues and internal linkages make it a superior material in many respects. For example, these poly(carbonate-co-urea) copolymers have enhanced fire resistance and/or chemical resistance relative to the non-urea-containing counterparts.

Poly(carbonate-co-urea) copolymers made in accordance with the methods described are structurally different from other polycarbonates known in the art. Specifically, the poly(carbonate-co-urea) copolymers comprise incorporated urea compound and dihydroxy compound residues. In one embodiment, the poly(carbonate-co-urea) copolymers comprise incorporated diaryl carbonate, urea compound, and dihydroxy compound residues, and internal linkages and end groups. In some embodiments, the incorporated urea compound residues are present in an amount of less than or equal to 50 mole % based on the total content of incorporated dihydroxy compound and urea compound residues. In other embodiments, the incorporated urea compound residues are present in an amount of less than or equal to 30% mole, specifically less than or equal to 25 mole %, based on the total content of incorporated dihydroxy compound and urea compound residues.

In additional embodiments, the poly(carbonate-co-urea) copolymers of one or more of the above mentioned embodiments or their combinations contain the incorporated urea compound residues having the following structure (b1), (b1)

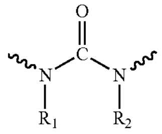

wherein the substituents $R_1$ and $R_2$ are independently each a $C_1$ to $C_{12}$ branched or linear alkyl group, a $C_6$ to $C_{18}$ aromatic group, or a $C_7$ to $C_{36}$ aralkyl group.

In still other embodiment, the poly(carbonate-co-urea) copolymers of one or more of the above mentioned embodiments or their combinations contain the incorporated urea compound residues having the following structure (b2), (b2)

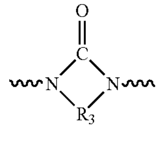

wherein the substituent $R_3$ is a $C_1$ to $C_{12}$ branched or linear aliphatic group, a $C_6$ to $C_{18}$ aromatic group, a $C_7$ to $C_{36}$ aralkyl group. In another embodiment, the substituent $R_3$ is a $C_2$ to $C_{12}$ aliphatic group.

In yet another embodiment, a poly(carbonate-co-urea-co-ester) copolymer comprises incorporated urea compound, dihydroxy compound and diacid compound residues. In one embodiment, a poly(carbonate-co-urea-co-ester) copolymer comprises incorporated diaryl carbonate, urea compound, dihydroxy compound and diacid compound residues, and internal linkages and end groups. In some embodiments, the incorporated urea compound residues are present in an amount of less than or equal to 50 mole based on the total content of incorporated dihydroxy compound, urea compound, and diacid compound residues. In other embodiments, the incorporated urea compound residues are present in an amount less than or equal to 30% mole, specifically less than or equal to 25 mole %, based on the total content of incorporated dihydroxy compound, urea compound, and diacid compound residues.

In some embodiments the poly(carbonate-co-urea) copolymer and poly(carbonate-co-urea-co-ester) copolymer contain residues of incorporated urea compounds at a level of about 22 mole % or less based on the total molar content of residues of all incorporated urea compounds and dihydroxy compounds. In yet another embodiment the molar level of residues of incorporated urea compounds in the poly(carbonate-co-urea) and poly(carbonate-co-urea-co-ester) copolymers is between about 0.5 and 27 mole %. In still another embodiment the molar level of residues of incorporated urea compounds in the poly(carbonate-co-urea) and poly(carbonate-co-urea-co-ester) copolymers is between about 2.5 and 24 mole %.

The poly(carbonate-co-urea) and poly(carbonate-co-urea-co-ester) copolymers are structurally different from prior polycarbonate compositions, because the copolymers contain not only internal carbonate linkages but also internal carbamate $ROC(=O)NR_2$ linkages, such as the internal linkage shown in FIG. 5 (i), as formed, for example, by the reaction of one BPA and one diaryl carbonate and one EU. In addition, this internal carbamate linkage may also be part of an internal carbamate-urea sequence, $ROC(=O)N(R)C(=O)NR_2$, or internal dicarbamate urea linkage, $ROC(=O)N(R)C(=O)N(R),C(=O)$, as shown for example in FIG. 5 (ii), as formed by the reaction of one BPA and two diaryl carbonates and one EU.

The melt poly(carbonate-co-urea) and poly(carbonate-co-urea-co-ester) copolymers will also contain different types of end or internal groups (FIGS. 2-4) depending upon whether they are prepared using an activated diaryl carbonate or a non-activated diaryl carbonate. For example, some of the end groups will be activated carbonate end groups (FIG. 2 Structures c5 and c6) and/or their byproducts (FIG. 2 Structures c7 to c11), in the former case, and non-activated carbonate end groups (FIG. 2 Structures c2 to c4) in the latter case. In addition, free OH end groups, such as that in FIG. 2 Structure c1, may be present depending upon the reaction stoichiometry and whether or not full conversion is achieved in the polymerization. In one embodiment, the poly(carbonate-co-urea) has a level of free OH end groups between about 50 and 475 ppm. In another embodiment, the poly(carbonate-co-urea) and poly(carbonate-co-urea-co-ester) copolymers have a level of terminal (methylsalicyl)carbonate (T-MSC) end groups of between about 1 and about 15 mole %. In yet another embodiment, the poly(carbonate-co-urea) and poly(carbonate-co-urea-co-ester) copolymers have a level of terminal (methylsalicyl)carbonate (T-MSC) end groups of between about 1 and about 2.5 mole %. The melt poly(carbonate-co-urea) and poly(carbonate-co-urea-co-ester)

copolymers will also contain different types of low level reaction internal group byproducts (FIGS. 3-4) depending upon whether they are prepared using an activated diaryl carbonate or a non-activated diaryl carbonate. For example, the poly(carbonate-co-urea) and poly(carbonate-co-urea-co-ester) copolymers are characterized by the formation of substantial levels of internal Fries linkages (FIG. 4 Structures (e1) to (e3)) when non-activated diaryl carbonates are used, whereas the copolymers have only very low levels of internal Fries linkages when activated diaryl carbonates are used. In one embodiment, the poly(carbonate-co-urea) and poly(carbonate-co-urea-co-ester) copolymers contain branched internal Fries linkages at a level of about 500 ppm or less. In a second embodiment, the poly(carbonate-co-urea) and poly (carbonate-co-urea-co-ester) copolymers contain branched internal Fries linkages at a level of about 250 ppm or less. In another embodiment the poly(carbonate-co-urea) and poly (carbonate-co-urea-co-ester) copolymers contain between about 250 and about 500 ppm of branched internal Fries linkages. In one embodiment, the poly(carbonate-co-urea) and poly(carbonate-co-urea-co-ester) copolymers contain linear internal Fries linkages at a level of about 250 ppm or less.

On the other hand, the poly(carbonate-co-urea) and poly (carbonate-co-urea-co-ester) copolymers are characterized by the formation of significant levels of internal ester linkages or IEL (FIG. 3 Structure (d1)) when ester-substituted activated diaryl carbonates are used. In one embodiment, the level of IEL contained in the poly(carbonate-co-urea) and poly(carbonate-co-urea-co-ester) copolymers is about 0.5 mole % or less. In another embodiment, the level of IEL contained in the copolymers is about 0.1 mole % or less. In yet another embodiment, the level of IEL contained in the copolymers is about 0.05 mole % or less. As described in the next section these various end and internal groups can be readily identified and quantified by means of various chromatographic and spectroscopic analytical methods.

In one embodiment the poly(carbonate-co-urea) and poly (carbonate-co-urea-co-ester) copolymers contain end groups having the following structures (c12) and/or (c13):

(c12)

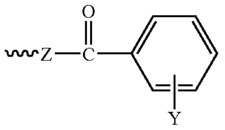

(c13)

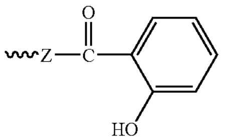

wherein Y is an ortho or para electron-withdrawing substituent and Z is oxygen or nitrogen.

In one embodiment, the ortho or para electron-withdrawing substituent (Y) in structures (c12) and/or (c13) are selected from the group consisting of alkyl, phenyl or benzyl esters. In another embodiment the electron-withdrawing substituent (Y) is an ortho-(methyl ester). In yet another embodiment, Z is oxygen.

In one embodiment, the poly(carbonate-co-urea) and poly (carbonate-co-urea-co-ester) copolymers contain internal linkages having the following structure (d2):

(d2)

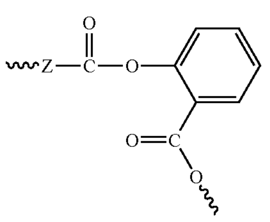

wherein Z is oxygen or nitrogen. In a second embodiment, Z is oxygen.

In another embodiment, the poly(carbonate-co-urea) and poly(carbonate-co-urea-co-ester) copolymers contain a portion of the incorporated urea compound residues as part of an internal dicarbamate-urea linkage (m1)

(m1)

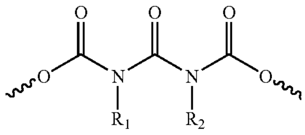

wherein the substituents $R_1$ and $R_2$ are independently each a $C_1$ to $C_{12}$ branched or linear alkyl group, a $C_6$ to $C_{18}$ aromatic group, a $C_7$ to $C_{36}$ aralkyl group.

In another embodiment, the poly(carbonate-co-urea) and poly(carbonate-co-urea-co-ester) copolymers contain a portion of the incorporated urea compound residues as part of an internal dicarbamate-urea linkage (m2)

(m2)

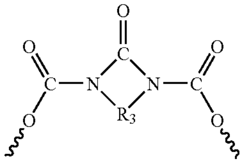

wherein the substituent $R_3$ is a $C_1$ to $C_{12}$ branched or linear aliphatic group, a $C_6$ to $C_{18}$ aromatic group, or a $C_7$ to $C_{36}$ aralkyl group. In another embodiment, the substituent $R_3$ is a $C_2$ to $C_{12}$ aliphatic group.

Finally the poly(carbonate-co-urea) and poly(carbonate-co-urea-co-ester) copolymers additionally differ from polyurea (polycarbamide) polymers of the prior art in that they do not contain significant levels of residual aromatic solvents. In one embodiment, the poly(carbonate-co-urea) and poly(carbonate-co-urea-co-ester) copolymers contain less than 10 ppm of residual aromatic solvents. In another embodiment, they contain less 10 ppm of residual benzene, toluene and tri-isopropyl benzene.

In one embodiment, the poly(carbonate-co-urea) and poly (carbonate-co-urea-co-ester) copolymers are random copolymers.

B. Determination of Mol % End Groups, Internal Linkages, and Incorporated Monomer Residues As noted above, the term "end groups" refers to the terminal groups on the ends of chains of the poly(carbonate-co-urea) copolymer. The mole % of an end group or type of end group is expressed as a mole percentage of the total amount of incorporated dihydroxy compound and urea compound residues in the case of poly(carbonate-co-urea) copolymers, and it is expressed as a mole percentage of the total amount of incorporated dihydroxy, urea, diacid and diester compound residues in the case of poly(carbonate-co-urea-co-ester) copolymers. There are several ways of measuring this quantity. For example, end groups and incorporated monomer residues may be analyzed by either spectroscopic means or by total hydrolysis of a copolymer followed by analysis of the various constituent residues or units. Spectroscopic methods include vibrational spectroscopy such as infrared or Raman spectroscopy and nuclear magnetic resonance (NMR) spectroscopy.

Of these methods, NMR spectroscopy is often selected because it allows an unambiguous structural assignment. The NMR resonances in an NMR spectrum may be assigned to specific structural features of a copolymer by using one or more methods including: comparison of the observed chemical shifts with those observed for analogous low-molecular weight model compounds, calculation of chemical shifts by using derived additivity relationships (particularly for $^{13}C$ NMR), synthesis of polymers with known specific structural or compositional features to establish the particular resonance-structure relationships, synthesis of polymers with selectively enriched $^{13}C$ sites or having deuterium selectively substituted for protons, comparison of the intensities of structural sequences with those intensities predicted based on models of the polymerization kinetics and statistical distributions, various 1-dimensional (1-D) spectral-editing methods such as the selective-spin-decoupling used for the determination of the proton bonding of carbon atoms, and various two-dimensional (2-D) techniques for determining the coupling between nuclei and to reveal the chemical shifts of the nuclei. The chemical bonding between the various constituent atoms can often be inferred from the $^1H$ and $^{13}C$ chemical shifts and from the spin-spin coupling between nuclei. Each of these techniques has their limitations and therefore it is often necessary to use a combination of these techniques, as well as other physical and chemical methods as needed.

If the copolymer is soluble, high-resolution solution NMR spectra can generally be obtained. If high polymer solution viscosities shorten the relaxation times and thus broaden line widths, various standard methods may be applied to obtain high-resolution NMR spectra, for example, the copolymer solution may be diluted or the measurement temperature increased, or a higher magnetic field strength may be applied. The choice of solvent is important. Solvents will often be selected that are magnetically isotropic and inert so that they do not interact strongly with the copolymer (e.g. no hydrogen-bonding interactions between the solvent and the copolymer and no degradation of the copolymer by the solvent). In addition solvents will often be selected so as to not contain functional groups that blank out regions of the NMR spectrum. Appropriate solvents will include deuterated chloroform ($CDCl_3$), and the deuterated form of tetrachloroethane. If necessary the deuterated form of other solvents such as dimethyl sulfoxide, benzene, pyridine, acetone, and dioxane may also be used if they do not interact strongly with the copolymer or degrade it. In the case of $^{13}C$ NMR spectra, additives such as chromium (III) acetylacetonate (also known as chromium (III) pentanedionate or Cracac) may be used to reduce both the T1-relaxation times and the Nuclear Overhauser Effect (NOE).

If the copolymer is not soluble, various methods may be applied in order to obtain a high resolution, narrow linewidths, and enhanced sensitivity in solid-state NMR copolymer spectra such as the techniques of high-power decoupling (DD), magic angle spinning (MAS), and cross-polarization (CP) may be applied. Solution NMR methods will often be employed for quantitative analysis, when possible.

In the NMR analysis of end group type and content and incorporated m on om er residue type and content, both $^1H$-NMR and $^{13}C$-NMR may be employed, but $^1H$-NMR is often selected because of its greater sensitivity and ease of use for quantitative analysis. When the identity of all of the dihydroxy compounds and urea compounds and the composition of the copolymer are known and all of the dihydroxy compounds and urea compounds contain at least one proton that is distinct and distinguishable in the proton NMR spectrum from those of the other dihydroxy and urea compounds as well as the various end groups in a poly(carbonate-co-urea) copolymer, one may then readily use the integrated resonances of the various end group, internal linkage, and incorporated dihydroxy and urea compound residues (incorporated monomer units) in the $^1H$-NMR in order to calculate the molar amount of each type of group or linkage or incorporated monomer residue present relative to the total amount of incorporated dihydroxy and urea compounds. When the identity of all of the dihydroxy, urea, diacid and diester compounds and the composition of the copolymer are known and all of the dihydroxy, urea, diacid and diester compounds contain at least one proton that is distinct and distinguishable in the proton NMR spectrum from those of the other dihydroxy, urea, diacid, and diester compounds as well as the various end groups in a poly(carbonate-co-urea) copolymer, one may then readily use the integrated resonances of the various end group, internal linkage, and incorporated dihydroxy, urea, diacid, and diester residues (incorporated monomer units) in the $^1H$-NMR in order to calculate the molar amount of each type of group or linkage or incorporated monomer residue present relative to the total amount of incorporated dihydroxy and urea compounds. For example, in the case of the BPA polycarbonate homopolymer, one may simply measure the integrated intensity of each end group type relative to that of the incorporated BPA residue (incorporated BPA monomer unit). Either an internal standard or a chemometric software calibration program may be used to obtain quantitative data. Various standard corrections may need to be applied in this analysis, for example, correcting for any differences in the relative number of protons whose intensities have been integrated for each type of incorporated monomer residue or structural unit. Some typical end group and internal linkage assignments in $^1H$-NMR and $^{13}C$-NMR spectra of melt copolymers are given below in Table 1.

TABLE 1

NMR Assignments of Some End Groups and Internal Linkages

| End Group or Internal Linkage | $^1H$-NMR typical assignment (ppm) | $^{13}C$-NMR typical assignment (ppm) |
|---|---|---|
| T-MSC end group | 8.03/8.05(2J=7Hz, doublet, 1 proton) | 164.6 |
| | Methylester group at 3.85ppm | 52.2 |
| BPA-salicyl-OH end group | 10.48(CDCl3, OH, s, 1H)<br>10.38(TCE, OH, s, 1H)<br>8.03/8.05(2J=7Hz, d, 1H) | BDL |
| methyl carbonate end group | 3.87(CH3O s, 3H) | |
| methyl ether end group | 3.76(CH3O s, 3H) | |
| uncapped BPA end group (free OH) | 6.63/6.65(2J=7Hz, d) | BDL |
| linear internal Fries | 8.00(3J=3Hz, d) | BDL |

TABLE 1-continued

NMR Assignments of Some End Groups and Internal Linkages

| End Group or Internal Linkage | $^{1}$H-NMR typical assignment (ppm) | $^{13}$C-NMR typical assignment (ppm) |
|---|---|---|
| linkage | 10.42(OH, s) | |
| acid internal Fries linkage | 7.75(3J=3Hz, d) | BDL |
| branched internal Fries linkage | 8.13(3J=3Hz, d) | BDL |
| IEL | 8.20/8.22(2J=7Hz, d, 1H) | 162.8 |

$^{1}$H-NMR assignments are relative to TMS (0 ppm)
$^{13}$C-NMR assignments are relative to CDCL3 (77.0 ppm)
BDL = Below Detection Limit
2J = direct proton-proton couplings constant
3J = long range proton-proton couplings constant Some typical $^{1}$H-NMR, $^{13}$C-NMR and $^{15}$N-NMR assignments of urea compounds and their incorporated residues in poly(carbonate-co-urea) and poly(carbonate-co-urea-co-ester) copolymers are given in Table 2 for the below species where $R_1$ to $R_4$ are linear, branched or cyclic alkyl groups:

TABLE 2

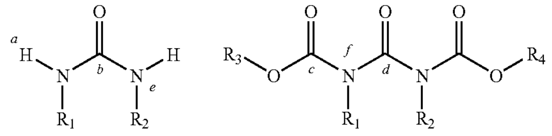

Typical NMR Assignments of Urea Compounds and Their Incorporated Residues

| Nucleus | $^{1}$H-NMR assignment typical (ppm) | $^{13}$C-NMR typical assignment (ppm) | $^{15}$N-NMR typical assignment (ppm) |
|---|---|---|---|
| A | 4.8 (broad) | | |
| alpha hydrogen on R1 or R2 (if present) in urea compound | 3.53 (s) 3.40 (DCHU) | | |
| alpha hydrogen on R1 or R2 (if present) in incorporated urea residue | 3.90 (s) 3.90 (DCHU) | | |
| B | | 165.0 | |
| C | | 152.0 | |
| D | | 148.4 | |
| E | | | 75.0 |
| F | | | 118.0 |

The assignments in Table 2 are based on the urea compound EU or in some cases additionally DCHU (where indicated). Several changes are typically observed in the NMR spectra upon incorporation of urea compound residues into poly(carbonate-co-urea) and poly(carbonate-co-urea-co-ester) copolymers. For example, the $^{1}$H-NMR signal at about 4.8 ppm of nucleus a in the urea compound disappears, and the $^{1}$H-NMR signal of any alpha hydrogen nucleus shifts from about 3.4 to 3.5 ppm to about 3.9 ppm. In the $^{13}$C-NMR spectra, the urea compound signal at about 165.0 ppm shifts to about 148.4 ppm and a new signal at about 152.0 ppm develops in the case of the poly(carbonate-co-urea) and poly (carbonate-co-urea-co-ester) copolymers. In the $^{15}$N-NMR spectra, the NMR signal of the urea compound at about 75.0 ppm is shifted to about 118.0 ppm in the incorporated residue.

When the copolymer to be analyzed contains "mer" or incorporated monomer repeat units (e.g. incorporated dihydroxy, urea, diacid or diester compound residues) that do not have distinguishable protons or the copolymer composition is not known, $^{13}$C-NMR may be applied. In this case the content of a particular end group, internal linkage, or incorporated monomer residue on a mole percent basis may be determined by measuring the integrated area of the resonance for the particular end group, linkage or incorporated residue type relative to that of the sum total of the carbons of the carbonate and carbamate linkages between incorporated dihydroxy and urea compound residues in the poly(carbonate-co-urea) copolymer backbone. The amount of the species of interest is measured relative to the sum of the carbonate, carbamate and incorporated diacid compound residues in the case of poly (carbonate-co-urea-co-ester)s. A small correction may be needed in order to correct for the small difference in number of carbonate and incorporated dihydroxy compound residues in the poly(carbonate-co-urea) copolymer due to the molar stoichiometry of the monomers and the resulting end group effects. In addition, the NMR method will not always readily distinguish between functional groups in the copolymer versus those in some residual species. In this case, residual analyses may be conducted and then a correction to the NMR data can be made. Alternatively the copolymer may be purified, for example, by precipitation to remove any residual species prior to NMR analysis. Further information on the NMR spectroscopy of melt polycarbonates is given in copending U.S. patent application Ser. No. 11/427,885, filed on Jun. 30, 2006.

C. Molecular Weight

A further advantage of the method described herein is that one can readily choose to make either relatively low or high molecular weight poly(carbonate-co-urea) copolymers by varying the reaction stoichiometry (e.g. ratio of total diaryl carbonate compound/(total dihydroxy+urea compounds)) and/or the amount of total urea compound used in the melt process formulation (e.g. the mole ratio of total urea compound relative to the total molar content of dihydroxy, urea, diacid, and diester compounds).

Relatively low molecular weight precursor copolymers suitable for conversion to high molecular weight copolymers in a subsequent solid-state polymerization may be made. Such precursor poly(carbonate-co-urea) and poly(carbonate-co-urea-co-ester) copolymers have an Mn (PS) in a range of between about 2,000 and about 25,000 g/mol, specifically between about 2,000 and about 20,000 g/mol.

For thermal-forming processes such as compression molding or extrusion or solvent casting processes or copolymer applications requiring that the material have mechanical strength and not be brittle, it is often desirable to have relatively high number average molecular weight poly(carbonate-co-urea) and poly(carbonate-co-urea-co-ester) copolymers, such as those having an Mn (PS) of more than about 6,000, specifically more than about 8,000 g/mol. In one embodiment, the Mn (PS) of the poly(carbonate-co-urea) and poly(carbonate-co-urea-co-ester) copolymers is between 6,000 g/mol and 150,000 g/mol. In a second embodiment, the Mn (PS) of the poly(carbonate-co-urea) and poly(carbonate-co-urea-co-ester) copolymers is between 8,000 g/mol and 150,000 g/mol.

D. Determination of the Molecular Weight of Poly(carbonate-co-urea) Copolymers

The molecular weight measurements of poly(carbonate-co-urea) and poly(carbonate-co-urea-co-ester) may often be conveniently carried out by means of Gel Permeation Chromatography (GPC). The retention times of the copolymers are compared against a calibration curve based upon polystyrene standards, and molecular weights are expressed relative to the measured polystyrene molecular weights. Because further changes in molecular weight may sometimes occur in solution depending on the nature of the copolymer and the solvent, it is important to carry out the GPC analysis rapidly after a good solution of poly(carbonate-co-urea) copolymer in a good solvent and strong eluent is obtained and before any degradation of the poly(carbonate-co-urea) copolymer occurs.

The analysis of other polycarbonate homopolymers and copolymers may necessitate the use of variations in or other copolymer concentrations, polystyrene molecular weight standards, solvent systems, dissolution methods, eluents/mobile phases, stationary phases (composition, crosslinking, porosity, surface functionalization), detector systems (such as those based on refractive index or UV or infrared absorption) and instrumental parameters (flow rate, temperature, and pressure). For example, the mobile phase should be a good solvent for the copolymer, not interfere with the detector response of the copolymer, and should wet the surface of the stationary phase (column packing) well. As an example, chemically-resistant copolymers based on quinine monomers may often conveniently dissolved in a mixed solvent (15/85 vol/vol) of hexafluoroisopropanol (HFIP) and chloroform. Since the GPC method is quite sensitive to the hydrodynamic volume of the copolymer chain, copolymer-solvent interactions may have a significant influence on the retention times measured. In addition, for the measurement of some copolymers, it may be necessary to use multiple detector systems. Care must be taken to avoid reaction between the solute (copolymer) and the stationary phase or any other adsorption phenomena. Such care may be especially important when two solvents are used, one to dissolve the copolymer and the other as eluent. Changing over the solvent system in the chromatograph may also take long periods of time of 24 hours or more before the baseline stabilizes. Some small variations in the retention times and thus the determined molecular weight may be observed based on variations in these various parameters in the GPC method. Further information on the molecular weight analysis of melt polycarbonates is given in copending U.S. patent application Ser. No. 11/427,885.

The GPC method may not be universally applicable for the determination of copolymer molecular weights or to determine whether one has obtained a "poly(carbonate-co-urea) copolymer" or a "poly(carbonate-co-urea-co-ester) copolymer" as used here. For example, some copolymers may be insoluble due to very high molecular weights, their composition, crystallinity or branching. In such cases, it is possible by melt flow rate or melt viscosity measurements to determine whether one has obtained a "poly(carbonate-co-urea) copolymer" or a "poly(carbonate-co-urea-co-ester) copolymer" as used here.

Melt mass-flow rate (MFR) and melt volume-flow rate (MVR) of polycarbonates are measures of the extrusion rate of a polycarbonate melt through a die with a specified length and diameter under set conditions of temperature and loads. Such measurements are typically made according to ISO 1133. These melt flow rate techniques are based on the principle that flow increases with decreasing copolymer viscosity for a given temperature and load test condition. A higher MVR value indicates a lower viscosity under an applied stress (load or weight in kg) and generally decreases as the molecular weight of a particular type of copolymer increases. The test temperature is usually set at or slightly above the melting region of the material being characterized. Melt viscosity is a measurement of the theological characteristics of thermoplastics at temperatures and shear conditions common to processing equipment. Melt viscosities are typically determined by pressing a melt through a die while measuring the pressure drop over the complete or part of this die, and such measurements are typically conducted according to ISO 11443. Zero shear rate viscosities may be determined by measuring the melt viscosity of a copolymer at various shear rates and then extrapolating the data to a shear rate of zero. Melt viscosities generally increase as the molecular weight of a particular type of copolymer increases. It is important to avoid degradation of the copolymer in the melt flow rate or melt viscosity measurement. Degradation of the copolymer may be avoided by carefully drying the copolymer prior to measurement to remove water and the careful selection of measurement parameters such as the measurement temperature and the use of an inert atmosphere, if needed. The melt flow rate or melt viscosity at zero shear viscosity of insoluble copolymers may be compared with those of a polycarbonate BPA-based homopolymer having the specified number average molecular weight (Mn) when measured relative to polystyrene standards according to the GPC method. The insoluble sample is a "poly(carbonate-co-urea) copolymer" as used here, if it has a melt flow rate at least as low as that of the homopolymer or a melt viscosity at least as high as that of the polycarbonate BPA-based homopolymer when measured under the same conditions (e.g. absolute temperature and mass). In the case of embodiments concerning poly(carbonate-co-urea) or poly(carbonate-co-urea-co-ester) copolymers having other molecular weights, one would take polycarbonate BPA-based homopolymers having other molecular weights as reference materials.

Combination of the Subject Matters of the Claims and Embodiments of the Invention One skilled in the art will understand that the combination of the subject matters of the various claims and embodiments of the invention is possible without limitation in the invention. For example, the subject matter of one claim may be combined with the subject matter of one or more of the other claims without limitation to the extent that such combinations are technically feasible. In this combination of subject matters, the subject matter of any one process claim may be combined with the subject matter of one or more other process claims or the subject matter of one or more copolymer claims or the subject matter of a mixture of one or more process claims and one or more copolymer claims. By analogy, the subject matter of any copolymer claim may be combined with the subject matter of one or more process claims or the subject matter of one or more other copolymer claims or the subject matter of a mixture of one or more process claims and one or more copolymer claims. By way of example, the subject matter of claim 1 may be combined with the subject matter of any one of claims 15 to 22. In one embodiment, the subject matter of claim 33 is combined with the subject matter of any one of claims 23 to 29. In another embodiment, the subject matter of claim 30 is combined with the subject matter of any one of claims 31 to 33. In one specific embodiment, the subject matter of claim 1 is combined with that of claim 2. In a second specific embodiment, the subject matter of claim 23 is combined with that of claim 17. In a third specific embodiment, the subject of claim 30 is combined with that of claim 32. In a fourth specific embodiment, the subject matter of claim 33 is combined with that of claim 25. In a fifth specific embodiment, the subject matter of claim 1 is combined with the subject matter of claim 27. By way of another example, the subject matter of claim 1 may also be combined with the subject matters of any two of claims 2 to 33. In one embodiment, the subject matter of claim 1 is combined with the subject matters of any two of claims 2 to 22. In another embodiment, the subject matter of claim 1 is combined with the subject matters of any two of claims 23 to 33. In a specific embodiment, the subject matter of claim 1 is combined with the subject matters of claims 2 and 6. In another specific embodiment, the subject matter of claim 33 is combined with the subject matters of claims 14 and 23. In a third specific embodiment, the subject matter of claim 11 is combined with the subject matters of claims 2 and 6. In a fourth specific embodiment, the subject matter of claim 1 is combined with the subject matters of claims 3 and 17. By way of another example, the subject matter of claim 1 may also be combined with the subject matters of any three of claims 2 to 33. In one specific embodiment, the subject matter of claim 1 is combined with the subject matters of claims 5, 8, and 10. In a second specific embodiment, the subject matter of claim 30 is combined with the subject matters of 20, 22, and 23. In a third specific embodiment, the subject matter of claim 30 is combined with the subject matters of claims 1, 3, and 8. By way of example, the subject matter of any one claim may be combined with the subject matters of any number of the other claims without limitation to the extent that such combinations are technically feasible.

In an analogous manner, any one embodiment of the invention may be combined with any number of the other embodiments of the invention without limitation to the extent that such combinations are technically feasible. In this combination of embodiments, any embodiment may be combined with one or more other embodiments. For example, any number of embodiments related to the process for making the copolymers of the invention may be combined with one another, any number of embodiments related to the copolymers of the invention may be combined with one another, any number of embodiments related to the process for making the copolymers may be combined with any number of embodiments related to the copolymers.

EXAMPLES

The following examples are set forth to provide those of ordinary skill in the art with a detailed description of how the methods claimed herein are evaluated, and are not intended to limit the scope of what the inventors regard as their invention. Unless indicated otherwise, parts are by weight, and temperature is in degrees Celsius (° C.).

Molecular weights are reported as number average, Mn (PS), or weight average, Mw (PS) molecular weight and were determined by GPC using polymer solutions comprising the product polycarbonate homopolymers and copolymers at a concentration of about 1 milligram (mg) per milliliter (mL) in chloroform ($CHCl_3$). A 12-point calibration line covering the entire molecular weight range was constructed using polystyrene standards with a narrow molecular weight distribution (polydispersity (PD) of less than 1.01). A mixed solvent (5/95 vol/vol) of hexafluoroisopropanol (HFIP) in chloroform was used as the mobile phase. The temperature of the gel permeation columns was 35° C. The retention times of the example polymers were compared against the calibration curve, and their molecular weights are expressed here relative to the measured polystyrene molecular weights for both the homopolymer and copolymer samples.

Compositional analysis of the poly(carbonate-co-urea) copolymers was done by NMR spectroscopy.

Some of the Examples were characterized in more detail for additional properties (Table 5). For example, glass transition temperature (Tg) values were determined by differential scanning calorimetry, using a Perkin Elmer DSC7. The Tg was calculated, based on the "one half Cp" method (heat capacity at constant pressure), using a heating ramp of 20° C./minute.

Transparency (% T) was measured on a cast film (2 g of polymer dissolved in 20 ml of $MeCl_2$), poured into a Petri-dish, followed by evaporation of the $MeCl_2$ to yield films of about 0.3 mm in thickness. The transparency was measured according to ASTM test method D1003 using a Byk-Gardner Hazeguard plus, resulting in % T data.

Flame Retardance (FR) data was obtained by mg-scale Pyrolysis Combustion Flow Calorimetry (PCFC). The PCFC technique makes use of the methods of traditional oxygen depletion calorimetry. In the PCFC measurement, the sample specimen is first heated at a constant rate of temperature rise (typically 1-5° C./s) in a pyrolyzer, and the degradation products are swept from the pyrolyser by means of an inert gas flow. The resulting gas stream is mixed with oxygen and enters a combustor at 900° C., where the decomposition products are completely oxidized. Oxygen concentrations and flow rates of the combustion gases are used to determine the oxygen depletion involved in the combustion process, and the heat release rates are determined from these measurements. Therefore PCFC analysis results in values for the HRC (Heat Release Capacity), totHR (total heat release) and % char of the poly(carbonate-co-urea) copolymers. R.N. Walters and R.E. Lyon have described the PCFC analytical method in two publications: "Calculating Polymer Flammability from Molar Group Contributions", DOT/FAA/AR-01/31, FAA William J. Hughes Technical Center, September 2001; and "A Microscale Combustion Calorimeter", DOT/FAA/AR-01/117, FAA William J. Hughes Technical Center, February 2002; as well as in U.S. Pat. No. 5,981,290.

Measurement of refractive index (RI) was done on a cast film (2 g of polymer dissolved in 20 ml of $MeCl_2$), poured into a Petri-dish, followed by evaporation of the MeCl2 and subsequent analysis using a Woolam M2000UI SE (Spectroscopic Ellipsometer). The ellipsometer uses the intensity and polarization state of monochromatic light reflected from the sample surface to determine the optical parameters for a broad spectrum of wavelengths. The data was fit to a Cauchy model given below in Equation (3) in order to describe the dependence of the refractive index on wavelength (dispersion relationship) which best describes the optical properties measured by the ellipsometer:

$$n_\lambda = A + \frac{B}{\lambda^2} + \frac{C}{\lambda^4}$$

where n is the RI at wavelength lambda, and A, B, and C are the model constants which best fit the ellipsometer data. From this best-fit Cauchy model, the RI's at 3 Fraunhofer spectral lines (F line (cyan/green) at 486.1 nm, D line (yellow) at 589.2 nm and C line (red) at 656.3 nm) can then be simply calculated. In the examples here, the RI's at the D line (589.2 nm) are reported.

Determination of the dispersion in the form of the Abbe number (Abbe #) was carried out by computational methods based on the RI's whose determination is described in the previous section. The Abbe # V of a material is defined in Equation (4) as:

$$V = \frac{n_D - 1}{n_F - n_C}$$

where $n_D$, $n_F$ and $n_C$ are the RI's of the material at the wavelengths of the Fraunhofer D, F and C spectral lines.

Incorporation of the monomer residues was confirmed using a variety of spectroscopic techniques as described earlier: H-NMR, $C^{13}$-NMR, N-NMR and FTIR.

Flammability was tested according Underwriters Laboratories (UL) 94 rating test for Flammability of Plastic Materials for Parts in Devices and Appliances Weight loss data was obtained on a Perkin Elmer TGA 7 thermogravimetric analysis system.

Reactions were carried out with BPA and different amounts of urea compound comonomer or with only the urea compound (thus, without BPA). In general the amount of urea compound comonomer employed is expressed in terms of its mole ratio. Mole ratio as used herein is defined as (number of moles of urea compound comonomer/(total moles of dihydroxy compound and urea compound monomer)). Unless otherwise indicated, a slight excess of bis(methylsalicylate) carbonate (BMSC) or diphenyl carbonate (DPC) was employed, meaning that the amount of BMSC or DPC expressed in moles was slightly greater than the stoichiometric amount theoretically required to effect complete reaction between all of the co-monomers (dihydroxy and urea compounds). In the Examples that follow, the melt polymerization (transesterification) catalyst was tetramethylammonium hydroxide (TMAH) in combination with sodium hydroxide. Catalysts were added as aqueous solutions, the total volume added being about 100 microliters (μl). In cases where the monomers (e.g. the urea compound and the diaryl carbonate) were pre-reacted, the pre-reaction was carried out in the presence of the catalyst. The melt polymerizations were carried out in a standard laboratory melt reactor constructed of glass, equipped to stir a viscous melt, and adapted for removal of volatile reaction byproducts such as methyl salicylate or phenol, at ambient or sub-ambient pressure. The reactor was purged with nitrogen after being charged with reactants. The catalyst was added following the nitrogen purge. Upon completion of the melt polymerization reaction, the reactor was brought back to atmospheric pressure with a gentle nitrogen flow, and the copolymer was recovered.

A. N,N-Ethylene urea (EU, CAS Nr. 120-93-4)

This monomer N,N'-ethylene urea (EU) was purified before use as follows: The monomer EU (50 g) was suspended in THF (250 ml) and heated to 60° C. while stirring to obtain a clear solution. Silica gel (10 g) was then added to this solution and stirring continued at 60° C. for two hours. The solution was next filtered while still hot, and the filtrate was crystallized. The white crystals obtained were separated by filtration and washed and dried under vacuum at 80° C. The weight of the dried product was 40.2 g (~80% recovery). Organic purity of the EU determined by HPLC analysis was approximately 100%, and the metal content is given below in Table 3.

TABLE 3

ICP analysis of metal content of purified EU

| | Metal | | | | | |
|---|---|---|---|---|---|---|
| | Cr | Fe | Ni | Mn | Zn | K |
| concentration (ppb) | 23 | 658 | <10 | <10 | 278 | 216 |

Example 1

0.25 Mole Ratio of EU Relative to Total Dihydroxy and Urea Compound Content

To polymerize N,N'-ethylene urea copolymers (EU copolymers), a glass reactor tube was filled with 0.061 mole of BMSC and 0.0148 mole of EU. Due to the volatility of EU, the mixture of BMSC and EU was pre-reacted in the presence of the catalyst prior to adding the dihydroxy compound, BPA. Reaction was carried out in the presence of $2.63\times10^{-7}$ mole of NaOH and $2.63\times10^{-6}$ mole of TMAH using the following reaction temperature-pressure profile:

Time (minutes) Action (Start)—Set h eating mantle to 120° C., overhead tracing 100° C., 1000 mbar.

6—Start stirring (40 rpm).

15—Set pressure to 500 mbars.

27—Slowly reduce pressure to 50 mbars.

31—Reach reduced pressure of 50 mbars.

35—Bring reactor back to atmospheric pressure with a gentle nitrogen flow.

At this point the reactor set-up was opened and the required amount of BPA was added.

36—Add 0.0445 mole of BPA to the molten mixture.

37—Set heating mantles to 240° C., reduce pressure to 50 mbars.

40—Reduce pressure to full vacuum (~0.5 mbars).

50—Set heating mantles to 260° C.

55—Bring reactor pressure back to atmospheric pressure, stop stirring.

Analytical results of this polymerization can be found in Tables 4 and 5.

Example 2

0.25 Mole Ratio of EU Relative to Total Dihydroxy and Urea Compound Content

In this example, a different monomer ratio was used to further improve the Mw (PS)build of the poly(carbonate-co-urea) copolymer. First, 0.0159 mole of EU was pre-reacted in the presence of the catalyst with 0.061 mole of BMSC. After the pre-reaction as in Example 1, 0.0478 mole BPA was added. After subsequent nitrogen purging of the reactor system and addition of the catalyst (at the same levels as used in Example 1), the same reaction temperature-pressure profile as in Example 1 was used to carry out the melt polymerization with the exception that a final polymerization temperature of 280° C. was required to control viscosity. Analytical results of this polymerization can be found in Tables 4 and 5.

Example 3

0.25 Mole Ratio of EU Relative to Total Dihydroxy and Urea Compound Content

A third monomer ratio was used to still further improve Mw (PS)build of the poly(carbonate-co-urea) copolymer. Specifically, 0.0151 mole of EU was pre-reacted in the presence of the catalyst with 0.061 mole of BMSC. After this pre-reaction, 0.0454 mole of BPA was added. After nitrogen purging of the reactor system and addition of the catalyst (at the same levels as used in Example 1), the same reaction temperature-pressure profile as in Example 2 was used to carry out the melt polymerization. Analytical results of this polymerization can be found Tables 4 and 5.

Example 4

0.10 Mole Ratio of EU Relative to Total Dihydroxy and Urea Compound Content

In this example, another molar percentage of incorporated EU co-monomer was targeted. First, 0.0059 mole of EU was pre-reacted in the presence of the catalyst with 0.061 mole of BMSC. After the pre-reaction, 0.0534 mole of BPA was added. After nitrogen purging of the reactor system and addition of the catalyst (at the same levels as used in Example 1), the same reaction temperature-pressure profile as in Example 2 was used to carry out the melt polymerization. Analytical results of this polymerization can be found in Table 4.

Example 5

0.20 Mole Ratio of EU Relative to Total Dihydroxy and Urea Compound Content

Still another mole percentage of EU as co-monomer was targeted, and 0.0118 mole of EU was pre-reacted with 0.061 mole of BMSC in the presence of the catalyst in this example. After pre-reaction, 0.0475 mole of BPA was added. After nitrogen purging of the reactor system and addition of the catalyst (at the same levels as used in Example 1), the same reaction temperature-pressure profile as in Example 2. Analytical results of this polymerization can be found in Table 4.

Example 6

0.33 Mole Ratio of EU Relative to Total Dihydroxy and Urea Compound Content

A different percentage of EU as co-monomer was targeted in this example, and 0.0200 mole of EU was pre-reacted with 0.061 mole of BMSC in the presence of the catalyst. After the pre-reaction, 0.0406 mole of BPA was added. After nitrogen purging of the reactor system and addition of the catalyst (at the same levels as used in Example 1), the same reaction temperature-pressure profile as in Example 1 was used to carry out the melt polymerization. Analytical results of this polymerization can be found in Table 4.

Example 7

0.50 Mole Ratio of EU Relative to Total Dihydroxy and Urea Compound Content

Yet another mole percentage of EU as co-monomer was targeted, and thus 0.0303 mole of EU was pre-reacted with 0.061 mole of BMSC in the presence of the catalyst. After pre-reaction, 0.0303 mole of BPA was added. After nitrogen purging of the reactor system, and addition of the catalyst (at the same levels as used in Example 1), the same reaction temperature-pressure profile as in Example 1 was used to carry out the melt polymerization. Analytical results of this polymerization can be found in Table 4.

Example 8

DPC as Carbonate: 0.25 Mole Ratio of EU Relative to Total Dihydroxy and Urea Compound Content To polymerize a EU copolymer, a glass reactor tube was filled with 0.1167 mole of DPC and 0.0232 mole of EU. Due to the volatility of EU, the mixture of DPC and EU was pre-reacted in the presence of the catalyst. As discussed earlier, a somewhat higher molar ratio was used in this example relative to the their earlier ones using BMSC since some of the DPC is readily devolatilized prior to reaction, reducing the stoichiometric ratio of carbonate over total dihydroxy and urea. Reaction was carried out in the presence of $4.05\times10^{-7}$ mole of NaOH and $4.05\times10^{-6}$ mole of TMAH using the following reaction temperature-pressure profile:

Time (minutes) Action
(Start)—Set heating mantle to 120° C., overhead tracing 100° C., 1000 mbar.
6—Start stirring (40 rpm).
10—Set pressure to 170 mbars.
40—Set temperature to 230° C.
70—Bring reactor back to atmospheric pressure with a gentle nitrogen flow.

At this point the reactor set-up was opened and, the required amount of BPA was added.

71—Add 0.081 mole of BPA to the molten mixture.
72—Set heating mantles to 270° C., reduce pressure to 20 mbars.
102—Reduce pressure to full vacuum (~0.5 mbars).
110—Set heating mantles to 280° C.
130—Bring reactor back to atmospheric pressure, stop stirring.

Analytical results of this polymerization can be found in Tables 4 and 5.

Example 9

DPC as Carbonate: 0.25 Mole Ratio of EU Relative to Total Dihydroxy and Urea Compound Content To polymerize a EU copolymer, a glass reactor tube was filled with 0.1167 mole of DPC and 0.0232 mole of EU. Due to the volatility of EU, the mixture of DPC and EU was pre-reacted in the presence of the catalyst. As discussed earlier, a somewhat higher molar ratio was used in this example since some of the DPC is readily devolatilized prior to reaction. Reaction was carried out in the presence of $4.05\times10^{-7}$ mole of NaOH and $4.05\times10^{-6}$ mole of TMAH using the following reaction temperature-pressure profile:

Time (minutes) Action
(Start)—Set heating mantle to 120° C., overhead tracing 100° C., 1000 mbar.
6—Start stirring (40 rpm).
10—Set pressure to 170 mbars.
40—Set heating mantles to 230° C.
70—Set heating mantles to 270° C., reduce pressure to 20 mbars.
100—Reduce pressure to full vacuum (0.5 mbars).
110—Set heating mantles to 280° C.
130—Bring pressure back to atmospheric pressure, stop stirring.

Analytical results of this polymerization can be found in Tables 4 and 5.

B. N,N'-Propylene urea (PU, CAS Nr. 1852-17-1)

Example 10

0.20 Mole Ratio of PU Relative to Total Dihydroxy and Urea Compound Content

To polymerize a PU copolymer, a glass reactor tube was filled with 0.06 μmole of BMSC and 0.0119 mole of PU and 0.0475 mole of BPA. Reaction was carried out in the presence of $2.63\times10^{-7}$ mole of NaOH and $2.63\times10^{-6}$ mole of TMAH using the following reaction temperature-pressure profile:

Time (minutes) Action
(Start)—Set heating mantle to 120° C., overhead tracing 100° C., 1000 mbar.
6—Start stirring. (40 rpm).
15—Set pressure to 500 mbars.
30—Set heating mantles to 250° C., reduce pressure to 100 mbars.
35—Reduce pressure to full vacuum (~0.5 mbars).
40—Set heating mantles to 270° C.
50—Bring pressure back to atmospheric pressure, stop stirring.

Analytical results of this polymerization can be found in Table 4.

Example 11

0.25 mole Ratio of PU Relative to Total Dihydroxy and Urea Compound Content

To polymerize a PU copolymer, a glass reactor tube was filled with 0.061 mole BMSC and 0.0148 mole of PU and 0.0445 mole of BPA. After nitrogen purging of the reactor system and addition of the catalyst (at the same levels as used in Example 10), the same reaction temperature-pressure profile as in Example 10 was used to carry out the melt polymerization. Analytical results of this polymerization can be found in Tables 4 and 5.

Example 12

0.25 Mole Ratio of PU Relative to Total Dihydroxy and Urea Compound Content

To polymerize a PU copolymer, a glass reactor tube was filled with 0.061 mole of BMSC and 0.0151 mole of PU and 0.0454 mole of BPA. After nitrogen purging of the reactor system and addition of the catalyst (at the same levels as used in Example 10), the same reaction temperature-pressure profile as in Example 10 was used to carry out the melt polymerization. Analytical results of this polymerization can be found in Tables 4 and 5.

Example 13

0.33 Mole Ratio of PU Relative to Total Dihydroxy and Urea Compound Content

To polymerize a PU copolymer, a glass reactor tube was filled with 0.061 mole of BMSC and 0.020 mole of PU and 0.0406 mole of BPA. After nitrogen purging of the reactor system and addition of the catalyst (at the same levels as used in Example 10), the same reaction temperature-pressure profile as in Example 10 was used to carry out the melt polymerization. Analytical results of this polymerization can be found in Table 4.

Example 14

0.50 Mole Ratio of PU Relative to Total Dihydroxy and Urea Compound Content

To polymerize a PU copolymer, a glass reactor tube was filled with 0.061 mole BMSC and 0.0303 mole of PU and 0.0303 mole of BPA. After nitrogen purging of the reactor system and addition of the catalyst (same levels as used in Example 10), the same reaction temperature-pressure profile as in Example 10 was used to carry out the melt polymerization. Analytical results of this polymerization can be found in Table 4.

Example 15

Reactive Extrusion Process: 0.05 Mole Ratio of PU Relative to Total Dihydroxy and Urea Compound Content A mole ratio of 0.05 PU relative to BPA and PU was used to prepare a poly(carbonate-co-urea) copolymer of PU and BPA was made via the BMSC/melt reactive extrusion process. The samples were synthesized using a reactor system such as the one shown in FIG. 12 using the following method. A stainless steel stirred reactor tank (M) was charged with 25,825 g of BPA, 595.8 g of PU, and 40,000 g of BMSC to give a molar ratio of (diaryl carbonate)/(dihydroxy and urea compounds) equal to about 1.017. An aqueous catalyst solution of tetramethylammonium hydroxide (TMAH) and sodium hydroxide (NaOH) in an amount corresponding to $5.0\times10^{-5}$ moles TMAH and 4.0 x10-6 moles of NaOH per total number of moles of BPA and PU was also added to the reactor tank. The reactor tank was then evacuated and purged with nitrogen three times to remove residual oxygen and then held at a constant vacuum pressure of 800 mbar. The reactor was then heated to 170° C. in order to melt and react the mixture. After approximately 5 hr 4 min from the start of heating of the reactor tank, the reactor tank was pressurized with nitrogen to a constant overpressure of 0.9 bar, and the molten reaction mixture was fed through a 170° C. heated feed-line (1) into an extruder (C) at a rate of about 10 kg/h. Fifteen minutes before starting the feed to the extruder a final catalyst addition was made by adding an aqueous catalyst solution of sodium hydroxide (NaOH) in an amount corresponding to $6.0\times10^{-6}$ moles of NaOH per total number of moles of BPA and PU to the reactor tank. The oligomer fed to the reactive extruder was analyzed and found to have a Mw (PS) of 7,205 g/mol and an Mn (PS) of 4,389 g/mol. The extruder (C) is a Werner & Pfleiderer ZSK25WLE 25 mm 13-barrel twin-screw extruder with an L/D of 59. The feed into the extruder comprised a flash-valve to prevent boiling of the molten mixture. The reaction mixture was reactively extruded at a screw speed of 300 rpm. The extruder was equipped with five forward vacuum vents (3) and one back-vent (2). The methyl salicylate byproduct is removed via devolatilization through these vents. The vacuum pressure of the back-vent (2) was 11 mbar. The vacuum pressure of the first forward vent (3) was 3 mbar. The vacuum pressure of the final four forward vents (3) was less than 1 mbar. This PU copolymer was made with all the extruder barrels at a temperature of 300° C. and the extruder die head at a temperature of 300° C. The properties of this PU copolymer are reported in Tables 4 and 5.

Example 16

Continuous Reaction Profile: 0.25 Mole Ratio of PU Relative to Total Dihydroxy and Urea Compound Content To polymerize a PU copolymer, a glass reactor tube was filled with 0.061 mole BMSC, 0.0151 mole of PU and 0.0454 mole of BPA. After nitrogen purging of the reactor system and addition of the catalyst (at the same levels as used in example 10), the following reaction temperature-pressure profile was used to carry out the polymerization. The reactor was heated over a period of 1 hour, starting at 20° C., ending at 300° C., by increasing the temperature with a rate of 4.67° C./min. During this hour, the pressure was reduced from 1000 mbar to full vacuum (Q0.5 mbar), decreasing pressure at 16.67 mbar/min. Analytical results of this polymerization can be found in Table 4. C. N,N'-dicyclohexyl-urea (DCHU, CASNr. 2387-23-7)

Example 17

0.10 Mole Ratio of DCHU Relative to Total Dihydroxy and Urea Compound Content To polymerize a DCHU copolymer, a glass reactor tube was filled with 0.061 mole BMSC, 0.00604 mole of DCHU and 0.0544 mole of BPA. After nitrogen purging of the reactor system and addition of the catalyst (at the same levels as used in example 10), the following reaction temperature-pressure profile was used to carry out the polymerization:

Time (minutes) Action (Start)—Set heating mantle to 170° C., overhead tracing 100° C., 1000 mbar.

6—Start stirring (40 rpm).

15—Set pressure to 500 mbars.

20—Set heating mantles to 230° C.

25—Reduce pressure to 100 mbars.

27—Increase heating mantle temperature to 250° C.

30—Reduce pressure to full vacuum (~0.5 mbars).

32—Set heating mantle temperature to 300° C.

37—Bring pressure back to atmospheric pressure, stop stirring.

The polymerization yielded a colorless, transparent and ductile polymer. Analytical results of this polymerization can be found in Table 4.

Example 18

Preparation of poly(carbonate-co-urea-co-ester): 0.10 Mole Ratio of DCHU Relative to Total Dihydroxy, Urea and Diacid Compound Content In order to prepare a poly(carbonate-co-urea-co-ester) copolymer, Example 17 was repeated, but in this example a glass reactor was filled with 0.061 mole BMSC, 0.00303 mole DDDA, 0.0515 mole BPA, and 0.00604 mole DCHU. All other reaction parameters were the same as in Example 17.

The polymerization yielded a colorless, transparent and ductile polymer. Analytical results of this polymerization can be found in Table 4.

Comparative Example 1

Attempted PU Homopolymerization: 1.0 Mole Ratio of PU Relative to Total Dihydroxy and Urea Compound Content An attempt was made to make a homopolymer of PU via the BMSC/melt reaction. The sample was synthesized as follows: A glass reactor tube was filled with 0.0605 mole BMSC and 0.0605 mole of PU. Reaction was carried out in the presence of $2.63\times10^{-7}$ mole of NaOH and $2.63\times10^{-6}$ mole of TMAH using the following reaction temperature-pressure profile:

Time (minutes) Action (Start)—Set heating mantle to 120° C., overhead tracing 100° C., 1000 mbar.

6—Start stirring (40 rpm).

15—Set pressure to 500 mbars (lowered with 150 mbar/min), set heating mantle to 170° C.

20—Set heating mantles to 230° C., pressure to 100 mbars (lowered with 150 mbar/min), 25—set pressure to 50 mbars 30—Reduce pressure to full vacuum (~0.5 mbars), set heating mantles to 270° C.

35—Bring pressure back to atmospheric pressure, stop stirring

Analytical results of this polymerization can be found in Table 4.

Comparative Example 2

As a reference for the optical and FR measurements a commercial BPA homopolymer grade was used, as supplied by General Electric Plastics (Lexan® Polycarbonate 101 Grade). Analytical results obtained on this polymer can be found in Tables 4 and 5.

Comparative Example 3

Continuous Reaction Profile

To polymerize a BPA homopolymer, a glass reactor tube was filled with 0.061 mole of BMSC and 0.0593 mole of BPA. After nitrogen purging of the reactor system and addition of the catalyst system (at the same levels as used in example 10), the same temperature-pressure profile and process steps described in Example 16 were employed in order to make a homopolymer.

Analytical results of this polymerization can be found in Table 4.

TABLE 4

Preparation and Structure of Example Copolymers

| example | comonomer urea | comonomer diol | comonomer diacid | mole ratio of urea | carbonate | stoichiometric molar ratio | molecular weight properties Mw (PS) g/mol | molecular weight properties Mn (PS) g/mol | Pd |
|---|---|---|---|---|---|---|---|---|---|
| 1 | ethylene urea | BPA | NA | 0.25 | BMSC | 1.02 | 18,130 | 6,715 | 2.70 |
| 2 | ethylene urea | BPA | NA | 0.25 | BMSC | 0.95 | 48,332 | 13,188 | 3.66 |
| 3 | ethylene urea | BPA | NA | 0.25 | BMSC | 1.00 | 67,666 | 15,684 | 4.31 |
| 4 | ethylene urea | BPA | NA | 0.1 | BMSC | 1.02 | 52,153 | 23,705 | 2.20 |
| 5 | ethylene urea | BPA | NA | 0.2 | BMSC | 1.02 | 47,000 | 19,583 | 2.40 |
| 6 | ethylene urea | BPA | NA | 0.33 | BMSC | 1.00 | 16,005 | 6,402 | 2.50 |
| 7 | ethylene urea | BPA | NA | 0.5 | BMSC | 1.00 | 6,671 | 2,779 | 2.40 |
| 8 | ethylene urea | BPA | NA | 0.25 | DPC | 1.08 | 135,412 | 17,122 | 7.91 |
| 9 | ethylene urea | BPA | NA | 0.25 | DPC | 1.08 | 148,345 | 21,453 | 6.91 |
| 10 | propylene urea | BPA | NA | 0.2 | BMSC | 1.02 | 32,477 | 11,198 | 2.90 |
| 11 | propylene urea | BPA | NA | 0.25 | BMSC | 1.02 | 30,119 | 11,155 | 2.70 |
| 12 | propylene urea | BPA | NA | 0.25 | BMSC | 1.00 | 51,990 | 14,854 | 3.50 |
| 13 | propylene urea | BPA | NA | 0.33 | BMSC | 1.00 | 8,744 | 3,363 | 2.60 |
| 14 | popylene urea | BPA | NA | 0.5 | BMSC | 1.00 | 6,317 | 2,871 | 2.20 |
| 15 | propylene urea | BPA | NA | 0.05 | BMSC | 1.02 | 53,748 | 24,434 | 2.20 |
| 16 | propylene urea | BPA | NA | 0.25 | BMSC | 1.00 | 18,842 | 9,203 | 2.05 |
| 17 | N,N'-dicyclohexyl-urea (DCHU) | BPA | NA | 0.1 | BMSC | 1.02 | 46,619 | 18,067 | 2.58 |
| 18 | N,N'-dicyclohexyl-urea (DCHU) | BPA | dodecanedioic acid (DDDA) | 0.1 | BMSC | 1.02 | 65,734 | 26,267 | 2.50 |
| CE-1 | propylene urea | NA | NA | 1 | BMSC | 1.00 | <2,000 | <1,000 | |
| CE-2 | 101 Grade Polycarbonate | | | NA | NA | NA | 51,189 | 19,038 | 2.69 |
| CE-3 | none | BPA | NA | 0 | BMSC | 1.02 | 63,979 | 27,208 | 2.35 |

| example | incorporated urea ( mole %) | end groups T-MSC (mole %) | end groups free OH (ppm) | end groups Salicyl-OH (ppm) | internal linkages IEL (mole %) | internal linkages linear Fries (ppm) | internal linkages branched Fries (ppm) |
|---|---|---|---|---|---|---|---|
| 1 | 16.8 | 14.7 | 52 | <5 | 0.11 | BDL | BDL |
| 2 | 21.3 | 1.3 | 280 | <5 | <0.05 | BDL | BDL |
| 3 | 23.7 | 1.1 | 320 | <5 | <0.05 | BDL | BDL |
| 4 | 9.0 | NM | NM | NM | NM | BDL | BDL |
| 5 | 17.0 | NM | NM | NM | NM | BDL | BDL |
| 6 | 27.3 | NM | NM | NM | NM | BDL | BDL |
| 7 | 21.4 | NM | NM | NM | NM | BDL | BDL |
| 8 | 22.1 | NA | NM | NA | NA | ca 250 | ca 250 |
| 9 | 22.2 | NA | NM | NA | NA | BDL | ca 500 |
| 10 | 2.4 | 1.8 | 300 | BDL | <0.05 | BDL | BDL |
| 11 | 2.4 | NM | NM | NM | NM | BDL | BDL |
| 12 | 2.5 | 1.3 | 471 | BDL | <0.05 | BDL | BDL |
| 13 | 8.8 | 2.5 | BDL | BDL | <0.05 | BDL | BDL |
| 14 | 21.6 | NM | NM | NM | NM | BDL | BDL |
| 15 | 0.5 | 1.3 | 52 | <5 | <0.05 | BDL | BDL |
| 16 | 2.2 | 2.74 | BDL | BDL | <0.05 | BDL | BDL |
| 17 | 0.6 | 1.5 | 749 | 21 | <0.05 | BDL | BDL |
| 18 | 0.5 DCHU (4.8 DDDA) | 0.4 | 828 | 22 | <0.05 | BDL | BDL |
| CE-1 | NA | 11.5 | BDL | BDL | BDL | BDL | BDL |
| CE-2 | NA | NA | NA | NA | NA | NA | NA |
| CE-3 | NA | NM | NM | NM | NM | NM | NM |

BDL = Below Detection Limit
NM = Not Measured

TABLE 5

| | | Preparation and Properties of Some Representative Example Copolymers | | | | | | | | | | |
|---|---|---|---|---|---|---|---|---|---|---|---|---|
| | | TGA | | | | Optical Properties | | | Flame Retardance Properties | | |
| example | UL rating | 1% loss (° C.) | 5% loss (° C.) | 10% loss (° C.) | Tg (° C.) | % T | RI | Abbe# | HRC (J/g/K) | totHR (kJ/g) | % char |
| 1 | NM | 347 | 375 | 410° C. | 131 | NM | NM | NM | NM | NM | NM |
| 2 | NM | NM | NM | NM | NM | 90.8 | 1.587 | 37 | 316 | 18 | 18 |
| 3 | NM | NM | NM | NM | 137 | NM | NM | NM | NM | NM | NM |
| 8 | NM | NM | NM | NM | 163 | NM | NM | NM | 392 | 20.4 | 18 |
| 9 | NM | NM | NM | NM | 166 | NM | NM | NM | NM | NM | NM |
| 11 | NM | NM | NM | NM | 133 | 90.6 | NM | NM | NM | NM | NM |
| 12 | NM | NM | NM | NM | NM | NM | NM | NM | 430 | 20.5 | 22 |
| 15 | V2@1.6 mm<br>V2@2.0 mm<br>V2@3.0 mm | 352 | 395 | 450° C. | 144 | 91.0 | 1.584 | NM | NM | NM | NM |
| CE-2 | V2@1.6 mm<br>fail@2.0 mm<br>fail@3.0 mm | NM | NM | NM | 145 | 91.3 | 1.589 | 31.2 | 514 | 20 | 23 |

NM = Not Measured

FIGS. 7 to 9 show the infrared and NMR spectral data demonstrating the incorporation of the urea compound (EU) in the poly(carbonate-co-urea) copolymer product of Example 1. The EU content of this copolymer is approximately 16.8 mole % and the BPA content is approximately 83.2 mole % with respect to the total content of incorporated diol and urea units. The groups X, Y and Z in these figures represent additional sequences of incorporated monomer units. Therefore no intention is made in the representation in these figures to specifically indicate any one type of possible chain microstructure such as random, partially-alternating, random-block etc. The chromatographic data of the hydrolyzed form of this same poly(carbonate-co-urea) copolymer in FIG. 10 further demonstrates that the intact EU monomer is present after hydrolysis of the carbonate and carbamate linkages in the copolymer. Therefore it can be concluded that the EU monomer is incorporated without any substantial degradation of its structure.

Examples 1 to 3 illustrate how the molecular weight of poly(carbonate-co-urea) copolymers obtained at full conversion using activated diaryl carbonates may be influenced by the use of different stoichiometric molar ratios of diaryl carbonate compound to dihydroxy and urea compounds ((moles of diaryl carbonate compound)/((moles of dihydroxy compound)+(moles of urea compound)). As discussed earlier, the exact dependence of molecular weight on this ratio will depend somewhat upon the purity of the monomers and various other factors. As shown by these examples, one can however readily determine this relationship between molecular weight and stoichiometric ratio for a particular set of monomers and reaction conditions.

It can also be seen from the Examples how the mole ratio of urea compound relative to the total amount of dihydroxy and urea compounds influences the molecular weight of the poly(carbonate-co-urea) copolymer product obtained. This effect is most readily seen when comparing the examples using the same urea compound (EU or PU) and the same stoichiometric molar ratio (1.00 or 1.02) and the same diaryl carbonate monomer (BMSC). Relatively low copolymer molecular weights are obtained when relatively high mole ratios of urea compound are used. Compare, for example, the molecular weight of the copolymer obtained in Example 1 versus those in Examples 5 and 4, the copolymer molecular weight in Example 7 versus those in Examples 6 and 3, and the molecular weight in Example 14 versus those in Examples 13 and 12. A graphical summary of the influence of the mole ratio of urea compound in the melt process formulation on the molecular weight of the resulting poly(carbonate-co-urea) copolymer is shown in FIG. 11. Comparative Example 1 shows a further example of the importance of controlling the mole ratio of urea compound relative to the total amount of dihydroxy and urea compounds. In Comparative Example 1, an attempt to make a homopolymer of the urea compound by the melt polymerization method failed, resulting only in a low molecular weight oligomer.

The Examples also show that the use of an activated diaryl carbonate like BMSC (Examples 1 to 7) rather than DPC (Examples 8 & 9) influences the properties of the poly(carbonate-co-urea) obtained. A comparison of these respective examples shows that the copolymers prepared using the activated diaryl carbonate BMSC have a much lower polydispersity (Pd) and lower Tg. These properties are probably a result of lesser branching byproduct formed in the polymerization reaction using the activated diaryl carbonate because of its milder reaction conditions (i.e., shorter reaction time and less residence time spent at elevated temperatures). For example, internal Fries linkages are known to occur in melt polymerization using DPC. Indeed the data in Table 4 confirm that Examples 8 and 9 contain several hundred ppm of branched internal Fries linkages, whereas Examples 1 and 7 show no detectable branched internal Fries linkages.

A variety of distinctive incorporated residues, end groups and internal linkages are present in the Examples. For example, NMR analysis indicated that all of the copolymers in the Examples contained significant levels of incorporated urea compound residues, as shown in FIGS. 8 and 9 for the case of Example 1 and as tabulated in Table 4 for the Examples. The data in Table 4 also indicates that significant levels of T-MSC end groups (terminal (methylsalicyl)carbonate: a type of ortho-(ester-substituted) phenyl carbonate end group) are found in the Examples prepared using the activated diaryl carbonate BMSC (Examples 1 to 7 and 10 to 18), but these same end groups are absent in Examples 8 and 9 prepared using DPC. Several of the Examples contain also significant levels of the Internal Ester Linkage (IEL), and the NMR analysis of the Examples confirmed the presence of internal dicarbamate-urea linkages, for example, as shown in FIGS. 8 and 9 for the case of Example 1.

The Examples also demonstrate that a variety of reactor systems and reaction temperature-pressure profiles may be used in order to prepare poly(carbonate-co-urea) copolymers by melt polymerization. For example, a simple batch reactor system was used to prepare poly(carbonate-co-urea) copolymers from BPA and PU in Examples 10 to 14 and 16. A semi-continuous reactor system comprising a continuous stirred reactor and a reactive extruder was used to prepare a poly(carbonate-co-urea) copolymer from these same monomers in Example 15. An essentially continuous reaction temperature-pressure profile was used in the batch reaction in Example 16; whereas a stepwise reaction temperature-pressure profile was used for the batch polymerization of the same melt process formulation in Example 12. It would appear that the step-wise reaction temperature-pressure profile gives a much higher molecular weight copolymer in the case of the particular melt process formulation and reactor system used in these two examples.

The Claims should not be interpreted as limited to any particular theory of operation, but it is presently thought that the reason for this difference in molecular weight may be due to stoichiometric ratio distortion due to monomer volatilization. It is noted that in the continuous reaction temperature-pressure profile the monomeric reactants are exposed much more quickly to vacuum levels sufficient to devolatize volatile monomer that has not yet reacted. Such losses in monomer cause a shift in stoichiometry and thus also a shift in the molecular weight obtained at full conversion when activated diaryl carbonate monomers like BMSC are used. Comparative Example 3 shows that such potentially undesirable changes in stoichiometry may be less of a problem when only monomers having limited volatility and high reactivity like BPA are used in the process. Furthermore, all of the reaction temperature-pressure profiles to prepare poly(carbonate-co-urea) copolymers from the more volatile urea compound, EU, were done using a first pre-reaction step of the EU together with the diaryl carbonate (Examples 1 to 9). In contrast, no separate pre-reaction step of the urea compound together with the diaryl carbonate was required in the polymerizations using the less volatile urea compound, PU (Examples 10 to 16).

The Examples also demonstrate that a variety of urea compounds may be used in the preparation of poly(carbonate-co-urea) copolymers. For example, two "cyclic" urea compounds, namely EU and PU were used in the preparation of Examples 1 to 16, and a "non-cyclic" urea compound, DCHU, was used in Examples 17 and 18. In addition, Example 18 also demonstrates the preparation of a poly(carbonate-co-urea-co-ester) copolymer. In this Example, the diacid, DDDA, is used as a comonomer.

The data reported in Table 5 for some representative example copolymers demonstrates that urea compound comonomers improve the flame retardance and reduce the refractive index. For example, the poly(carbonate-co-urea) copolymer of Example 2 has reduced values of HRC, totHR, and % char relative to the BPA homopolymer of Comparative Example 2. The poly(carbonate-co-urea) copolymers of Examples 8 and 12 also have reduced values of HRC relative to the BPA homopolymer of Comparative Example 2. In addition, the data in the Table also shows the increased dispersion (Abbe #) of the poly(carbonate-co-urea) copolymer of Example 2 versus the BPA homopolymer of Comparative Example 2. The data in Table 4 also shows that Example 15 has a V2 rating at thicknesses of 1.6, 2.0, and 3.0 mm. In comparison, the BPA homopolymer of Comparative Example 2 failed the test at thicknesses of 2.0 and 3.0 mm.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

The invention claimed is:

1. A process to prepare a poly(carbonate-co-urea) copolymer in as little as one single polymerization reaction comprising reacting in the melt: (a) a dihydroxy reaction component comprising a dihydroxy compound, (b) a diaryl carbonate reaction component comprising a diaryl carbonate, (c) a urea reaction component comprising a monomeric urea compound in the presence of (d) a transesterification catalyst during at least part of the reaction and removing a phenolic byproduct to produce a poly(carbonate-co-urea) copolymer comprising both carbonate —(O(C═O)O)— and urea —(N(C═O)N)— linkages, wherein the urea and dihydroxy compounds are reacted in a molar ratio: (total moles of urea compound)/((total moles of urea compound)+(total moles of dihydroxy compound)) of less than or equal to 0.5.

2. The process of claim 1, wherein the urea compound is a compound of the following structure (a1), (a1)

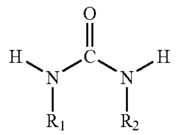

wherein the substituents $R_1$ and $R_2$ are independently each a $C_1$ to $C_{12}$ branched or linear alkyl group, a $C_6$ to $C_{18}$ aromatic group, or a $C_7$ to $C_{36}$ aralkyl group.

3. The process of claim 1, wherein the urea compound is a compound of structure (a2), (a2)

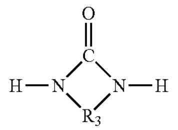

wherein the substituent $R_3$ is a $C_1$ to $C_{12}$ branched or linear aliphatic group, a $C_6$ to $C_{18}$ aromatic group, or a $C_7$ to $C_{36}$ aralkyl group.

4. The process of claim 1, wherein the urea compound is selected from the group consisting of ethylene urea, hydantoin, 2-benzimidazolinone, propylene urea, uracil, hydrouracil, benzoyleneurea, alloxan, N,N'-dicyclohexyl-urea, and barbituric acid.

5. The process of claim 1, wherein the urea compound is ethylene urea, N,N'-dicyclohexyl-urea or propylene urea.

6. The process of claim 1, wherein the diaryl carbonate reaction component comprises an activated diaryl carbonate compound.

7. The process of claim 6, wherein the activated diaryl carbonate compound is selected from the group consisting of bis(o-chlorophenyl)carbonate, bis(o-nitrophenyl)carbonate, bis(o-acetylphenyl)carbonate, bis(o-phenylketonephenyl)carbonate, bis(o-formylphenyl)carbonate, and bis(o-cyanophenyl)carbonate, bis(methylsalicyl)carbonate, bis(ethylsalicyl)carbonate, bis(propylsalicyl)carbonate, bis(butylsalicyl)carbonate, bis(benzylsalicyl)carbonate, and bis(methyl 4-chlorosalicyl)carbonate.

8. The process of claim 1, wherein the diaryl carbonate is diphenyl carbonate or bis(methylsalicyl)carbonate.

9. The process of claim 1, wherein the molar ratio: (total moles of urea compound)/((total moles of urea compound)+(total moles of dihydroxy compound)) is less than or equal to 0.33.

10. The process of claim 1, wherein the molar ratio: (total moles of urea compound)/((total moles of urea compound)+(total moles of dihydroxy compound)) is less than or equal to 0.25.

11. A process to prepare a poly(carbonate-co-urea-co-ester) copolymer in as little as one single polymerization reaction comprising reacting in the melt: (a) a dihydroxy reaction component comprising a dihydroxy compound, (b) a diaryl carbonate reaction component comprising a diaryl carbonate, (c) a urea reaction component comprising a monomeric urea compound (e) a diacid reaction component comprising a diacid compound and/or a diester reaction component comprising a diester compound in the presence of (d) a transesterification catalyst during at least part of the reaction and removing a phenolic byproduct to produce a poly(carbonate-co-urea) copolymer comprising both carbonate —(O(C═O)O)— and urea —(N(C═O)N)— linkages, wherein the urea, dihydroxy, diacid and diester compounds are reacted in a molar ratio: (total moles of urea compound)/((total moles of urea compound)+(total moles of dihydroxy compound)+(total moles of diacid compound)+(total moles of diester compound)) of less than or equal to 0.5.

12. The process of claim 11, wherein the diacid compound is selected from the group consisting of terephthalic acid, isophthalic acid, adipic acid, succinic acid, 1,7-cyclododecanedioic acid, 1,4-cyclohexanedicarboxylic acid, hexanedioic acid, octanedioic acid, decanedioic acid, dodecanedioic acid, tetradecanedioic acid, hexadecanedioic acid, octadecanedioic acid, cis 9-octenedioic acid, alpha-nonyldecanedioic acid, alpha-octylundecanedioic acid, and hydrogenated dimer acid.

13. The process of claim 11, wherein the diester compound is a phenyl or methyl salicyl ester of terephthalic acid, isophthalic acid, adipic acid, succinic acid, 1,7-cyclododecanedioic acid, 1,4-cyclohexanedicarboxylic acid, hexanedioic acid, octanedioic acid, decanedioic acid, dodecanedioic acid, tetradecanedioic acid, hexadecanedioic acid, octadecanedioic acid, cis 9-octenedioic acid, alpha-nonyldecanedioic acid, alpha-octylundecanedioic acid, or hydrogenated dimer acid.

14. The process of claim 11, wherein the diacid compound is dodecanedioic acid.

15. A process to prepare a poly(carbonate-co-urea) copolymer in as little as one single polymerization reaction comprising reacting in the melt: (a) a dihydroxy reaction component comprising a dihydroxy compound, (b) a diaryl carbonate reaction component comprising a diaryl carbonate, (c) a urea reaction component comprising a monomeric urea compound in the presence of (d) a transesterification catalyst during at least part of the reaction and removing a phenolic byproduct to produce a poly(carbonate-co-urea) copolymer comprising both carbonate —(O(C═O)O)— and urea —(N(C═O)N)— linkages, wherein the urea compound is a compound of the following structure (a1),

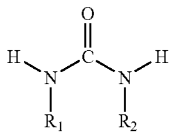

(a1)

wherein the substituents $R_1$ and $R_2$ are independently each a $C_1$ to $C_{12}$ branched or linear alkyl group, a $C_6$ to $C_{18}$ aromatic group, or a $C_7$ to $C_{36}$ aralkyl group, wherein the urea and dihydroxy compounds are reacted in a molar ratio: (total moles of urea compound)/((total moles of urea compound)+(total moles of dihydroxy compound)) of less than or equal to 0.5.

16. The process of claim 15, wherein the urea compound is selected from the group consisting of N,N'-diphenyl-urea, N,N'-bis(2-methylphenyl)-urea, N,N'-bis(3,4- dichlorophenyl)-urea, N-(4-chlorophenyl)-N'-(3,4-dichlorophenyl)-urea, N-(4- chlorophenyl)-N'-[4-chloro-3-(trifluoromethyl)phenyl]-urea, N,N'-bis(4-methylphenyl)- urea, N,N"-(methylenedi-4,1-phenylene)bis[N'-phenyl]-urea, N,N'-di-1-naphthalenyl- urea, N,N'-di-6-quinolinyl-urea, N,N'-di-2-propenyl-urea, N,N'-bis(phenylmethyl)-urea, N,N'-dibutyl-urea, N,N'-dicyclohexyl-urea, N,N'-diethyl-urea, N,N'-bis(1-methylethyl)- urea, N,N'-dimethyl-urea, N,N'-dioctadecyl-urea, N,N'-dipropyl-urea, and N,N'-di-9H- xanthen-9-yl-urea.

17. The process of claim 15, wherein the urea compound is N,N'- dicyclohexyl-urea.

18. The process of claim 15, wherein the diaryl carbonate reaction component comprises an activated diaryl carbonate compound.

19. The process of claim 18, wherein the activated diaryl carbonate compound is selected from the group consisting of bis(o-chlorophenyl)carbonate, bis(o-nitrophenyl)carbonate, bis(o-acetylphenyl)carbonate, bis(o-phenylketonephenyl)carbonate, bis(o-formylphenyl)carbonate, bis(o-cyanophenyl)carbonate, bis(methylsalicyl)carbonate, bis(ethylsalicyl)carbonate, bis(propylsalicyl)carbonate, bis(butylsalicyl)carbonate, bis(benzylsalicyl)carbonate, and bis(methyl 4-chlorosalicyl)carbonate.

20. The process of claim 15, wherein the diaryl carbonate is diphenyl carbonate or bis(methylsalicyl)carbonate.

21. The process of claim 15, wherein the molar ratio: (total moles of urea compound)/((total moles of urea compound)+(total moles of dihydroxy compound)) is less than or equal to 0.33.

22. The process of claim 15, wherein the molar ratio: (total moles of urea compound)/((total moles of urea compound)+(total moles of dihydroxy compound)) is less than or equal to 0.25.

23. A process to prepare a poly(carbonate-co-urea) copolymer in as little as one single polymerization reaction comprising reacting in the melt: (a) a dihydroxy reaction component comprising a dihydroxy compound, (b) a diaryl carbonate reaction component comprising a diaryl carbonate, (c) a urea reaction component comprising a monomeric urea compound in the presence of (d) a transesterification catalyst during at least part of the reaction and removing a phenolic byproduct to produce a poly(carbonate-co-urea) copolymer comprising both carbonate —(O(C═O)O)— and urea —(N(C═O)N)— linkages, wherein the urea compound is a compound of the following structure (a2), (a2)

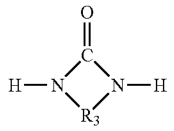

wherein the substituent $R_3$ is a $C_1$ to $C_{12}$ branched or linear aliphatic group, a $C_6$ to $C_{18}$ aromatic group, or a $C_7$ to $C_{36}$ aralkyl group, wherein the urea and dihydroxy compounds are reacted in a molar ratio: (total moles of urea compound)/((total moles of urea compound)+(total moles of dihydroxy compound)) of less than or equal to 0.5.

24. The process of claim 23, wherein the urea compound is selected from the group consisting of ethylene urea, 2-benzimidazolinone, and propylene urea.

25. The process of claim 23, wherein the diaryl carbonate reaction component comprises an activated diaryl carbonate compound.

26. The process of claim 25, wherein the activated diaryl carbonate compound is selected from the group consisting of bis(o-chlorophenyl)carbonate, bis(o-nitrophenyl)carbonate, bis(o-acetylphenyl)carbonate, bis(o-phenylketonephenyl) carbonate, bis(o-formylphenyl)carbonate, and bis(o-cyanophenyl)carbonate, bis(methylsalicyl)carbonate, bis(ethylsalicyl)carbonate, bis(propylsalicyl)carbonate, bis (butylsalicyl)carbonate, bis(benzylsalicyl)carbonate, and bis (methyl 4-chlorosalicyl)carbonate.

27. The process of claim 23, wherein the diaryl carbonate is diphenyl carbonate or bis(methylsalicyl)carbonate.

28. The process of claim 23, wherein the molar ratio: (total moles of urea compound)/((total moles of urea compound)+ (total moles of dihydroxy compound)) is less than or equal to 0.33.

29. The process of claim 23, wherein the molar ratio: (total moles of urea compound)/((total moles of urea compound)+ (total moles of dihydroxy compound)) is less than or equal to 0.25.

30. A process to prepare a poly(carbonate-co-urea) copolymer in as little as one single polymerization reaction comprising reacting in the melt: (a) a dihydroxy reaction component comprising a dihydroxy compound, (b) a diaryl carbonate reaction component comprising a diaryl carbonate, (c) a urea reaction component comprising a monomeric urea compound in the presence of (d) a transesterification catalyst during at least part of the reaction and removing a phenolic byproduct to produce a poly(carbonate-co-urea) copolymer comprising both carbonate —(O(C═O)O)— and urea —(N (C═O)N)— linikages.

31. A process to prepare a poly(carbonate-co-urea) copolymer in as little as one single polymerization reaction comprising both carbonate —(O(C═O)O)— and urea —(N (C═O)N)— linkages comprising reacting in the melt: (a) a dihydroxy reaction component comprising a dihydroxy compound, (b) a diaryl carbonate reaction component comprising a diaryl carbonate, (c) a urea reaction component comprising a monomeric urea compound of the following structure (a1), (a1)

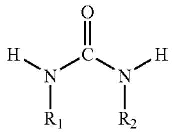

wherein the substituents $R_1$ and $R_2$ are independently each a $C_1$ to $C_{12}$ branched or linear alkyl group, a $C_6$ to $C_{18}$ aromatic group, or a $C_7$ to $C_{36}$ aralkyl group, in the presence of (d) a transesterification catalyst during at least part of the reaction and removing a phenolic byproduct to produce a poly(carbonate-co-urea) copolymer.

32. A process to prepare a poly(carbonate-co-urea) copolymer in as little as one single polymerization reaction comprising both carbonate —(O(C═O)O)— and urea —(N (C═O)N)— linkages comprising reacting in the melt: (a) a dihydroxy reaction component comprising a dihydroxy compound, (b) a diaryl carbonate reaction component comprising a diaryl carbonate, (c) a urea reaction component comprising a monomeric urea compound of structure (a2), (a2)

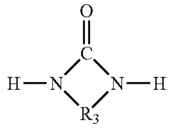

wherein the substituent $R_3$ is a $C_1$ to $C_{12}$ branched or linear aliphatic group, a $C_6$ to $C_{18}$ aromatic group, or a $C_7$ to $C_{36}$ aralkyl group, in the presence of (d) a transesterification catalyst during at least part of the reaction and removing a phenolic byproduct to produce a poly(carbonate-co-urea) copolymer.

33. A process to prepare a poly(carbonate-co-urea-co-ester) copolymer in as little as one single polymerization reaction comprising both carbonate —(O(C═O)O)— and urea —(N(C═O)N)— linkages comprising reacting in the melt: (a) a dihydroxy reaction component comprising a dihydroxy compound, (b) a diaryl carbonate reaction component comprising a diaryl carbonate, (c) a urea reaction component comprising a monomeric urea compound (e) a diacid reaction component comprising a diacid compound and/or a diester reaction component comprising a diester compound in the presence of (d) a transesterification catalyst during at least part of the reaction and removing a phenolic byproduct to produce a poly(carbonate-co-urea) copolymer.

* * * * *